United States Patent
Collins et al.

(10) Patent No.: US 11,986,006 B2
(45) Date of Patent: May 21, 2024

(54) ANTHOCYANIN-BASED COLORANT COMPOSITIONS AND METHODS OF USE THEREOF

(71) Applicant: MARS, INCORPORATED, McLean, VA (US)

(72) Inventors: Thomas M. Collins, Hackettstown, NJ (US); Rebecca J. Robbins, Chicago, IL (US); Randall Powers, Milford, PA (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 18/100,339

(22) Filed: Jan. 23, 2023

(65) Prior Publication Data
US 2023/0157330 A1  May 25, 2023

Related U.S. Application Data

(63) Continuation of application No. 17/269,691, filed as application No. PCT/US2019/048845 on Aug. 29, 2019.

(Continued)

(51) Int. Cl.
*A23L 5/43* (2016.01)
*A23G 3/34* (2006.01)
(Continued)

(52) U.S. Cl.
CPC ............. *A23L 5/43* (2016.08); *A23G 3/343* (2013.01); *A23G 3/54* (2013.01); *A23G 9/322* (2013.01);
(Continued)

(58) Field of Classification Search
CPC .. A23L 5/43; A23G 3/343; A23G 3/54; A23G 9/322; C09B 61/00; C09B 67/0033
See application file for complete search history.

(56) References Cited

U.S. PATENT DOCUMENTS

| | | | |
|---|---|---|---|
| 2003/0082281 A1 | 5/2003 | Kohler et al. | |
| 2012/0034658 A1 | 2/2012 | Yoon | |

(Continued)

FOREIGN PATENT DOCUMENTS

| | | |
|---|---|---|
| CN | 104640461 A | 5/2015 |
| CN | 108026382 A | 5/2018 |

(Continued)

OTHER PUBLICATIONS

Ahmadiani et al., Molar Absorptivity (ε) and Spectral Characteristics of Cyanidin-Based Anthocyanins from Red Cabbage, Molar Absorptivity (ε) and Spectral Characteristics of Cyanidin-Based Anthocyanins from Red Cabbage, Apr. 15, 2016, 8 pgs, 197, Food Chemistry.

(Continued)

*Primary Examiner* — Katherine D Leblanc

(57) ABSTRACT

Edible colorant compositions containing a monoacylated anthocyanin of Compound I and methods of use are provided. The colorant compositions include at least the monoacylated anthocyanin colorant of Compound I extracted from red cabbage and a metal ion, and have a pH from about 6.0 to about 8.0. The colorant compositions can be derived from a non-artificial product and provide a stable, blue colorant that can be used in food products. Specifically, the monoacylated anthocyanin colorant provides color characteristics similar to those provided by the artificial blue colorant, FD&C Blue No. 1.

18 Claims, 37 Drawing Sheets

Related U.S. Application Data

(60) Provisional application No. 62/725,886, filed on Aug. 31, 2018.

(51) Int. Cl.
*A23G 3/54* (2006.01)
*A23G 9/32* (2006.01)
*C09B 61/00* (2006.01)
*C09B 67/22* (2006.01)

(52) U.S. Cl.
CPC .......... *C09B 61/00* (2013.01); *C09B 67/0033* (2013.01); *A23V 2002/00* (2013.01)

(56) References Cited

U.S. PATENT DOCUMENTS

| | | |
|---|---|---|
| 2013/0165531 A1 | 6/2013 | Shi |
| 2015/0208705 A1 | 7/2015 | Galaffu |
| 2015/0374009 A1 | 12/2015 | Robbins |
| 2016/0015067 A1 | 1/2016 | Robbins et al. |
| 2017/0000169 A1 | 1/2017 | Robbins |
| 2017/0086486 A1 | 3/2017 | Myers et al. |
| 2021/0315240 A1 | 10/2021 | Collins et al. |

FOREIGN PATENT DOCUMENTS

| | | | |
|---|---|---|---|
| EA | 025212 | B1 | 11/2016 |
| JP | S63110259 | A | 5/1988 |
| JP | S63243167 | A | 10/1988 |
| RU | 2025475 | C1 | 12/1994 |
| RU | 2202575 | C1 | 4/2003 |
| RU | 2302423 | C2 | 7/2007 |
| WO | 2009005647 | A2 | 1/2009 |
| WO | 2009005647 | A3 | 4/2009 |
| WO | 2010114568 | A1 | 10/2010 |
| WO | 2012172429 | A2 | 12/2012 |
| WO | 2014023712 | A1 | 2/2014 |
| WO | 2014150230 | A1 | 9/2014 |
| WO | 2014150438 | A1 | 9/2014 |
| WO | 2014152417 | A2 | 9/2014 |
| WO | 2017004452 | A1 | 1/2017 |
| WO | 2018050504 | A1 | 3/2018 |
| WO | WO-2018050504 | A1 * | 3/2018 ............ A61K 8/022 |
| WO | 2020047276 | A1 | 3/2020 |

OTHER PUBLICATIONS

Denish P. R. et al., Science Advances Research Article, Discovery of a natural cyan blue: A unique food-sourced anthocyanin could replace synthetic brilliant blue, Apr. 7, 2021, p. 1-9, ., Retrieved from the Internet, URL:https://www.science.org/doi/epdf/10.1126/sciadv.abe7871, EP.

Kleffner et al., Foldit Standalone: a video game-derived protein structure manipulation interface using Rosetta. Bioinformatics. Sep. 1, 2017;33(17):2765-2767.

Kunkel, Thomas A. "Rapid and efficient site-specific mutagenesis without phenotypic selection." Proceedings of the National Academy of Sciences 82.2 (Jan. 1, 1985): 488-492.

Meiler et al., ROSETTALIGAND: Protein-small molecule docking with full side-chain flexibility, Proteins: Structure 65 (2006): Abstract-3pgs.

Potter, Simon C et al. "HMMER web server: 2018 update." Nucleic acids research vol. 46, W1 (2018): W200-W204. doi:10.1093/nar/gky448, 10 pgs.

Sigurdson et al., Evaluating the role of metal ions in the bathochromic and hyperchromic responses of cyanidin derivatives in acidic and alkaline pH, Food Chemistry, Mar. 29, 2016, pp. 26-34, vol. 208, Food Chemistry, Elsevier Ltd.

Degenhardt et al., Separation of Natural Food Colorants by High-Speed Countercurrent Chromatography, ACS Symposium Series (2001) 77522-42 (Year 2001), ACS Symposium Series (2001) 77522-42 (Year 2001), Ames and Hofmann, Washington, D.C.

* cited by examiner

| Material | Lambda Max | |
|---|---|---|
| | pH 7 | pH 8 |
| Red Cabbage | 576 | 602 |
| Red Cabbage di-acylated fraction | 596 | 611 |
| Compound 1 plus metal ion | 636 | --- |
| Compound 1 No metal | -- | 607 |
| Compound 1 + 1.0 Eq $Al^{3+}$ | --- | 637 |
| FD&C Blue 1* | 630 | -- |
| Spirulina* | 620 | -- |

FIG. 2A

| Material | pH | L* | a* | b* |
|---|---|---|---|---|
| Red Cabbage (RC) | pH 8 ◎ | 72 | -14 | -30 |
| Red Cabbage diacylated Anthocyanins (RCdA-8) | pH 8 ⊗ | 72 | -15 | -31 |
| Compound 1 + metal (C1+M-7) | pH 7 ◎ | 83 | -32 | -16 |
| Compound 1 (C1-8) no metal | pH 8 ○ | 75 | -20 | -30 |
| Compound 1 + 1 Eq Al3+ (C1+Al-8) | pH 8 ⊗ | 82 | -31 | -18 |
| FD&C Blue 1 solution* (SB1) | - | 90 | -28 | -15 |
| Spirulina* (SP) | - | 80 | -27 | -29 |

FIG. 5A

| Solutions / Material | L* | a* | b* | Delta E |
|---|---|---|---|---|
| Blue 1 solution* | 90 | -28 | -15 | - |
| Spirulina* (SP) | 80 | -27 | -29 | 17.15 |
| Compound 1 + metal at pH 7 | 83 | -32 | -16 | 8.27 |
| Compound 1 no metal at pH 8 | 75 | -20 | -30 | 22.06 |
| Compound 1 + 1.0 Eq Al3+ at pH 8 | 82 | -31 | -18 | 9.18 |

FIG. 5B

| Material | Hue Angle | |
|---|---|---|
| | pH 7 | pH 8 |
| Red Cabbage | | 245 ▷ |
| Red Cabbage Diacylated Anthocyanins | | 244 ▷ |
| Spirulina Blue | 227 ▷ | |
| Compound 1 plus metal | 207 ▷ | |
| Compound 1 | | 236 ▷ |
| Compound 1 plus 1 eq of Al3+ | | 211 ▷ |
| FD&C Blue No.1 | | 209 ▷ |

| Data Name | L* | a* | b* | C* | h |
|---|---|---|---|---|---|
| pH 3 | 68.72 | 60.58 | -12.67 | 61.89 | 348.19 |
| pH 4 | 78.54 | 10.75 | -21.34 | 23.90 | 296.74 |
| pH 5 | 64.06 | -24.29 | -28.26 | 37.26 | 229.32 |
| pH 6 | 73.73 | -34.25 | -22.42 | 40.93 | 213.21 |
| pH 7 | 73.41 | -37.66 | -24.58 | 44.98 | 213.13 |
| pH 8 | 72.26 | -42.71 | -23.84 | 48.91 | 209.17 |

Peak B: 0.05 mM, buffer conc.: 200 mM

| Metal Ion | Metal Equivalent | L* | a* | b* | C* | h |
|---|---|---|---|---|---|---|
| $Al^{3+}$ | 0 | 64.07 | 36.25 | -32.94 | 48.98 | 317.74 |
| | 1/3 | 60.15 | -2.31 | -32.98 | 33.06 | 265.99 |
| | 1 | 65.72 | -16.24 | -28.80 | 33.06 | 240.58 |
| | 5 | 65.29 | -11.30 | -32.85 | 34.74 | 251.02 |
| $Fe^{2+}$ | 0 | 64.07 | 36.25 | -32.94 | 48.98 | 317.74 |
| | 1/3 | 62.48 | 30.37 | -34.29 | 45.81 | 311.53 |
| | 1 | 61.42 | 26.27 | -33.93 | 42.91 | 307.75 |
| | 5 | 71.10 | -20.64 | -17.91 | 27.33 | 220.95 |

FIG. 9B

| Metal Ion | Metal Equivalent | L* | a* | b* | C* | h |
|---|---|---|---|---|---|---|
| $Al^{3+}$ | 0 | 75.26 | -20.43 | -29.74 | 36.08 | 235.51 |
| | 1/3 | 76.58 | -27.63 | -26.35 | 38.18 | 223.64 |
| | 1 | 82.03 | -30.63 | -18.22 | 35.64 | 210.75 |
| | 5 | 81.36 | -30.44 | -19.10 | 35.94 | 212.11 |
| $Fe^{2+}$ | 0 | 75.26 | -20.43 | -29.74 | 36.08 | 235.51 |
| | 1/3 | 82.70 | -27.47 | -15.90 | 31.74 | 210.06 |
| | 1 | 82.29 | -27.24 | -15.56 | 31.37 | 209.74 |
| | 5 | 77.00 | -27.94 | -17.64 | 33.04 | 212.27 |

FIG. 9C

| Data Name | L* | a* | b* | C* | h |
|---|---|---|---|---|---|
| pH 1 | 54.85 | 74.51 | 46.34 | 87.74 | 31.88 |
| pH 2 | 64.79 | 71.70 | 7.67 | 72.11 | 6.10 |
| pH 3 | 64.03 | 67.88 | -5.57 | 68.11 | 355.31 |
| pH 4 | 72.78 | 45.81 | -14.88 | 48.16 | 342.01 |
| pH 5 | 73.47 | 31.53 | -21.23 | 38.01 | 326.05 |
| pH 6 | 48.14 | 58.42 | -39.49 | 70.51 | 325.94 |
| pH 7 | 23.73 | 53.03 | -54.69 | 76.17 | 314.12 |
| pH 8 | 28.03 | 14.67 | -51.48 | 53.53 | 285.91 |
| pH 9 | 27.99 | -6.22 | -37.13 | 37.64 | 260.49 |

| Data Name | L*(D65) | a*(D65) | b*(D65) | C*(D65) | h(D65) |
|---|---|---|---|---|---|
| Green with artificial color (Yellow #5 + Blue #1) | 60 | -46 | 43 | 63 | 137 |
| Spirulina Blue + Turmeric yellow non-artificial green candies | 54 | -16 | 41 | 44 | 112 |
| 0.5% Red Cabbage extract at pH 8 + 0.23% Turmeric yellow | 41.71 | -5.38 | 15.94 | 16.82 | 108.65 |
| 0.0075% Blue 1 = Blue 1 component in green candy | 75.11 | -31.48 | -18.21 | 36.37 | 210.06 |

FIG. 11

| Data Name | L* | a* | b* | C* | h |
|---|---|---|---|---|---|
| Blue 1 at 0.05% | 56.77 | -34.27 | -30.99 | 46.21 | 222.11 |
| Blue 1 at 0.1% | 49.86 | -29.37 | -32.63 | 43.91 | 228.01 |
| Blue 1 at 0.2% | 44.22 | -22.00 | -31.14 | 38.13 | 234.77 |
| Blue 1 at 0.3% | 38.66 | -17.98 | -30.96 | 35.80 | 239.87 |
| Blue 1 at 0.4% | 35.43 | -14.09 | -27.89 | 31.25 | 243.21 |
| Blue 1 at 0.5% | 37.50 | -17.12 | -27.21 | 32.15 | 237.84 |

FIG. 12

| Data Name | L* | a* | b* | C* | h |
|---|---|---|---|---|---|
| Blue 1 at 0.001% | 89.26 | -9.85 | 0.24 | 9.85 | 178.56 |
| Blue 1 at 0.005% | 83.94 | -22.48 | -7.76 | 23.78 | 199.04 |
| Blue 1 at 0.01% | 80.40 | -27.03 | -11.70 | 29.45 | 203.40 |
| Blue 1 at 0.05% | 65.74 | -45.58 | -25.01 | 51.99 | 208.75 |
| Blue 1 at 0.1% | 57.36 | -47.73 | -31.34 | 57.11 | 213.29 |
| Blue 1 at 0.2% | 53.90 | -34.34 | -30.35 | 45.83 | 221.47 |
| Blue 1 at 0.3% | 46.30 | -27.30 | -31.27 | 41.51 | 228.88 |
| Blue 1 at 0.4% | 43.44 | -24.26 | -30.84 | 39.25 | 231.81 |
| Blue 1 at 0.5% | 40.63 | -20.77 | -29.38 | 35.98 | 234.75 |

Red cabbage

Spirulina

FD&C Blue No. 1

Compound 1 + metal at pH 7

|  | h° |
|---|---|
| FD&C Blue No. 1 | 231.13 |
| Spirulina | 243.15 |
| Compound I + metal | 215.51 |
| Red Cabbage | 243.72 |

Peak B – more green hues
Other non-artificial blues – more violet undertones

Red cabbage / safflower    Spirulina / safflower

Compound I complex / safflower

|  | h° |
|---|---|
| Prototypes | h(D65) |
| Control -Green Candy | 134.81 |
| CH 1345 (GST Green M&M's NAC) | 110.43 |
| 15H -0.064% Compound 1 w/ Al + 0.8% Safflower, pH 7.1 | 138.14 |

$C_{132}H_{147}AlO_{75}$

Exact Mass: 2958.75

Brix50 sugar syrup at pH 7.0

Compound I

Compound II

ANTHOCYANIN-BASED COLORANT COMPOSITIONS AND METHODS OF USE THEREOF

CROSS-REFERENCE TO RELATED APPLICATIONS

This application is a Track I continuation of U.S. patent application Ser. No. 17/269,691, filed on Feb. 19, 2021, which is the U.S. National Phase of International Patent Application No. PCT/US2019/48845, filed on Aug. 29, 2019, which claims priority to U.S. Provisional Application No. 62/725,886, filed on Aug. 31, 2018, the contents of which are incorporated herein by reference in their entirety.

FIELD OF THE INVENTION

The present disclosure relates to non-artificial blue anthocyanin-containing colorant compositions that include monoacylated anthocyanins extracted from red cabbage that deliver color characteristics consistent with FD&C Blue No. 1 (Cyan Blue). The colorant compositions of the present disclosure can be used to produce edible products including hard panned confectionery products.

BACKGROUND OF THE INVENTION

The use and demand of alternatives for artificial food colorants has been increasing due to perceived health concerns and consumer demand for naturally sourced ingredients. However, non-artificial food colorants have not been able to achieve the same color characteristics as their artificial counterparts, for example, FD&C Blue No. 1. The lack of a suitable non-artificial blue colorant has also made the development of a desirable non-artificial green hue, from a combination of non-artificial blue and yellow colorants, difficult. *Spirulina* Blue, a blue-green, algae-derived material, is used as a non-artificial blue colorant, but does not provide the same color characteristics as FD&C Blue No. 1.

Anthocyanins are known as non-artificial food colorants responsible for reds and blues of fruits and vegetables. It is known in the art that anthocyanin-containing juices and extracts generally exhibit red hues at low pH, and the hue shifts towards purple as pH increases. International Patent Publication No. WO 2014/152417 discloses the isolation of fractions of anthocyanin molecules from vegetable and fruit extracts, including red cabbage, at select pHs to provide different color characteristics than those provided by the source vegetable or fruit.

As a class, anthocyanins encompass a large number of structurally diverse compounds based on differences in primary structure, glycosylation and acylation patterns. Anthocyanins comprise an anthocyanidin esterified to one or more sugar molecules. Examples of sugar molecules found in anthocyanin structures include arabinose, galactose, glucose, rhamnose, rutinose, sambubiose, sophorose and xylose. An anthocyanin can be substituted with hydrogen, hydroxyl, and/or methoxyl groups at various positions. Anthocyanins can also be acylated, where they can have one or more molecules esterified to the sugar molecules at the 2-, 3-, 4- and/or 6-position of a monosaccharide.

To date, the currently available blue colorant compositions that are produced from non-artificial sources have not been able to produce a color expression very close to FD&C Blue No. 1 for use in food products. Therefore, there remains a need for non-artificial blue anthocyanin colorants that provide similar color characteristics as FD&C Blue No. 1.

SUMMARY OF THE INVENTION

The presently disclosed subject matter provides an edible colorant composition comprising a) a monoacylated anthocyanin compound having the structure:

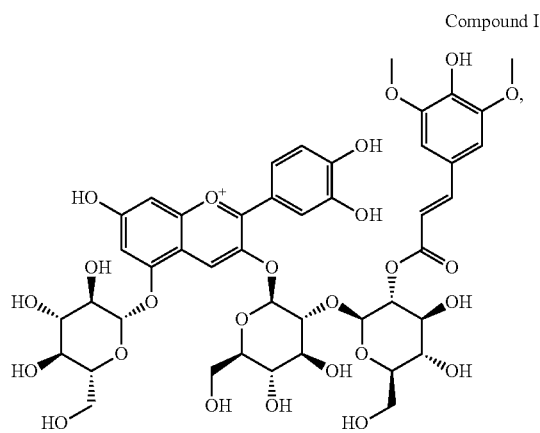 [SMILES: COc1cc(/C=C/C(=O)O[C@H]2[C@H](O[C@H]3[C@H](Oc4cc5c(O[C@@H]6O[C@H](CO)[C@@H](O)[C@H](O)[C@H]6O)cc(O)cc5[o+]c4-c4ccc(O)c(O)c4)O[C@H](CO)[C@@H](O)[C@@H]3O)O[C@H](CO)[C@@H](O)[C@@H]2O)cc(OC)c1O]

Compound I and
b) a metal ion, wherein the edible colorant composition is a solution having a pH of from about 6.0 to about 8.0. In some aspects, the edible colorant composition is dried to produce a dry colorant composition.

In some aspects, the edible colorant composition is blue. In some aspects, the edible colorant composition has a ΔE value of less than about 17 (e.g., about 16, about 15, about 14, about 13, about 12, about 11, about 10, about 9, about 8, about 7, about 6, about 5, about 4, or about 3) when compared to an aqueous solution of about 50 ppm to about 100 ppm FD&C Blue No. 1. For example, the ΔE value is from about 8 to about 10.

In further aspects, the edible colorant composition is green. In some aspects, the edible colorant composition further comprises a non-artificial yellow colorant selected from the group consisting of safflower, turmeric, beta carotene, and *gardenia* yellow.

In some aspects, the edible colorant composition comprises from about 0.5% to about 30% (weight/weight (w/w)) of Compound I. In some aspects, the edible colorant composition comprises from about 0.5% to about 10% (w/w) of Compound I. In further aspects, the edible colorant composition comprises from about 10% to about 30% (w/w) of Compound I. In certain aspects, Compound I is present in the edible colorant composition in a concentration of from about 0.005% to about 80% (weight/weight (w/w)), alternatively, in a concentration of from about 0.005% to about 10% (w/w), alternatively, in a concentration of from about 0.005% to about 1.0% (w/w), alternatively, in a concentration of from about 0.005% to about 0.1% (w/w). In certain aspects, Compound I is present in the edible colorant composition in a concentration of from about 0.05% to about 0.1% (w/w) (e.g., from about 0.05% to about 0.09% (w/w), from about 0.06% to about 0.08% (w/w), or from about 0.07% to about 0.1% (w/w)). In other aspects, Compound I is present in the edible colorant composition in a concentration of from about 5% to about 35% (w/w) (e.g., from about 5% to about 15% (w/w), from about 5% to about 20%

(w/w), from about 5% to about 30% (w/w), from about 10% to about 25% (w/w), from about 10% to about 35% (w/w), from about 20% to about 35% (w/w)).

In further aspects, Compound I is present in an amount greater than about 10% (e.g., about 20%, about 30%, about 40%, about 50%, about 60%, about 70%, about 80%, about 90%, or about 100% (w/w)) of an anthocyanin chromophore content in the edible colorant composition. In certain aspects, Compound I comprises from about 0.05% to about 0.1% (w/w) (e.g., from about 0.05% to about 0.09% (w/w), from about 0.06% to about 0.08% (w/w), or from about 0.07% to about 0.1% (w/w)) of an anthocyanin chromophore content of the colorant composition. In other aspects, Compound I comprises from about 5% to about 35% (w/w) (e.g., from about 5% to about 15% (w/w), from about 5% to about 20% (w/w), from about 5% to about 30% (w/w), from about 10% to about 25% (w/w), from about 10% to about 35% (w/w), from about 20% to about 35% (w/w)) of an anthocyanin chromophore content of the colorant composition.

In some aspects, the edible colorant composition comprises from about 0.3 to about 1.0 (e.g., about 1/3, about 0.4, about 0.5, about 0.6, about 0.7, about 0.8, or about 0.9) molar equivalents of the metal ion to the monoacylated anthocyanin compound, e.g., wherein the metal ion is selected from the group consisting of aluminum ($Al^{3+}$), ferric ($Fe^{3+}$) or ferrous ($Fe^{2+}$) ions.

The present disclosure also provides an edible product comprising an edible colorant composition disclosed herein. In some aspects the edible product is a confectionery product.

In some aspects, the edible colorant composition is present in a coating applied to a surface of the confectionery product. In some aspects, the confectionery product is a confectionery center with a soft-panned or hard-panned sugar-based coating. In further aspects, the confectionery product is a confectionery center with a soft-panned or hard-panned polyol coating.

In some aspects, the edible product comprises from about 0.0001 to about 10% (w/w) of Compound I. In some aspects, the edible product comprises from about 0.0005 to about 1% (w/w) of Compound I. In other aspects, the edible product comprises from about 0.001 to about 0.5% (w/w) of Compound I. In certain aspects, the content of Compound I in an edible product is between about 0.0001% and about 10% (w/w), or between about 0.0001% and about 0.001% (w/w), or between 0.001% and about 0.05% (w/w), or between about 0.0005% and about 0.001% (w/w), or between about 0.0005% and about 0.1% (w/w), or between about 0.0005% and about 1% (w/w), or between about 0.001% and about 0.5% (w/w), or between about 1% to about 10% (w/w), or between about 2% to about 8% (w/w), or between about 5% to about 10% (w/w).

The foregoing has outlined broadly the features and technical advantages of the present application in order that the detailed description that follows may be better understood. Additional features and advantages of the application will be described hereinafter which form the subject of the claims of the application. It should be appreciated by those skilled in the art that the conception and specific aspects disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of the application, both as to the organization and method of operation, together with further objects and advantages, will be better understood from the following description.

BRIEF DESCRIPTION OF THE DRAWINGS

FIG. 2A shows the $\lambda_{max}$ at pH 7 and 8 for red cabbage, red cabbage (RC) diacylated fraction, Compound I plus 1.0 mole equivalent of $Al^{3+}$ at pH 7, Compound I (no metal ion), Compound I plus 1.0 mol. equiv. of $Al^{3+}$ at pH 8, FD&C Blue No. 1 and Spirulina Blue.

FIG. 5A shows CIELAB color space L*a*b* colorimetric data (in aqueous solution) for red cabbage, red cabbage diacylated anthocyanin fraction, Compound I plus 1.0 mol. equiv. of $Al^{3+}$ at pH 7, Compound I with no metal ion at pH 8, Compound I plus less than 1.0 mol. equiv. of $Al^{3+}$ at pH 8, FD&C Blue No. 1 solution, and Spirulina Blue. Spectral curves have been normalized for comparison of L*a*b* values.

FIG. 5B shows CIELAB color space L*a*b* values for FD&C Blue 1, Spirulina Blue, Compound I plus metal ion at pH 7, Compound I with no metal ion at pH 8, and Compound I plus 1.0 mol. equiv. $Al^{3+}$ at pH 8. AE values are calculated versus the FD&C Blue No. 1 color for each of the other solutions. Spectral curves have been normalized for comparison of L*a*b* values.

FIG. 9B shows the color properties of Compound I at pH 5 with different metal ion concentrations. The table provides the CIELAB color space L*a*b* values and the CIELCH color space L*C*h° values of exemplary Compound I at pH 5 showing the effects of different added amounts of $Al^{3+}$ and $Fe^{2+}$ ions.

FIG. 9C shows the color properties of Compound I at pH 8 with different metal ion concentrations. The table provides the CIELAB color space L*a*b* values and the CIELCH color space L*C*h° values of exemplary Compound I at pH 8 showing the effects of different added amounts of $Al^{3+}$ and $Fe^{2+}$ ions.

FIG. 11 is a table showing the L*a*b*C*h° values for hard panned candies colored with artificial green color, non-artificial green from Spirulina Blue and Turmeric yellow, Red Cabbage extract at pH 8 and Turmeric yellow, and candies made with only the amount of FD&C Blue #1 used in the artificial green candy example. Measurements were made under a D65 illuminant.

FIG. 12 is a table of measured reflectance as L*a*b*C*h° values for hard panned candies colored with a range of FD&C Blue No. 1 concentrations used in the sucrose panning syrup. Measurements were made under a D65 illuminant at a 10° observer angle and SCE.

DETAILED DESCRIPTION OF THE INVENTION

Figure 1A:
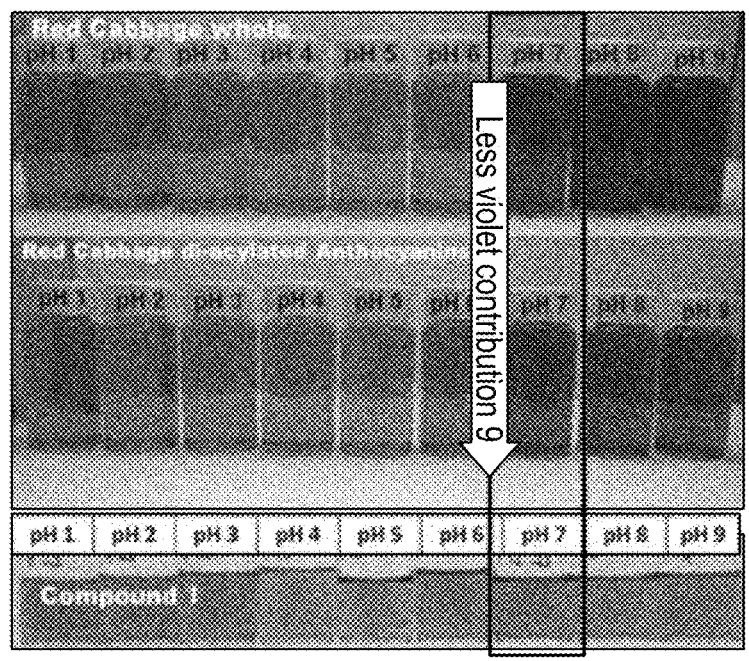
FIG. 1A provides a visual comparison of the colors provided by whole red cabbage extracts, red cabbage diacylated fraction and Compound I plus metal ion in aqueous solution at pH values ranging from 1 to 9, which demonstrates the lower violet color contribution, e.g., at pH 7.

The present disclosure relates to colorant compositions, e.g., blue colorant compositions that include the monoacylated anthocyanin compound (i.e., Compound I) with the following structure:

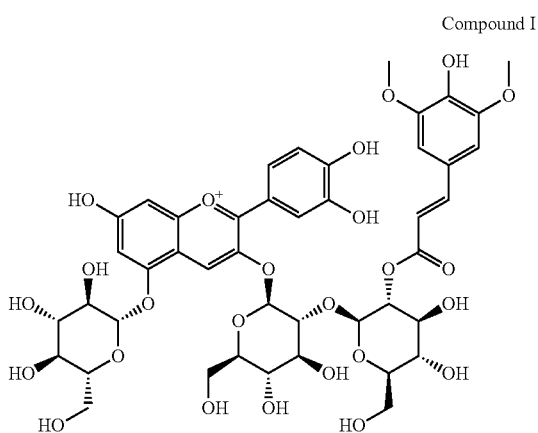 [SMILES: COc1cc(/C=C/C(=O)O[C@H]2[C@H](O[C@H]3[C@H](Oc4cc5c(O[C@@H]6O[C@H](CO)[C@@H](O)[C@H](O)[C@H]6O)cc(O)cc5[o+]c4-c4ccc(O)c(O)c4)O[C@H](CO)[C@@H](O)[C@@H]3O)O[C@H](CO)[C@@H](O)[C@@H]2O)cc(OC)c1O]

Compound I

In certain aspects, the colorant compositions as disclosed herein also comprise a (mole equivalent) metal ion, wherein the edible colorant composition is a solution having a pH of from about 6.0 to about 8.0.

In certain aspects, the colorant compositions can be used in wide variety of food products. For example, and not by way of limitation, a colorant composition of the present disclosure can be used in a coating of a hard-panned confection as discussed below.

1. Definitions

The terms used in this specification generally have their ordinary meanings in the art, within the context of this disclosure and in the specific context where each term is used. Certain terms are discussed below, or elsewhere in the specification, to provide additional guidance to the practitioner in describing the colorants and methods of the disclosure and how to make and use them.

As used herein, the use of the word "a" or "an" when used in conjunction with the term "comprising" in the claims and/or the specification may mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art.

As used herein, the term "anthocyanin" refers to water soluble pigments that are generally red, purple or blue, depending on the pH. Anthocyanins are the glucosides of anthocyanidins. Anthocyanidins are generally flavylium cation derivatives of anthocyanins (devoid of the sugar moieties) and can include aurantinidin, cyanidin, dephininidin, europinidin, luteolinidin, pelargonidin, malvidin, peonidin, petunidin and rosinidin, for example. Compound I and Compound II described herein are also examples of anthocyanins.

As used herein, the term "acylated anthocyanin" refers to an anthocyanin molecule having one or more acyl molecules esterified to one or more sugar molecules that are attached to the anthocyanidin. Acyl molecules or groups can include cinnamate derivative and or hydroxyl benzoyl derivatives. Cinnamate derivatives can include ferulic, para coumaric or sinapic groups. Sinapic is the exemplary acyl group.

As used herein, the term "monoacylated anthocyanin" refers to an anthocyanin molecule that has one acyl group esterified to a sugar molecule.

As used herein, the term "diacylated anthocyanin" refers to an anthocyanin molecule that has two acyl groups esterified to sugar molecules.

As used herein, the term "glycosylated" refers to an anthocyanin molecule that has one or more sugar molecules attached to the anthocyanidin.

As used herein, the term "colorant" refers to any substance that imparts color by absorbing or scattering light at different wavelengths.

As used herein, the term "colorant composition" refers to any composition that imparts color by absorbing or scattering light at different wavelengths.

As used herein, the term "non-artificial colorant" refers to any substance that exists in or is produced by nature or is obtained from a non-artificial source. In certain aspects, the term "non-artificial colorant" refers to a colorant that comprises one of more anthocyanins obtained from a non-artificial source, e.g., a vegetable, a plant, or a flower (or a flower petal).

As used herein, the term "non-artificial colorant composition" refers to any composition that comprises a colorant that exists in or is produced by nature or is obtained from a non-artificial source. In certain aspects, the term "non-artificial colorant composition" refers to an edible colorant composition that comprises one of more anthocyanins obtained from a non-artificial source, e.g., a vegetable, a plant, or a flower (or a flower petal).

As used herein, "maximum absorbance," "lambda max," or "$\lambda_{max}$," refers to the wavelength in nanometers at which the maximum fraction of light is absorbed by a substance, colorant and/or colorant composition.

As used herein, "FD&C Blue No. 1" includes the various names given to the identical artificial blue colorant, Brilliant Blue FCF and European Commission E133. The lambda max of FD&C Blue No. 1 is 630 nm. FD&C Blue No. 1 is used interchangeably with Cyan Blue or FD&C Blue No. 1.

As used interchangeably herein, the terms "color" and "color characteristics" refer to the color properties such as hue, chroma, purity, saturation, intensity, vividness, value, lightness, brightness and darkness, and color model system parameters used to describe these properties, such as Commission Internationale de l'Eclairage CIE 1976 CIELAB color space L*a*b* values and CIELCH color space L*C*h° values. The CIELAB and CIELCH color models provide more perceptually uniform color spaces than earlier color models. In certain aspects, the colorants of the present disclosure can be analyzed with a spectrophotometer, and CIELAB L*a*b* and CIELCH L*C*h° values can be calculated from the spectral data, as described in greater detail below. The L*a*b* and L*C*h° values provide a means of representing color characteristics and assessing the magnitude of difference between two colors. Methods for determining the CIELAB and CIELCH values of colorants are disclosed in International Patent Publication Nos. WO 2014/150230 and WO 2014/152417, the contents of which are hereby incorporated by reference in their entireties. CIELAB color space L*a*b* values and CIELCH color space L*C*h° values can be expressed using three-dimensional representations and also two-dimensional representations where the $3^{rd}$ dimension is fixed. An example of the latter is a two-dimensional cross-sectional representation of the L*a*b* space at a specific L* value, for example at L*=50. Such a representation allows a useful display of colorants in the a*b* space with the caveat that some points are actually above, on or below the plane shown. The L* value is typically chosen to be at a suitable midpoint between the data points being shown.

The L*a*b* and L*C*h° values also provide a means of representing color characteristics and assessing the magnitude of difference between two colors not only of solutions, but also of products. Measurements of products are accomplished using reflectance measurements from the surface of the product, for example, the surface of a hard panned confection. In the case of reflectance measurements, the L*a*b* and L*C*h° values reported herein were calculated based on spectral data obtained with a Konica Minolta Spectrophotometer CM-3500d/CM5 operated in reflectance mode with a D65 illuminant and 10° observer angle and SCE.

The term "reflectance" as used herein with respect to a material is the percentage of any incident electromagnetic radiation that reflects back from a surface. Reflectance is a function of wavelength, and the reflectance of a material can vary across the electromagnetic spectrum. A material that is a perfect reflector at a particular wavelength has a reflectance of 100% at that wavelength.

As used herein, "hue" or "hue angle" refers to the color property that gives a color its name, for example, red, blue and violet.

As used herein, "chroma" is a color property indicating the purity of a color. In certain aspects, a higher chroma is associated with greater purity of hue and less dilution by white, gray or black.

As used herein, "value" is a color property indicating the lightness or darkness of a color wherein a higher "value" is associated with greater lightness.

As used herein "admixing," for example, "admixing an edible colorant composition of the present disclosure with a food product," refers to the method where an edible colorant composition of the present disclosure is mixed with or added to the completed product or mixed with some or all of the components of the product during product formation or some combination of these steps. When used in the context of admixing the term "product" refers to the product or any of its components. Admixing can include a process that includes adding the edible colorant composition to the product, spraying the edible colorant composition on the product, coating the colorant composition on the product, painting the edible colorant composition on the product, pasting the edible colorant composition on the product, encapsulating the product with the colorant composition, mixing the edible colorant composition with the product or any combination thereof. The edible colorant compositions, e.g., those that are admixed with the product, can be a liquid, dry powder, spray, paste, suspension or any combination thereof. In certain aspects, the term "admixing" can refer to mixing Compound I as disclosed herein with one or more additional components to create a finished edible colorant composition.

As used herein, "solution," refers to a liquid mixture in which the minor component (the solute) is uniformly distributed within the major component (the solvent). For example, the monoacylated anthocyanin compound (Compound I) is distributed within a sugar syrup to yield a blue colored coating on a confectionery substrate.

As used herein, "food grade," refers to any substance, metal ion and/or colorant composition that is of a grade acceptable for use in edible food products.

As used herein, "food product" refers to an ingestible product, such as, but not limited to, human food, animal foods and pharmaceutical compositions.

As used herein, "sugar syrup" refers to a liquid material comprising at least a sugar and water. In certain aspects, a sugar syrup can include a syrup where a sugar is dissolved in the water in an amount of at least 60% sugar solids by weight of the syrup. In certain aspects, other components can also be present within the sugar syrup. For example, and not by way of limitation, a colorant composition of the present disclosure can be present within a sugar syrup.

As used herein, "coating layer" refers to a layer obtained by one application of a coating material, e.g., a sugar syrup, to a substrate, e.g., a food product, being coated and which is dried and crystallized.

As used herein, "coating" refers to the total amount of coating material, e.g., one or more sugar syrups, applied to a substrate, e.g., a food product, which is dried and crystallized after each application, upon completion of a coating process. In certain aspects, the coating process can include one or more steps of applying a coating material and drying and crystallizing each applied coating layer, e.g., a sugar syrup containing one or more colorant compositions of the present disclosure, to the substrate.

As used herein, "confectionery product" or "confection" refers to a sweet or candy food product. Non-limiting examples of confectionery products include cakes, cookies, pies, candies, chocolates, chewing gums, gelatins, ice creams, puddings, jams, jellies, and other condiments, cereal, and other breakfast foods, canned fruits and fruit sauces. As used herein, the confectionery products having neutral pH (pH 5-8) are particularly suitable for the colorant compositions disclosed herein.

2. Acylated Anthocyanins

The present disclosure relates to non-artificial blue anthocyanin-containing colorants that include acylated anthocyanins, e.g., monoacylated anthocyanins, derived from red cabbage extracts, e.g., from red cabbage juice. In certain aspects, the non-artificial blue anthocyanin-containing colorants provide color characteristics similar to those provided by the artificial blue colorant, FD&C Blue No. 1. The non-artificial blue anthocyanin-containing colorant can be used in an edible colorant composition, e.g., to create a blue or a green edible colorant composition.

In certain aspects, the non-artificial blue anthocyanin-containing colorant is a single anthocyanin molecule, i.e., a monoacylated, triglycosylated cyanin that provides a non-artificial blue colorant at pH 7 in combination with a metal ion. This non-artificial blue anthocyanin-containing colorant, also referred to as "Compound I", is a monoacylated anthocyanin with one sinapic acid attached on the second sugar of the sophorose group attached at position 3 of the cyanidin chromophore structure and with a glucose group attached at position 5. (A chromophore is the part of a molecule responsible for its color). The chemical name of Compound I is 3-O-(2-O-(2-O-(E)-sinapoyl-β-D-glucopyranosyl)-β-D-glucopyranosyl)-5-O-β-D-glucopyranosylcyanidin. This non-artificial blue anthocyanin-containing colorant has the following structure:

Compound I

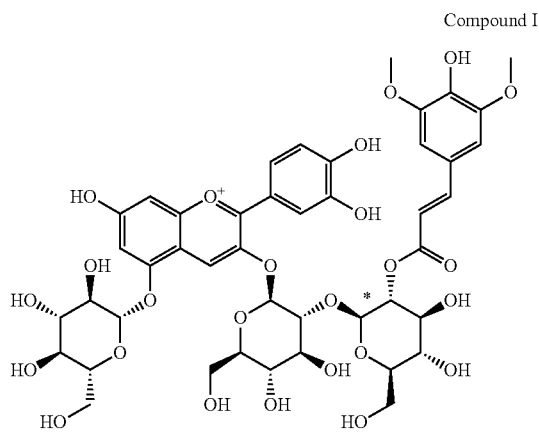 [SMILES: COc1cc(/C=C/C(=O)O[C@H]2[C@H](O[C@H]3[C@H](Oc4cc5c(O[C@@H]6O[C@H](CO)[C@@H](O)[C@H](O)[C@H]6O)cc(O)cc5[o+]c4-c4ccc(O)c(O)c4)O[C@H](CO)[C@@H](O)[C@@H]3O)O[C@H](CO)[C@@H](O)[C@@H]2O)cc(OC)c1O]

Certain characteristics of Compound I are disclosed in Ahmadiani et al., Food Chemistry 197 (2016):900-906, the disclosure of which is incorporated herein by reference in its entirety.

In certain aspects, Compound I makes up greater than about 10% of the anthocyanin chromophore portion of a colorant, preferably greater than about 20%, preferably greater than about 30%, preferably greater than about 40%, preferably greater than about 50%, preferably greater than about 60%, preferably greater than about 70%, preferably greater than about 80%, preferably greater than about 90%, preferably greater than about 95%, and most preferably about 100% of the anthocyanin chromophore portion of a colorant.

Figure 1B:
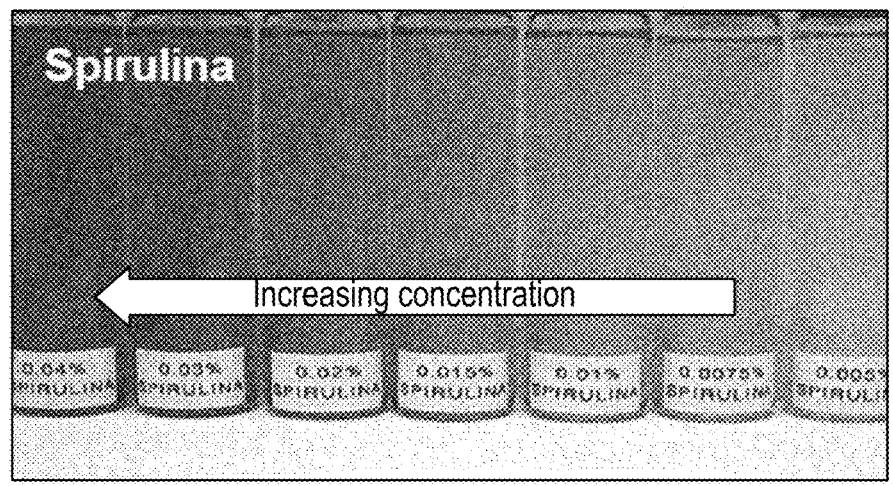
FIG. 1B provides a visual comparison of the colors provided by Spirulina Blue extracts in aqueous solution at concentrations from 0.005% to 0.04%.
Figure 1C:
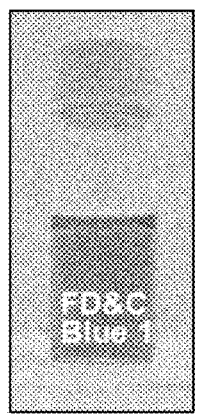
FIG. 1C provides a visual comparison of the color provided by an FD&C Blue No. 1 (Blue 1) extract in aqueous solution.

A colorant composition comprising Compound I plus from about 0.3 to about 1.0 mol. equiv. of a metal ion at pH 5 to 8 surprisingly provides much less violet hue than red cabbage juice at pH 7 or 8, diacylated anthocyanin fraction of red cabbage at pH 7 or 8, and even *Spirulina* Blue. As shown in FIGS. 1A-1C, the concept and importance of violet contribution to color hue is demonstrated. A comparison of the color at pH 7 for red cabbage, di-acylated red cabbage (RC) anthocyanin fraction and exemplary Compound I shows significantly reduced contribution of violet color in the Compound I solution with metal ion (FIG. 1A). By comparison, the violet color is higher for *Spirulina* Blue solution and the violet hue is seen to increase as the concentration of *Spirulina* Blue is increased (FIG. 1B). The composition containing Compound I is the closest to FD&C Blue No. 1 in having a very low violet color contribution (FIG. 1C).

A colorant composition comprising Compound I plus a metal ion at pH 5 to 8 provides significantly less violet hue in its blue color, which is critical when blending with a non-artificial yellow color to produce a bright and true green color. Other non-artificial blue colorants having a significant violet hue tend to produce undesirable green colors when mixed with non-artificial yellow colorants. These undesirable green colors are typically characterized as being a muddy green or olive-green color.

As disclosed in further detail below, the color characteristics of the composition containing of Compound I is particularly unique with respect to hue angle, wavelength, and a* and b* values comparable to FD&C Blue No. 1. Additionally, as demonstrated in the Examples and shown in FIGS. 2 and 3, the much lower area under the curve at wavelengths from 500 nm to 600 nm for Compound I with metal ion, which is a measure of the violet hue contribution to the color, is particularly unexpected.

3. Edible Colorant Compositions

The present disclosure provides edible colorant compositions that contain a monoacylated anthocyanin of Compound I and a metal ion in a solution at a particular pH, e.g., from about pH 6.0 to about pH 8.0. In certain aspects, an edible colorant composition of the present disclosure can be a cyan blue colorant composition, e.g., wherein the anthocyanin present within the colorant composition produce a cyan blue color.

In certain aspects, one or more of the edible colorant compositions of the present disclosure can be added to a food product, in an amount effective to increase, enhance and/or modify the color characteristics of a food product or portion thereof. For example, and not by way of limitation, an edible colorant composition of the present disclosure can enhance the blue color characteristics of the food product (or portion thereof). In certain aspects, edible colorant compositions of the present disclosure can be used to increase, enhance and/or modify the color characteristics of a food product (or portion thereof), such as, but not limited to, a chocolate confection. In certain aspects, the edible colorant composition is in liquid form. In other aspects, the edible colorant composition is in solid form created for example by drying the liquid colorant composition.

In certain aspects, the edible colorant composition comprises from about 0.005% to about 100%, or from about 0.005% to about 80%, or from about 0.005% to about 60%, or from about 0.005% to about 50%, or from about 0.005% to about 40%, or from about 0.005% to about 30%, or from about 0.005% to about 20%, or from about 0.005% to about 10%, or from about 0.5% to about 30%, or from about 0.5% to about 5%, or from about 0.5% to about 15%, or from about 10% to about 25%, or from about 20% to about 30% by weight of Compound I. In certain aspects, the edible colorant composition comprises from about 1% to about 80%, or from about 10% to about 70% by weight of the edible colorant composition, or from about 20% to about 60% by weight of Compound I. In certain aspects, the edible colorant composition comprises from about 30% to about 50% by weight of Compound I. In certain aspects, the edible colorant composition comprises from about 40% to about 50% by weight of Compound I. In certain aspects, the edible colorant composition comprises from about 0.005% to about 10%, from about 0.005% to about 1%, or from about 0.005% to about 0.1% by weight of Compound I. In certain aspects, the edible colorant composition comprises greater than about 0.5%, greater than about 1%, greater than about 5%, greater than about 10%, greater than about 15%, greater than about 20%, greater than about 25%, or greater than about 30% of Compound I.

In further aspects, Compound I is present in an amount of from about 0.05% to about 0.1% (w/w) (e.g., from about 0.05% to about 0.09% (w/w), from about 0.06% to about 0.08% (w/w), or from about 0.07% to about 0.1% (w/w)) of an anthocyanin chromophore content of the edible colorant composition. In other aspects, Compound I is present in an amount of from about 5% to about 35% (w/w) (e.g., from about 5% to about 15% (w/w), from about 5% to about 20% (w/w), from about 5% to about 30% (w/w), from about 10% to about 25% (w/w), from about 10% to about 35% (w/w), from about 20% to about 35% (w/w)) of an anthocyanin chromophore content of the edible colorant composition.

3.1. pH

In certain aspects, the pH of the colorant composition of the present disclosure comprises at least one pH adjusting ingredient. The pH of the colorant composition can be adjusted using food grade acids or bases (e.g., food grade sodium hydroxide) and/or the pH can be adjusted with the use of food grade buffers (e.g., phosphate buffer) or food grade acids or bases can be used in combination with food grade buffers to adjust pH.

Non-limiting examples of pH adjusting ingredients include potassium and sodium-based buffers. In certain aspects, the pH adjusting ingredient can include potassium phosphate, sodium acetate, or other food grade buffers known in the art. Another pH adjustment component can be, for example, sodium hydroxide, which is a source of an alkali metal ion.

In certain aspects, the colorant composition has a pH of about 5.0 to about 8.0. In certain aspects, for a blue colorant composition, the pH can be from about 5.0 to about 8.0, or from about 6.0 to about 8.0, or from about 7.0 to about 8.0. In certain non-limiting aspects, the pH of the pH adjusting ingredient present within a colorant composition, e.g., a blue colorant composition, is about 6.0. In certain aspects, the pH of the pH adjusting ingredient present within a colorant composition, e.g., a blue colorant composition, is about 6.5. In certain aspects, the pH of the pH adjusting ingredient present within a colorant composition, e.g., a blue colorant composition, is about 7.0. In certain aspects, the pH of the pH adjusting ingredient present within a colorant composition, e.g., a blue colorant composition, is about 7.5. In certain aspects, the pH of the pH adjusting ingredient present within a colorant composition, e.g., a blue colorant composition, is about 8.0.

3.2. Metal Ions

In certain aspects of the present disclosure, the colorant composition further comprises at least one metal ion or cation or salt form thereof. In certain aspects, the metal ion can bind to one or more hydroxyl groups present on the B-ring of the cyanidin chromophore portion of the anthocyanin molecule. Complexation of Compound I with a metal ion, $Al^{3+}$ for example, causes a bathochromic shift in the color to produce the true cyan blue color of the color composition.

In certain aspects, the metal ion can be a multivalent metal ion such as, but not limited to, a divalent metal ion or a trivalent metal ion. Non-limiting examples of a divalent cation include $Fe^{2+}$. In certain aspects, the metal cation is a trivalent cation such as $Al^{3+}$ or $Fe^{3+}$. In certain aspects, the metal ion is $Al^{3+}$. In certain aspects, the metal ion is $Fe^{2+}$. In certain aspects, the metal ion is $Fe^{3+}$.

In certain aspects, the metal ion can be present in the colorant composition as a metal salt. For example, and not by way of limitation, the metal salt can be $AlCl_3$, $Al_2(SO_4)_3$, $FeCl_3$, or $FeCl_2$.

In certain aspects, there can be a food grade metal ion or salt form thereof. In certain aspects, the metal ion or salt form thereof can be selected to be suitable for use in an edible product, e.g., $Al^{3+}$ or $Fe^{3+}$.

In certain aspects, the molar ratio of Compound I to metal ion is about 1:100, or about 1:10, or about 1:1, or about 1:0.5, or about 1:0.3, or about 1:0.25, or about 1:0.1, or about 1:0.01, or about 1:0.001, or less than about 1:0.0001.

3.3 Combination of Colorant Compositions

The present disclosure also provides for compositions comprising a combination of colorants. In certain non-limiting examples, the blue colorant as disclosed herein can be combined with one or more different yellow colorants to obtain a bright and true green colorant. A desirable bright and true green color is obtained by the combination of FD&C Yellow No. 5 and FD&C Blue No. 1. A mixture of FD&C Yellow No. 5 and FD&C Blue No. 1 at a 4:1 ratio (by weight) in solution, when applied in food products, gives a particularly desirable green color. Such an artificial green color applied to a hard panned confection showed an L*=60, a*=−46, b*=43, C*=63 and h°=137 and is a desirable and true green color in a confectionery product. Heretofore, it has been impossible to achieve any color remotely close to this color achieved with the artificial colors noted.

The color of non-artificial colored products, for example hard panned candies, can be measured and compared to values of an ideal colored product from artificial colors. FIG. 11 presents data for two different non-artificial green colored candies along with a desirable artificial green colored candy. It is also possible to calculate the ΔE values for these non-artificial colored candies relative to the artificial reference. The product colored with red cabbage at pH 8 plus turmeric has a ΔE of 52 compared to the artificial reference while the *Spirulina* plus turmeric panned candy has a ΔE of 31 compared to the artificial reference candy. The *Spirulina* plus turmeric sample represents the state of the art for producing green color using non-artificial colorants these data clearly shows how far away these products are from the ideal candy.

In certain aspects, Compound I at pH 7 plus from about 0.3 to about 1.0 mol. equiv. (e.g., ⅓ mol. equiv. or 1 mol. equiv.) of $Al^{3+}$, $Fe^{2+}$, or $Fe^{3+}$ provides color characteristics as discussed below that mimic closely those characteristics of FD&C Blue No. 1 (cyan blue).

Such color characteristics combined with yellow colorants can lead to a bright and true green hue. Exemplary non-artificial yellow colorants useful for the edible colorant compositions described herein include, but are not limited to, curcuminoids (e.g., from turmeric), carotenoids (e.g., from saffron, gac, and *gardenia*), annatto (e.g., from achiote) and combinations thereof. For instance, the non-artificial yellow colorant can be turmeric, safflower (Carthamus), beta carotene, or *gardenia* yellow. In certain aspects, safflower is used as the non-artificial yellow colorant to produce a bright and true green hue.

Preferably, the non-artificial yellow colorant has a hue angle of about 900 or greater. At hue angles greater than about 90°, the yellow colorant includes comparatively less red and more green in the undertones, which results in a better green colorant composition when mixed with blue. At hue angles below about 90°, the yellow colorant includes comparatively more red, which results in a muddier green due to brown undertones in the green. Exemplary yellow colorants that may be useful for the edible colorant compositions are provided below in Table 1. Values are taken from the non-artificial and synthetic yellow colorants at different concentrations on finished panned candies.

TABLE 1

Non-artificial yellow colorants on panned candies

| Different colorant powders and use rates (wt %) | H angle of finished panned candies |
|---|---|
| Beta-Carotene 1 (0.5%) | 75.51 |
| Beta-Carotene 2 (0.5%) | 84.10 |
| Beta-Carotene 3 (0.01%) | 95.03 |
| Beta-Carotene 3 (0.03%) | 90.84 |
| Beta-Carotene 4 (0.1%) | 87.70 |
| Beta-Carotene 4 (0.05%) | 91.41 |

TABLE 1-continued

Non-artificial yellow colorants on panned candies

| Different colorant powders and use rates (wt %) | H angle of finished panned candies |
|---|---|
| Safflower 1 (0.8%) | 90.39 |
| Safflower 2 (1%) | 104.68 |
| Safflower 3 (1%) | 93.71 |
| Safflower 4 (2%) | 100.33 |
| Safflower 5 (2%) | 90.24 |
| Safflower 6 (1%) | 85.66 |
| Safflower 7 (0.5%) | 95.64 |
| Safflower 7 (0.25%) | 101.06 |
| Safflower 8 (1.5%) | 92.72 |
| Lutein 1 (0.5%) | 72.26 |
| Lutein 1 (0.1%) | 87.70 |
| Lutein 1 (0.05%) | 88.81 |
| Curcumin 1 No. 26295 (1%) | 80.58 |
| Curcumin 2 (0.2%) | 90.69 |
| Curcumin 2 (0.4%) | 87.09 |
| Curcumin 3 | 93.73 |
| Curcumin 4 (0.2%) | 83.41 |
| Curcumin 4 (0.25%) | 81.98 |
| FD&C - Yellow 5 (0.2%) artificial | 81.29 |
| FD&C - Yellow 5 (0.1%) artificial | 86.45 |
| FD&C - Yellow 5 (0.05%) artificial | 91.53 |
| FD&C - Yellow 5 (0.0282%) artificial | 93.19 |
| FD&C - Yellow 5 (0.02%) artificial | 96.26 |
| Gardenia Yellow (0.4%) | 82.40 |

Further non-artificial yellow colorants known in the art aside from those listed in the above table may also be useful for the edible colorant compositions disclosed herein.

4. Color Characteristics

As embodied herein, color characteristics of the presently-disclosed non-artificial blue anthocyanin-containing colorants, can be determined. Such color characteristics can include hue, chroma, purity, saturation, intensity, vividness, value, lightness, brightness and darkness, and color model system parameters used to describe these properties, such as Commission Internationale de l'Eclairage CIE 1976 CIELAB color space $L^*a^*b^*$ values and CIELCH color space $L^*C^*h^\circ$ values.

For example, $L^*a^*b^*$ values consist of a set of coordinate values defined in a three-dimensional Cartesian coordinate system. $L^*$ is the value, or lightness, coordinate. $L^*$ provides a scale of lightness from black (0 $L^*$ units) to white (100 $L^*$ units) on a vertical axis, $a^*$ and $b^*$ are coordinates related to both hue and chroma, $a^*$ provides a scale for greenness (−$a^*$ units) to redness (+$a^*$ units), with neutral at the center point (0 $a^*$ units), on a horizontal axis; $b^*$ provides a scale for blueness (− $b^*$ units) to yellowness (+$b^*$ units), with neutral at the center point (0 $b^*$ units), on a second horizontal axis perpendicular to the first horizontal axis. The three axes cross where $L^*$ has a value of 50 and $a^*$ and $b^*$ are both zero.

Figure 6:
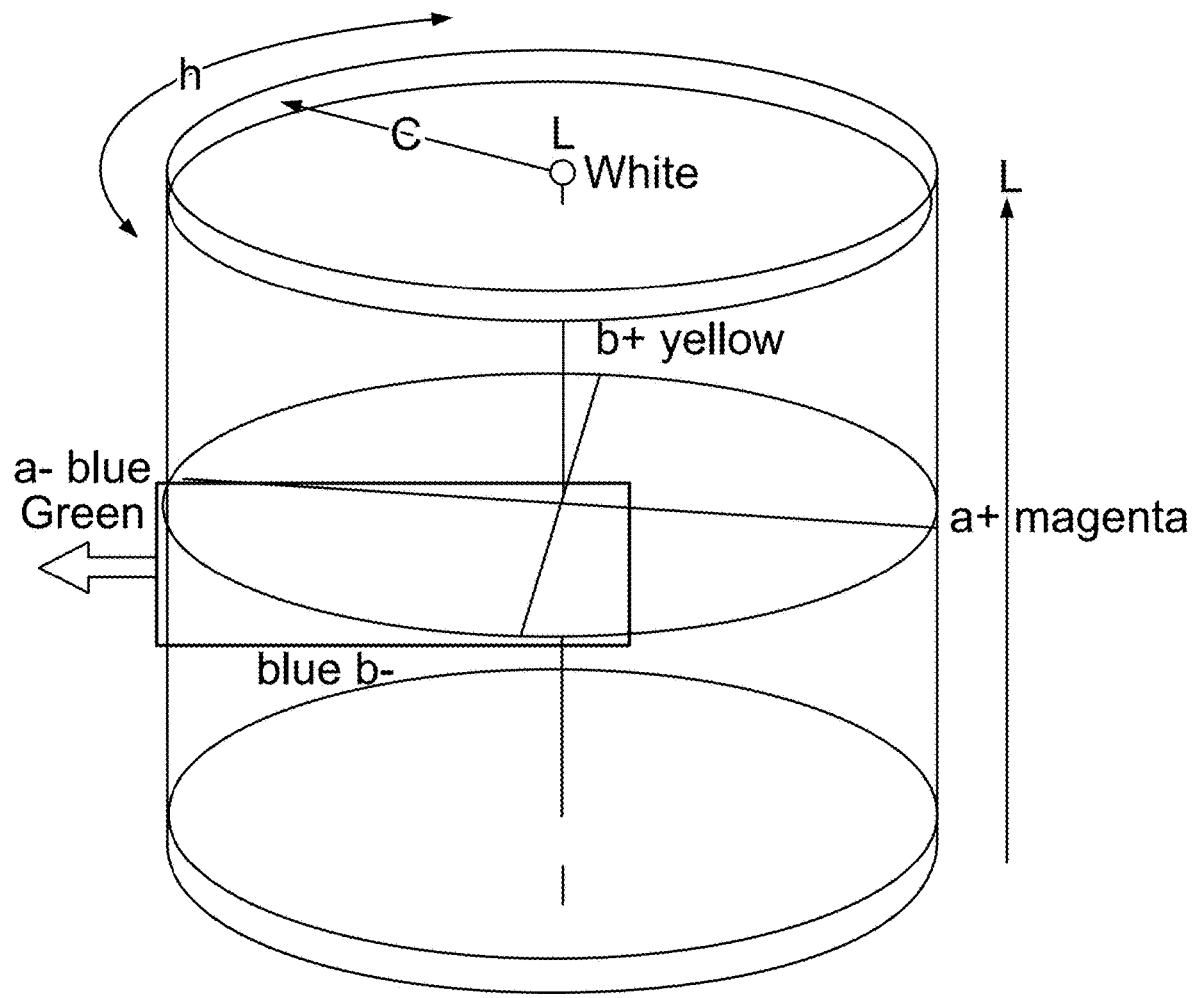
FIG. 6 shows CIELCH color space L*C*h° values.

$L^*C^*h^\circ$ values consist of a set of coordinate values defined in a three-dimensional cylindrical coordinate system. See FIG. 6. $L^*$ is the value, or lightness, coordinate. $L^*$ provides a scale of lightness from black (0 $L^*$ units) to white (100 $L^*$ units) on a longitudinal axis. $h^\circ$ is the hue coordinate. $h^\circ$ is specified as an angle from 0° to 3600 moving counterclockwise around the $L^*$ axis. Pure red has a hue angle of 0°, pure yellow has a hue angle of 90°, pure green has a hue angle of 180°, and pure blue has a hue angle of 270°. The $C^*$ coordinate represents chroma and is specified as a radial distance from the $L^*$ axis. $C^*$ provides a scale from achromatic, i.e., neutral white, gray, or black, at the $L^*$ axis (0 $C^*$ units) to greater purity of hue as the coordinate moves away from the $L^*$ axis (up to 100 or more $C^*$ units). $C^*$ and $h^\circ$ can be calculated from $a^*$ and $b^*$ using Equations 1 and 2:

$$C^* = (a^{*2} + b^{*2})^{0.5} \quad (1)$$

$$h^\circ = \arctan(b^*/a^*) \quad (2)$$

"Delta E," "$\Delta E_{ab}^*$," or "$\Delta E$" is a measure of the magnitude of total color difference between two colors represented in CIELAB $L^*a^*b^*$ color space. It has been reported that an experienced color observer cannot distinguish any difference between two colors when the $\Delta E$ is about 2.3 or less. The $\Delta E$ of two different colors with $L^*a^*b^*$ values, $L^*_1 a^*_1 b^*_1$ and $L^*_2 a^*_2 b^*_2$, is calculated using Equation 3:

$$\Delta E_{ab}^* = \sqrt{(L^*_1 - L^*_2)^2 + (a^*_1 - a^*_2)^2 + (b^*_1 - b^*_2)^2} \quad (3)$$

The CIELAB $L^*a^*b^*$ and CIELCH $L^*C^*h^\circ$ values of FD&C Blue No. 1 at seven different concentrations in aqueous solution are presented in Table 2.

TABLE 2

Aqueous solutions

| Concentration | L* | a* | b* | C* | h° |
|---|---|---|---|---|---|
| 1000 ppm | 10.49 | 15.82 | −44.99 | 47.69 | 289.37 |
| 500 ppm | 24.07 | 9.80 | −58.18 | 59.00 | 279.56 |
| 100 ppm | 52.43 | −29.57 | −57.38 | 64.55 | 242.74 |
| 50 ppm | 63.64 | −43.71 | −48.31 | 65.14 | 227.86 |
| 10 ppm | 84.25 | −37.23 | −23.42 | 43.99 | 212.17 |
| 5 ppm | 90.65 | −24.40 | −14.28 | 28.27 | 210.33 |
| 1 ppm | 97.69 | −6.43 | −3.57 | 7.36 | 209.02 |

The CIELAB $L^*a^*b^*$ and CIELCH $L^*C^*h^\circ$ values of FD&C Blue No. 1 at six different concentrations on panned candies are presented in Table 3.

TABLE 3

Panned candies

| Concentration | L* | a* | b* | C* | h° |
|---|---|---|---|---|---|
| 0.0075% (75 ppm) | 75.53 | −31.53 | −20.34 | 37.52 | 212.82 |
| 0.01% (100 ppm) | 74.64 | −29.29 | −16.23 | 33.49 | 208.99 |
| 0.02% (200 ppm) | 66.02 | −38.22 | −26.76 | 46.65 | 214.99 |
| 0.04% (400 ppm) | 58.64 | −38.68 | −31.67 | 50.00 | 219.31 |
| 0.05% (500 ppm) | 56.29 | −38.30 | −32.44 | 50.20 | 220.27 |
| 0.1% (1000 ppm) | 47.94 | −31.89 | −36.45 | 48.43 | 228.82 |

These $L^*a^*b^*$ and $L^*C^*h^\circ$ values for FD&C Blue No. 1 can be used as target values for a non-artificial blue anthocyanin-containing colorant alternative to FD&C Blue No. 1. Non-artificial blue colorants having $L^*a^*b^*$ values that fall within a $\Delta E$ of 2.3 (defined as the just noticeable difference (JND)) or less from these target values would be expected to provide color characteristics sufficiently similar to those provided by FD&C Blue No. 1 that a human eye could not distinguish the difference in color provided by the non-artificial colorant versus the artificial. However, non-artificial blue anthocyanin-containing colorants having $L^*a^*b^*$ values that fall outside a $\Delta E$ of 2.3 can also be used as a non-artificial substitute for FD&C Blue No. 1. The closer the $L^*a^*b^*$ values for a non-artificial blue colorant come to the artificial target values (i.e., yielding smaller values of $\Delta E$), the better replacement the non-artificial blue anthocyanin-containing colorant will be for FD&C Blue No. 1 in an edible application.

Mathematical models can be generated to represent the color characteristics provided by FD&C Blue No. 1 at any concentration in the L*a*b* and L*C*h° color spaces. For example, the color characteristics may be represented by a segmented line model connecting the L*a*b* or L*C*h° data points of Table 2 or 3. A line (L) connecting two points ($P_1$ and $P_2$) representing two different concentrations of FD&C Blue No. 1 in L*a*b* space can be calculated with the following Equation 4:

$$L=\{P_1+t*(P_2-P_1)\} \qquad (4)$$

wherein, $P_1$ is (L*$_1$, a*$_1$, b*$_1$); $P_2$ is (L*$_2$, a*$_2$, b*$_2$); and t is any real number.

Consequently, a segmented line model for FD&C Blue No. 1 in L*a*b* color space can be interpolated based on the L*a*b* values for the seven different concentration points using Equation 4 as follows.

For concentrations between 500 and 1000 ppm, 0<t<1:
L*=10.49+13.58*t
a*=15.82+−6.02*t
b*=−44.99+−13.19*t For concentrations between 100 and 500 ppm, 0<t<1
L*=24.07+28.36*t
a*=9.80+−39.37*t
b*=−58.18+0.80*t For concentrations between 50 and 100 ppm, 0<t<1
L*=52.43+11.21*t
a*=−29.57+−14.14*t
b*=−57.38+9.07*t For concentrations between 10 and 50 ppm, 0<t<1
L*=63.64+20.61*t
a*=−43.71+6.48*t
b*=−48.31+24.89*t For concentrations between 5 and 10 ppm, 0<t<1
L*=84.25+6.40*t
a*=−37.23+12.83*t
b*=−23.42+9.14*t For concentrations between 1 and 5 ppm, 0<t<1
L*=90.65+7.04*t
a*=−24.40+17.97*t
b*=−14.28+10.71*t In addition, colors having L*a*b* values falling within a specific ΔE range of the FD&C Blue No. 1 model can be mathematically modeled in L*a*b* color space. Selecting a specific ΔE value, e.g., 15, with respect to FD&C Blue No. 1 and plotting that ΔE in L*a*b* color space results in a tube-like structure around the FD&C Blue No. 1 segmented line model.

To determine whether a point (Xo) in L*a*b* color space falls within a specific ΔE value from the FD&C Blue No. 1 model, the minimum distance, $d_{min}$, between the point and the model (represented by line segment $X_1$ to $X_2$) must be calculated. Equation 5 can be used to calculate $d_{min}$:

$$d_{min} = \frac{|(x_0 - x_1) \times (x_0 - x_2)|}{|x_2 - x_1|} \qquad (5)$$

wherein x denotes the cross product of two vectors and vertical bars denote the magnitude of a vector expression.

If the value of $d_{min}$ is less than or equal to the chosen ΔE value, then the point in L*a*b* color space falls within that specific ΔE value from the FD&C Blue No. 1 model.

The colorant compositions disclosed herein include non-artificial blue colorant compositions comprising a fraction of anthocyanins sourced from a non-artificial product, wherein the colorant composition can provide color characteristics having a ΔE value of about 10-12, or less, compared to the color characteristics defined by the segmented line defined by the L*a*b* values of 50 ppm and 100 ppm FD&C Blue No. 1 in aqueous solution. In other aspects the ΔE value may be less than about 17, about 16, about 15, about 14, about 13, about 12, about 11, about 10, about 9, about 8, about 7, about 6, about 5, about 4, or about 3. The colorant composition may also be measured against a plurality of segmented lines defined by different concentrations of FD&C Blue No. 1 in aqueous solution, e.g., 1 ppm and 5 ppm, 5 ppm and 10 ppm, 10 ppm and 50 ppm, 100 ppm and 500 ppm, 500 ppm and 1000 ppm, or any combination selected therefrom. However, if ΔE value is used to describe the colorant composition, only one segmented line is required to define the colorant composition.

4.1. Visible Lambda Max of Compound I

One of the ways in which a colorant is defined is via absorbance in the visible region of the absorption spectrum and the lambda max ($\lambda_{max}$), which is the wavelength corresponding to the maximal absorbance value of the visible spectra for a solution. Using a $\lambda_{max}$ value and comparison of absorbance over wavelength curves, it is possible to measure, for example, violet contributions.

Figure 4:
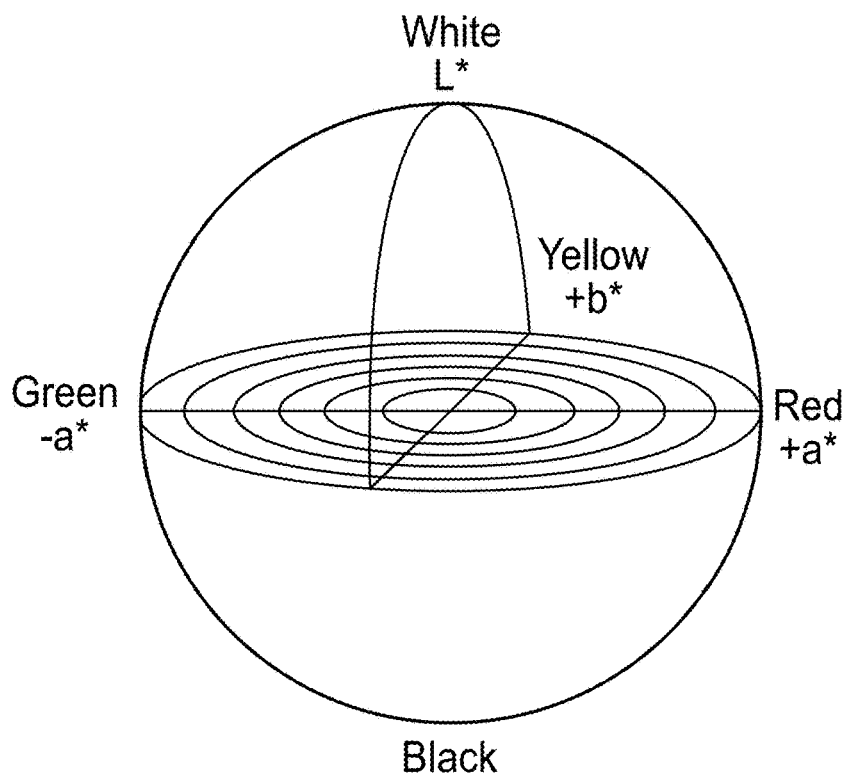
FIG. 4 shows a three-dimensional representation of the CIELAB L*a*b* color space.

Other methods can be used to capture color through measurement of solutions in a colorimeter. For example, a Konica Minolta—CM-5 Spectrophotometer can be used in conjunction with appropriate software, for example, color data software CM-S100W and/or SpectraMagic NX. L*a*b*, C, and H (hue angle) values can be obtained for each measurement, and color comparisons can be plotted on an a*b* space (cross section of a spherical color space) at a set value for L*. See FIG. 4; see Example 1.

In certain aspects, a solution of the colorant (e.g., Compound I and a metal ion in a solution having a pH of from about 6.0 to about 8.0) will have a measured absorbance of between 0.5 and 1.0 in a cuvette having a path length of, e.g., 1 cm, or from about 0.2 mm to about 10 mm, e.g., 0.2 mm, 0.3 mm, 0.5 mm, 0.7 mm, 1 mm, 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, or 10 mm, and will have an absorbance maximum (lambda max) of between about 630 nm and about 655 nm, between about 630 and about 650 nm between about 630 nm and about 647 nm, between about 635 and about 647 nm, between about 640 nm and about 647 nm, between about 635 nm and about 655 nm, between about 640 nm and about 655 nm, between about 645 and about 655 nm, between about 650 nm and about 655 nm, or between about 643 nm and about 647 nm. For example, the lambda max value can be determined from a dilute solution of the colorant, which will have an absorbance between 0.5 and 1.0 in a cuvette having a path length of 0.5 cm or 1 cm. For more concentrated solutions of the colorant, the lambda max value will need to be taken in a cuvette having a shorter path length. The path length of the cuvette is chosen by aiming for an absorbance between 0.5 to 1.0 so that the lambda max value can be determined.

4.2. Calculating the Violet Component of a Blue Colorant

Violet components of a blue colorant can be determined according to the following method. The violet region of the visible light spectrum is defined as the absorbance over the range from 500 nm to 600 nm. A sample solution is prepared such that the maximum absorbance in a 1 cm (10 mm) cuvette is about 0.75. For the methods described herein, the cuvette can have a path length of from about 0.2 mm to about 10 mm, e.g., 0.2 mm, 0.3 mm, 0.5 mm, 0.7 mm, 1 mm, 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, or 10 mm, depending on the concentration of the solution. The area under the curve of absorbance over wavelength is then calculated for violet contribution. In order to compare data between different spectra, the different spectral data is normalized to allow for direct comparison. See Example 2.

4.3. Colorimetric data for Compound I

Figures 8A, 8B:
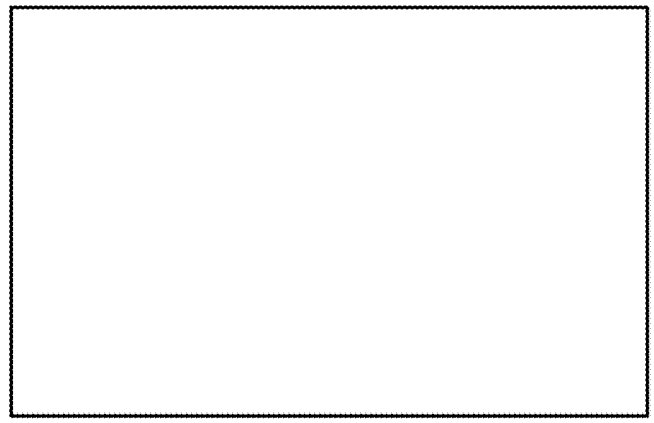
FIG. 8A provides a visual comparison of the colors provided by exemplary Compound I with less than 0.5 mol. equiv. metal ion in aqueous solution at pH 3 to pH 8.
FIG. 8B shows the CIELAB color space L*a*b* values and the CIELCH color space L*C*h° values of exemplary Compound I with less than 0.5 mol. equiv. $Al^{3+}$ anthocyanin solutions from pH 3 to pH 8.
Figure 9A:
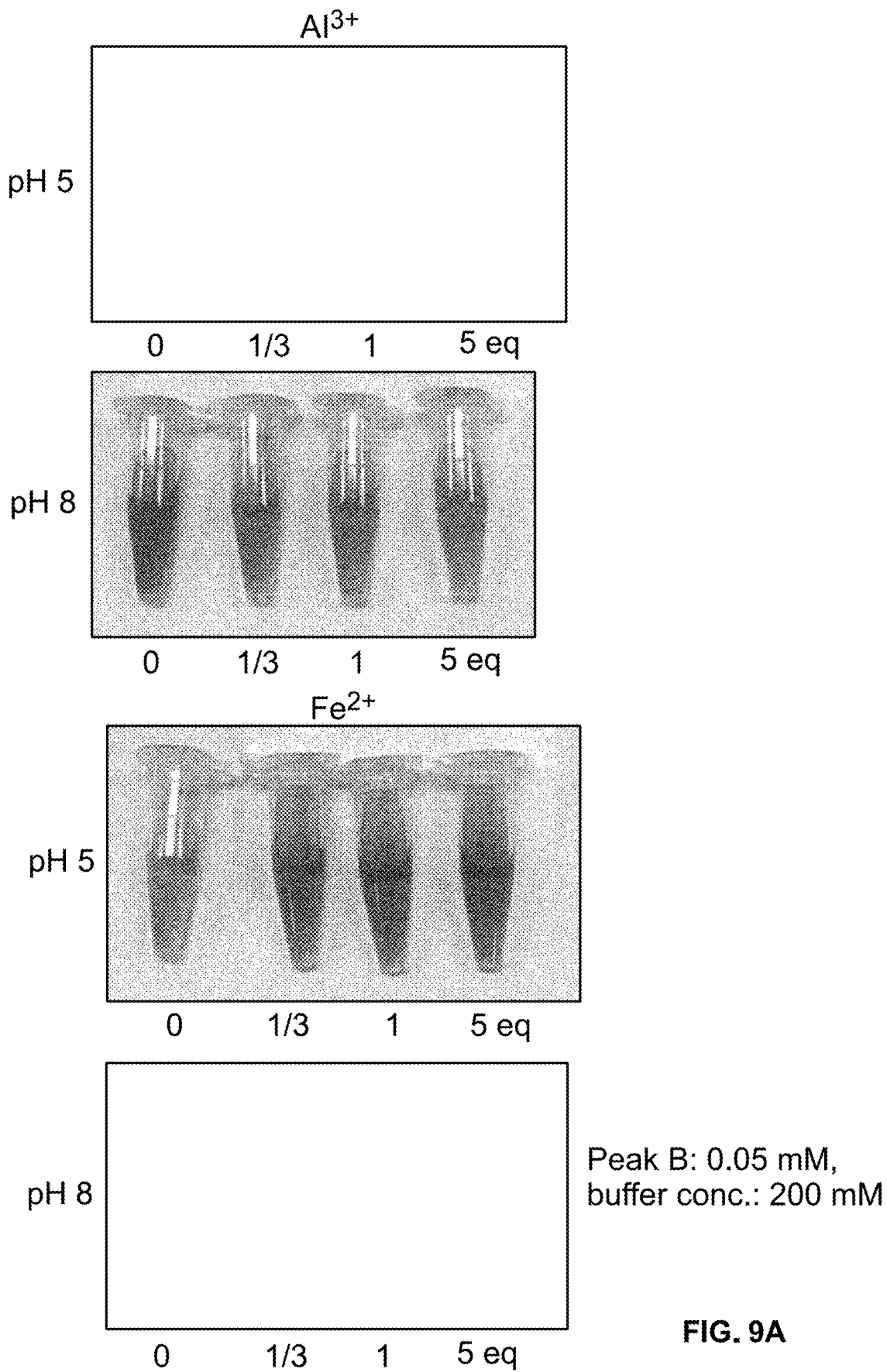
FIG. 9A shows the color properties of Compound I with metal ions $Al^{3+}$ and $Fe^{2+}$ at pH 5 and pH 8. Provided is a visual comparison of the color properties of Compound I at pH 5 and pH 8 with concentrations of added $Al^{3+}$ and $Fe^{2+}$ ions of ⅓, 1 and 5 mol. equiv. of the Compound I concentration versus Compound I solutions with no metal ions.

Similar to FIG. 1A, FIG. 8A provides a visual comparison of the colors provided by exemplary Compound I with addition of less than 0.5 mol. equiv. of metal ions in aqueous solution at pH 3 to pH 8. FIG. 8B shows the CIELAB color space L*a*b* values and the CIELCH color space L*C*h° values of exemplary Compound I with less than 0.5 mol. equiv. metal ions pH 3 to pH 8.

Colorimetric data in solution for Compound I at pH 7 plus a metal ion has been calculated in relation to FD&C Blue No. 1 as shown in Example 3 below.

The L* value for Compound I plus a metal ion at pH 6 to 8 can range from about 70 to about 90, or from about 72 to about 86, or from about 72 to about 80, or from about 73 to about 75. In a specific aspect, the L* value is about 73.

In certain aspects, Compound I plus a metal ion has a* and b* values (from L*a*b* color space) such that a* ranges from about −20 to about −47, and b* ranges from about −15 to about −30, or more preferably where a* ranges from about −25 to about −35 and b* ranges from about −15 to about −25 or most preferably where a* ranges from about −28 to about −32 and b* ranges from about −15 to about −20.

A computed ΔE value for a solution of Compound I with 1.0 mol. equiv. $Al^{3+}$ at pH 8 or pH 7 as compared to FD&C Blue No. 1 is less than about 17, wherein FD&C Blue No. 1 has an L* value of about 90. In certain aspects, the computed ΔE value as compared to FD&C Blue No. 1 is less than about 17, wherein L* is about 83. In certain aspects, the ΔE is less than about 16, or less than about 15, or less than about 14, or less than about 13, or less than about 12, or less than about 11, or less than about 10, or less than about 9, or less than about 8, or less than about 7, or less than about 6, or less than about 5, or less than about 4, or less than about 3. In certain aspects, the delta E can range from about 8 to about 10.

In certain aspects, the hue angle (from L*C*h° color space) for Compound I at pH 7 plus a metal ion can range from about 2070 to about 230°, or from about 2070 to about 225°, or from about 2070 to about 220°, or from about 2070 to about 215°, or from about 2070 to about 2110, or from about 2080 to about 210°.

In certain aspects, the colorant solution has a reduced absorbance and violet contribution in the range of about 500 nm to about 600 nm. In certain aspects, the absorbance (area under curve) in the range of 500 nm to 600 nm is less that about 29, less than about 28, less than about 26, less than about 24, less than about 22 or less than about 21, or less than about 20.

The violet region of visible light spectrum defined as the range from 500 nm to 600 nm. The violet color contribution to a blue color is measured by integrating the area under the visible absorbance curve over the wavelength range from 500 to 600 nm. The value calculated represents the area under the curve (area units*wavelength) and is a measure of the violet hue present in the blue color. This violet color contribution can be compared for one colorant versus another and in this case will be compared to the violet color for the spectra of a reference solution of FD&C Blue No. 1. The method for calculation is described in detail in Example 2.

5. Food Products

The non-artificial blue anthocyanin-containing colorants of the present disclosure can be added to food products, for example, to alter the color characteristics of the food product. For example, and not by way of limitation, the colorant can be used within a coating (i.e., within an edible colorant composition comprising the colorant) for confections to produce a blue-colored coating. Alternatively, or additionally, the non-artificial blue anthocyanin-containing colorant can be combined with another colorant, e.g., a non-artificial yellow colorant, to produce a non-artificial green colorant.

In certain aspects, the colorants of the present disclosure can color a food product or a portion thereof.

In certain aspects, the non-artificial blue anthocyanin-containing colorants can be used in a wide variety of edible products. Non-limiting examples of suitable food products include chocolates, chewing gum compositions, hard and soft confectionery products, dairy products, food products of the beverage category where the product is at about a neutral pH, food products of the frozen food category including frozen dairy products, pharmaceuticals and food categories described herein.

As used herein, "beverage category" can refer to beverages, beverage mixes and concentrates, including but not limited to, alcoholic and non-alcoholic ready to drink and dry powdered beverages, where the beverage is at about a neutral pH. Additional non-limiting examples of beverages can include carbonated and non-carbonated beverages, e.g., sodas, fruit or vegetable juices.

As used herein, "frozen food category" refers to chilled or frozen food products that have a neutral pH. Non-limiting examples of food products of the frozen food category can include ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yogurt, artisanal ice cream, frozen ready meals, frozen pizza, chilled pizza, frozen soup, frozen pasta, frozen processed red meat, frozen processed poultry, frozen processed fish/seafood, frozen vegetables, frozen processed vegetables, frozen meat substitutes, frozen potatoes, frozen bakery products and frozen desserts.

As used herein, "snack food category" refers to any food that can be a light informal meal including, but not limited to sweet and savory snacks and snack bars, where the foods have a neutral pH. Examples of snack foods include, but are not limited to, fruit snacks, chips/crisps, extruded snacks, tortilla/corn chips, popcorn, pretzels, nuts and other sweet and savory snacks. Examples of snack bars include, but are not limited to granola/muesli bars, breakfast bars, energy bars, fruit bars, and other snack bars.

5.1. Confectionery Products

In certain aspects, an edible colorant composition (e.g., comprising the non-artificial blue anthocyanin-containing colorants described herein) of the presently disclosed subject matter can be incorporated into a confectionery product. Non-limiting examples of confectionery products include cakes, cookies, pies, candies, chocolates, chewing gums, gelatins, ice creams, sorbets, puddings, jams, jellies, cereal and other breakfast foods, canned fruits and fruit sauces.

In certain aspects, an edible colorant composition of the present disclosure can be incorporated into the confections by admixing the edible colorant composition into a confectionery product, e.g., a hard or soft confectionery product. For example, and not by way of limitation, the present disclosure provides methods for enhancing or modulating the blue color of an edible product that comprises (a) providing at least one food product, or a precursor thereof, and (b) combining the food product or precursor thereof with one or more blue edible colorant compositions, disclosed herein, so as to form a modified edible food product. Additionally, the methods can be used for enhancing or modulating the green color of an edible product by (a) providing at least one food product, or a precursor thereof, and (b) combining the food product or precursor thereof with one or more green edible colorant compositions, e.g., an edible colorant composition comprising a blue colorant and a yellow colorant, so as to form a modified edible food product.

In certain aspects, certain amounts of an edible colorant composition of the present disclosure can be incorporated into a confectionery product. The amount of the edible colorant composition that is used can depend on a number of factors including, but not limited to, the type of bulking agent or carrier employed, method of application, use rate, the type of colorant employed and the intensity of color desired.

In certain aspects of the present disclosure, the edible colorant composition is admixed with a confection or a component of a confection, where the edible colorant composition is added in amounts to give blue color that can range in intensity from a very pale light cyan blue through to a very dark cyan blue color. The edible colorant composition can be pure or nearly pure Compound I, e.g., with metal ion, or the edible colorant composition can contain other ingredients to aid in the incorporation of Compound I into various types of food products. In certain aspects, the edible colorant composition may contain for example from about 10% to about 30% of Compound I. In other aspects, the edible colorant composition may contain from about 0.005% to about 0.01% of Compound I. Depending on the amount of Compound I contained in the edible colorant composition, more or less edible colorant composition can be used to achieve the desired color properties in the confection or component of the confection. Such amounts result in an effective use rate, which can be expressed as the percent (weight/weight (w/w)) of Compound I added to the confection, confection component, food product or portion thereof. In certain aspects, the effective use rate of Compound I is an amount of from about 0.0001% to about 10% (w/w), or from about 0.0005% to about 1.0% w/w, or from about 0.001% to about 0.5% w/w, or from about 0.005% to about 0.2% w/w, or from about 0.01% to about 0.1% w/w, or from about 0.02% to about 0.08% w/w, and values in between.

In certain aspects, the edible colorant composition of the present disclosure can be incorporated in a confectionery product of the dragée type, which can include a core and a layer of granulated sugar. Non-limiting examples of the type of cores in a dragée type confectionery product can include a non-artificial center (e.g., almond, hazelnut or groundnut) or a "confectionery" center (e.g., caramel, fondant or chocolate). The cores can then be coated with chocolate, with successive layers of sugars or other substances such as polyols (e.g., erythritol, xylitol, maltitol, or sorbitol), gums and non-artificial polymers, that can further include one or more color compositions of the present disclosure. In certain aspects, the present disclosure provides for confectionery products that are coated with a blue edible color composition disclosed herein. In other aspects, the present disclosure provides for confectionery products that are coated with a green edible color composition disclosed herein.

In certain aspects, the methods for manufacturing compositions of the dragée type can comprise the deposition of a plurality of sublayers, for example between about 5 and about 50, by a succession of phases of application and drying carried out, for example, in a pan. In a hard panning process, multiple applications of a highly concentrated sugar syrup can be used to build up the uncolored portion of a sugar coating on an edible product center. This can be followed by multiple applications of a concentrated sugar syrup containing an edible colorant composition of the present disclosure. In certain aspects, the hard panning process comprises the repetitive application of thin layers of a coating solution or composition onto an intermixed mass of centers, and the drying of each layer of coating solution or composition during which the sugar in the coating crystallizes between the applications of layers. Additional non-limiting examples of methods for producing hard panned confectionaries are provided in International Patent Publication Nos. WO 2014/150438 and WO 2014/152417, the disclosures of which are incorporated herein by reference.

In certain aspects, where a coating is to be colored, an edible colorant composition of the present disclosure can be added to the coating solution in the later stages of the coating process. For example, and not by way of limitation, the edible colorant composition comprises a monoacylated anthocyanin, a metal ion, or salt form thereof, and a pH adjusting ingredient having a pH of about 6 to about 8. For a hard panned confectionery, following the application of a number of layers of the uncolored sugar syrup to build up the sugar coating, a number of applications of a sugar syrup comprising an edible colorant composition, disclosed herein, are applied to provide the color coat. In certain aspects, the color coat can require 30 or more applications of a colored coating comprising the edible colorant composition solution to achieve the desired color.

In certain aspects, when an edible colorant composition is included in one or more sugar syrups used for hard panned coating, the hard panned coating has a visible color provided by the edible colorant composition. A hard panned confection comprising an edible product center coated with this same hard panned coating also has a visible color provided by the edible colorant composition. In certain aspects, the hard panned coating has a blue color, and a hard panned confection coated with this same hard panned coating has a blue color. The blue color can be provided, at least in part, by a blue edible colorant composition, disclosed herein, incorporated in the coating.

In certain aspects, the hard panned coating has a green color, and a hard panned confection coated with this same hard panned coating has a green color. In certain aspects, the green color can be provided by an edible colorant composition comprising the combination of a blue colorant (e.g., the non-artificial blue anthocyanin-containing colorant of Compound I), disclosed herein, and a non-artificial yellow colorant incorporated in the coating. Examples of non-artificial yellow colorants can include, but are not limited to, curcuminoids (e.g., from turmeric), carotenoids (e.g., from saffron, gac, and *gardenia*), annatto (e.g., from achiote) and combinations thereof. In certain aspects, the non-artificial yellow colorant is derived from turmeric. In other aspects, the non-artificial yellow colorant is *gardenia* yellow.

In certain aspects, the present disclosure provides edible products in the form of a hard coated confectionery product comprising a center core and at least one coating layer that comprises the edible colorant composition disclosed herein and crystallized sugar. For example, and not by way of limitation, the present disclosure provides a hard panned confection that comprises (a) an edible core and (b) a hard panned coating that comprises a plurality of coating layers, wherein at least one of the coating layers comprises an edible colorant composition of the present disclosure. For example, and not by way of limitation, the edible core can comprise chocolate.

6. Methods of Preparation of the Colorant Compositions

Edible colorant compositions containing Compound I can be either liquid or solid preparations. In certain aspects, Compound I is dissolved in water, and the pH is adjusted to a pH value in the range of 6 to 8, with pH 7 being optimal. In certain aspects, from about 0.3 to about 1.0 mol. equiv. (e.g., ⅓ mol. equiv. or 1 mol. equiv.) of an edible aluminum or iron salt is added to the solution. If the final format is to be a dispersible solid, then a suitable dissolved solid such as a maltodextrin is dissolved in the colorant solution. The total dissolved solids should be about 10-15% of the colorant solution, and this material can them be spray dried using an apparatus known in the art. The content of Compound I can be from about 1% to about 10% (e.g., about 2% to about 9%, about 3% to about 7%, about 4% to about 6%, about 2% to about 7%, about 2% to about 4%, about 5% to about 7%, or about 5% to about 9%) of the final dried colorant composition. When a liquid preparation is preferred, it may be preferable to maintain the solution at a low pH, about 2-3 to improve the long term stability of Compound I. From about 0.3 to 1.0 mol. equiv. (e.g., ⅓ mol. equiv. or 1 mol. equiv.) of an edible aluminum or iron salt is added to the solution.

In certain aspect, suitable excipients, known in the art, can be added to help maintain microbiological stability of the color composition. Refrigerated or frozen storage of a liquid color composition is preferred for maximum stability.

EXAMPLES

The presently disclosed subject matter will be better understood by reference to the following Examples, which are provided as exemplary of the disclosure and should not be construed as limiting the scope of the disclosure in any way.

Comparative Example: Compound II, A Different Monoacylated Anthocyanin with Strong Violet Color Component Another monoacylated anthocyanin that can be found in red cabbage in significant abundance is Compound II. This anthocyanin is shown below and its chemical name is 3-O-(2-O-D-β-glucopyranosyl-6-O-(E)-sinapoyl-β-D-glucopyranosyl)-5-O-β-D-glucopyranosylcyanidin.

Compound II is a monoacylated anthocyanin with one sinapic acid attached on the first sugar of the sophorose group which is attached at position 3 of cyanidin and with a glucose group attached at position 5 of cyanidin.

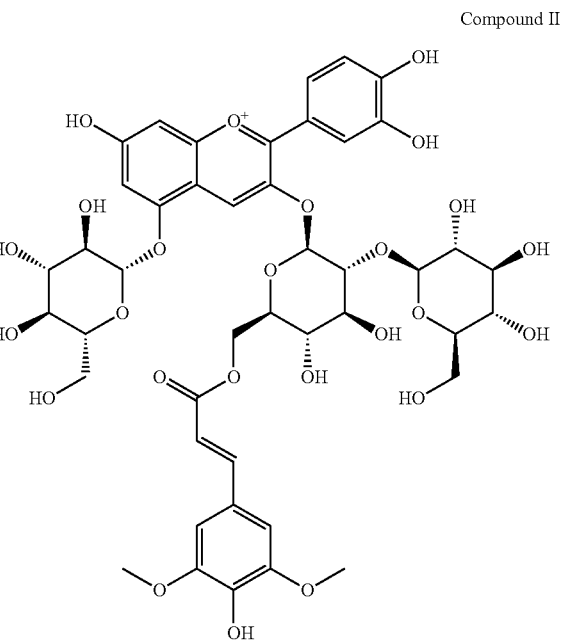

Compound II

Compounds II and I have the same chemical formula and are in fact regio-isomers that differ only in the position where the sinapic acid moiety is bound on the sophorose group.

Figures 10A, 10B:
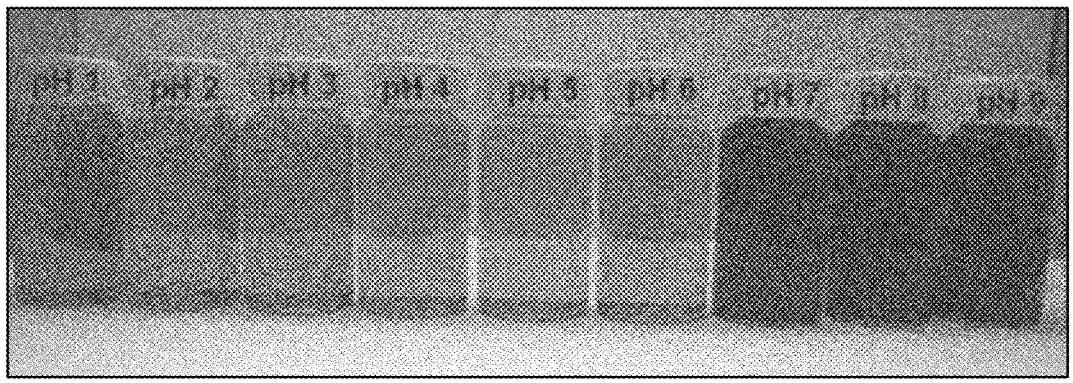
FIG. 10A shows the color properties of Compound II over the pH range from pH 1 to pH 9.
FIG. 10B is a table of the L*a*b*C*h° values for Compound II over the pH range from pH 1 to pH 9.

A series of dilute solutions of Compound II were prepared at pH values ranging from pH 1 to pH 9. The color of these solutions is shown in FIG. 10A. From the absorbance spectra, the L*a*b*C*h° values were calculated and shown in the table in FIG. 10B.

It is clear from these data that the hue angles in the pH 7 to 8 range are much higher than for FD&C Blue No. 1 and Compound I. These higher hue angles reflect the greater amount of violet or red color contribution to the overall blue color of Compound II. This means that Compound II will not yield a good green color when mixed with a yellow colorant. It is quite surprising that Compound I, which is so close chemically to Compound II, is able to deliver such a lower hue angle at pH 7 to 8. The hue angle of Compound I is very close to that of FD&C Blue No. 1.

Additionally, a dilute solution of Compound II with 1.0 mol. equiv. $Al^{3+}$ ion (added as $AlCl_3$) gives an absorbance maximum of about 0.7 using a 1 cm cuvette. The absorption spectra for Compound II was measured using a Konica Minolta—CM-5 Spectrophotometer and the visible absorption spectrum was collected from 400 nm to 700 nm. The violet component was calculated by measuring the area under the curve from 500-600 nm and was determined to be 43.3 for Compound II plus metal ion at pH 8. This is much higher than the violet component of an FD&C Blue No. 1 solution and very different than the value obtained for Compound I. The L*a*b*C*h° values for Compound II plus metal ion at pH 8 were calculated and determined to be L*=28.3, a*=14.67, b*=−51.48, C*=53.53, and h°=285.91 (see data table in FIG. 10B). The $\lambda_{max}$ for Compound II plus metal ion at pH 8 was 602 nm and the ΔE value versus the FD&C Blue No. 1 solution was 43.3. These values show the color to be significantly different from the FD&C Blue No. 1 solution and very different from Compound I even though the two compounds are region-isomers.

Figures 13, 14:
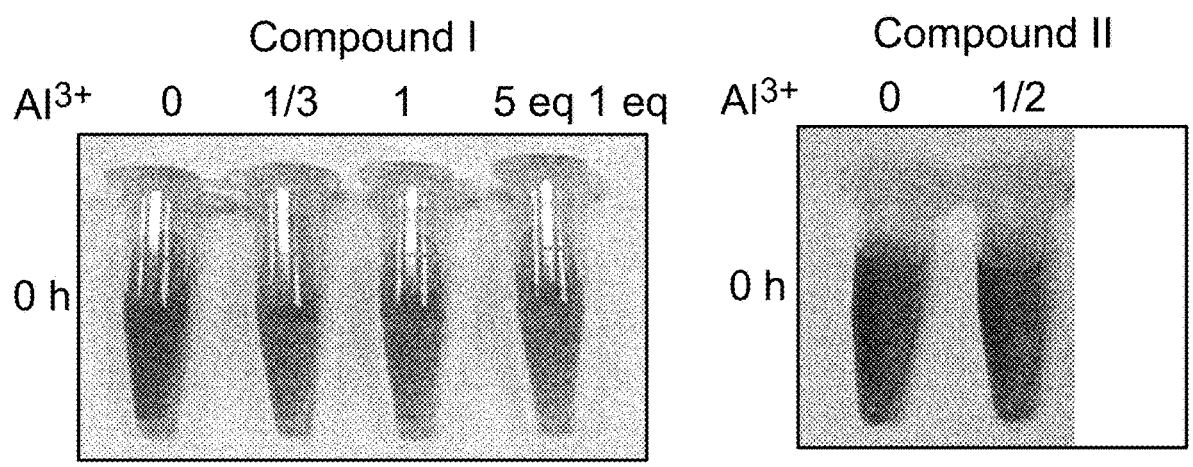
FIG. 13 is a table of measured reflectance as L*a*b*C*h° values for dried and crystallized sucrose syrup drawdowns colored with a range of FD&C Blue No. 1 concentrations used in the sucrose syrup. Measurements were made under a D65 illuminant at a 10° observer angle and SCE.
FIG. 14 provides a visual comparison of the color properties of Compound I and Compound II at pH 8 and effect of $Al^{3+}$ ions at different levels.

The difference in color values between Compound I and Compound II are also seen in FIG. 14. Both anthocyanins are shown at pH 8 and the effects of varying amounts of $Al^{3+}$ ion are clearly shown. Only Compound I shows a clear shift to a cyan blue color with addition of $Al^{3+}$. Compound II does remains a darker and more violet under-toned blue color after addition of metal ion, in spite of the very close similarity in chemical composition.

Example 1: Visible Lambda Max

The present Example demonstrates the visible region of an absorption spectrum and lambda max across a comparison of different materials. The materials tested include a comparison of red cabbage, n red cabbage fraction, Compound I, FD&C Blue No. 1, and *Spirulina* Blue.

Visible spectra were obtained for solutions (aqueous or aqueous buffered system) of each blue colorant with a maximum absorbance—at lambda max—of no greater than A=1.0 (range 0.7-1.0). L*a *b* C and H values were obtained for each measurement. Color comparisons were plotted on an A*b* space (cross section of the spherical color space).

Figure 2B:
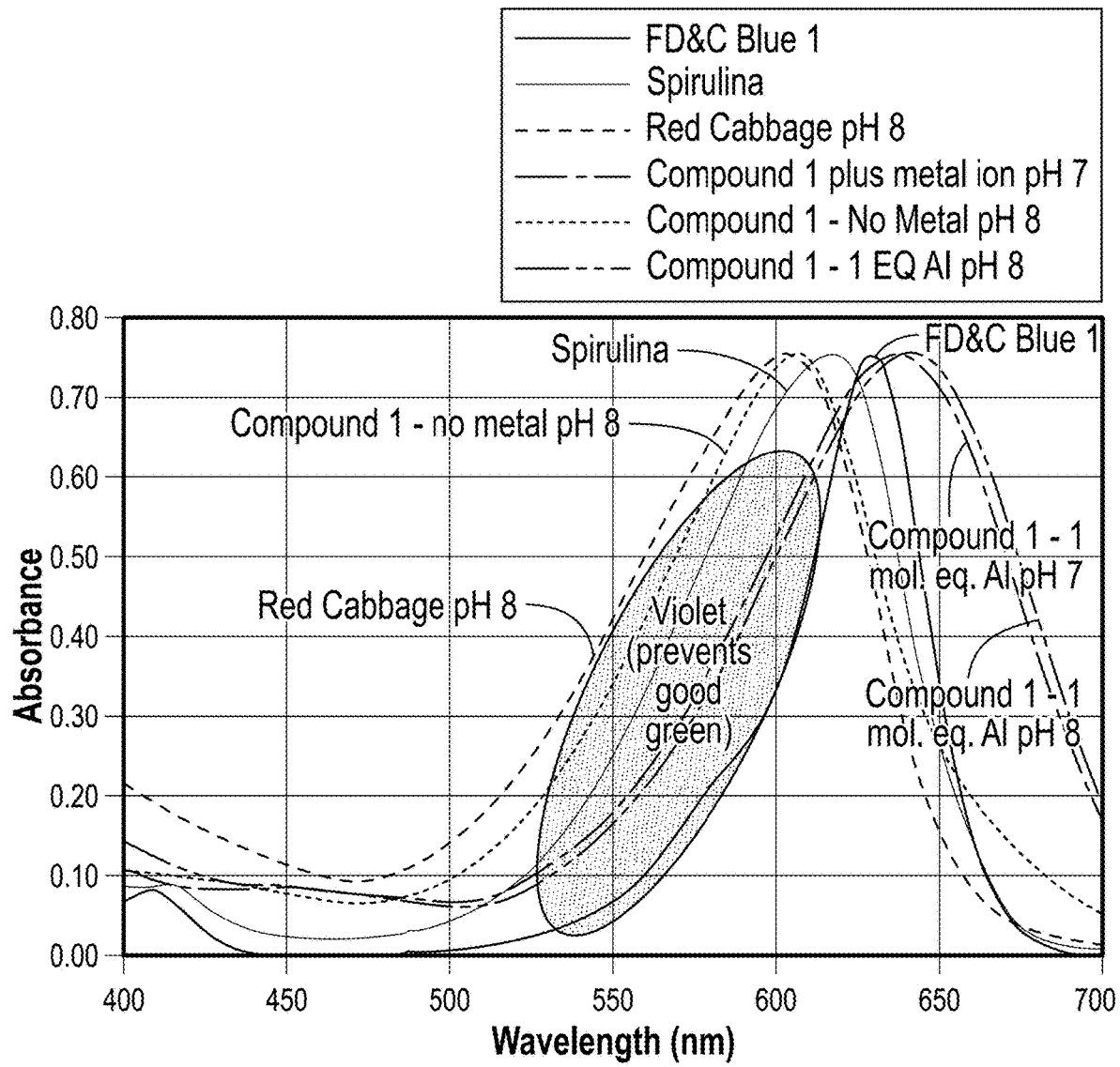
FIG. 2B shows the normalized visible absorbance spectra for FD&C Blue No. 1, Spirulina Blue, red cabbage at pH 8, Compound I (no metal ion) at pH 8, Compound I plus 1.0 mol. equiv. of $Al^{3+}$ at pH 7, and Compound I plus 1.0 mol. equiv. of $Al^{3+}$ at pH 8 with a generalized pictorial indication of the violet contribution of contribution to blue color.

As shown in FIG. 2A, the lambda max values were obtained at pH 7 and pH 8. FIG. 2B compares the shape of the curves, with the highlighted region capturing the absorbance that is more "violet" which hinders the formation of a desired green. The presence of violet in a blue colorant with a yellow colorant can result in a brown contribution the resulting green.

Example 2: Calculating the Violet Component in a Blue Colorant

The present Example demonstrates a calculation of violet area between blues and baseline from 500 nm to 600 nm.

Violet contribution can present a challenge in obtaining a desired blue colorant, as well as in determining the proper blue component for use in a green colorant. The violet contribution of each of the blue colorants was quantified using the UV Visible spectra. The violet region of the visible light spectrum was defined as a range from 500 nm to 600 nm. A solution of each of the blue colorants was prepared and the UV Vis spectrum was obtained. The area under the curve was calculated as the number representing the violet contribution. The blue colorants tested were FD&C Blue No. 1, *Spirulina* Blue, red cabbage at pH 8, red cabbage diacylated fraction at pH 8, Compound I plus 1.0 mol. equiv. $Al^{3+}$ at pH 7, Compound I with no metal ion, and Compound I with 1.0 mol. equiv. $Al^{3+}$ at pH 8.

The experiment was conducted by preparing all the solutions of blue in aqueous (deionized water) or buffered aqueous solutions and normalizing the color solutions to one reference. The reference color was FD&C Blue No. 1. The reference color solution was prepared with an absorbance at $\lambda max=0.75\pm0.5$. The concentration was defined by absorbance value.

Subsequently, the remaining blue solutions (i.e., the *Spirulina* Blue, red cabbage at pH 8, red cabbage diacylated fraction at pH 8, Compound I plus 1.0 mol. equiv. $Al^{3+}$ at pH 7, Compound I with no metal ion, and Compound I with 1.0 mol. equiv. $Al^{3+}$ at pH 8 solutions) were normalized to the target spectrum referenced above (absorbance at $\lambda max=0.75\pm0.5$).

Normalization was undertaken so that all blue colorants measured were of similar maximum intensity to one another in order to avoid bias due to differences in the overall intensity of the peaks.

Normalization calculations were performed as follows:

$$\hat{A}_\lambda = A_\lambda * \frac{A_{0\lambda max}}{A_{\lambda max}},$$

where $\hat{A}_\lambda$ is the normalized absorbance at wavelength $\lambda$ $A_\lambda$ is the measured absorbance at wavelength $\lambda$ $A_{0\lambda max}$ is the measured absorbance at $\lambda max$ for the reference spectrum (normalize other spectra to this spectrum)

$A_{\lambda max}$ is the measured absorbance at $\lambda max$

The violet contributions of the blue colorants were compared. Violet contribution is defined as the area under the curve of the visible absorption spectrum from 500-600 nm. The area under the visible absorption curve from 500-600 nm was calculated by taking the area=(width×height) of the rectangles under the curve, i.e., as described in the below equation. See also FIG. 3E, which depicts an exemplary calculation of the area of rectangle under a curve. The width of each rectangle was defined as 1 nm. The height (Abs) was defined as the absorbance intensity at each wavelength from the normalized spectrum. The total area underneath the curve between 500 nm and 600 nm is equal to the sum of all the rectangles from the wavelength 500 nm to 600 nm.

The following equation was used to calculate the area under the curve from 500 nm to 600 nm:

Sum the areas (width×height) of rectangles with:
  Width=difference in wavelength, $\lambda_1-\lambda_0$ (e.g. 501 nm-500 nm=1 nm)
  Height=normalized absorbance at $\lambda_0$ (i.e., Abs(@$\lambda_0$))

$$\text{Violet Area} = \sum_{\lambda=500}^{\lambda=600} (\lambda_1 - \lambda_0) * \text{Abs}(\lambda_0)$$

Figure 3A:
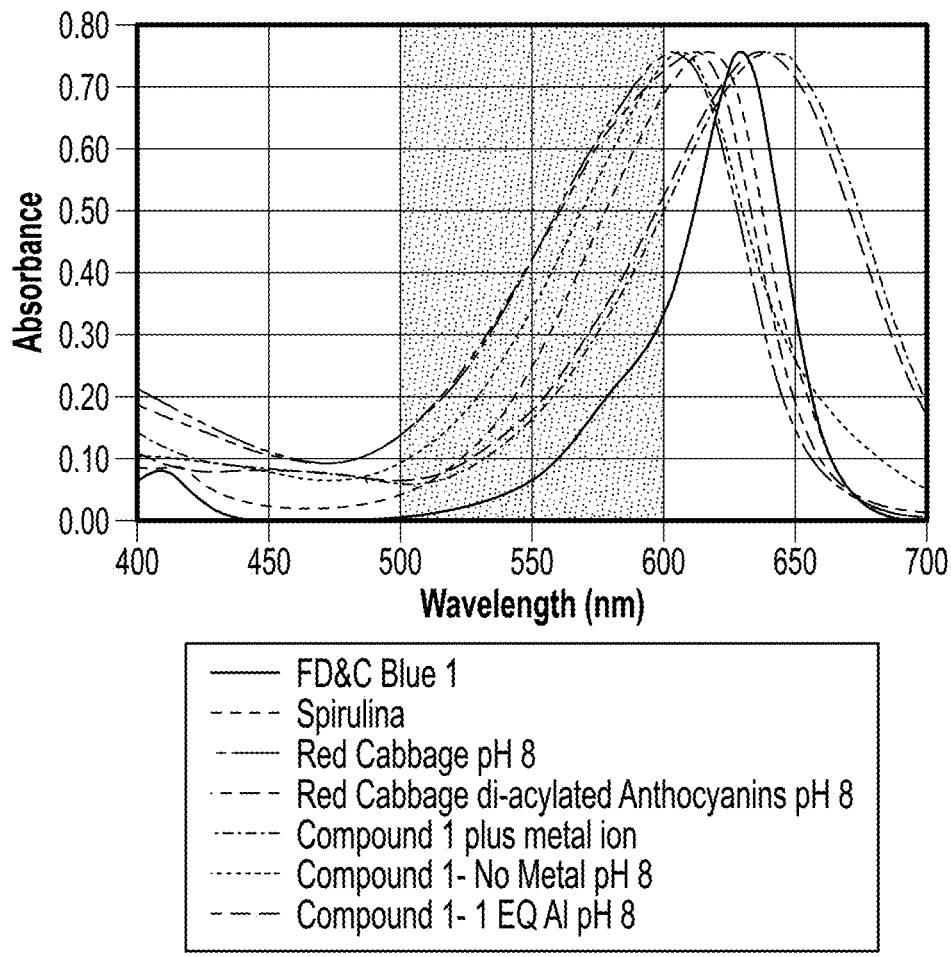
FIG. 3A provides a graphical representation of the wavelength range (500-600 nm) used for calculations of the violet area of the visible light spectrum between different blue colorants based on normalized spectra for FD&C Blue No. 1, Spirulina Blue, red cabbage at pH 8, RC diacylated fraction at pH 8, Compound I plus 1.0 mol. equiv. of $Al^{3+}$ at pH 7, Compound I with no metal ion at pH 8, Compound I plus 1.0 mol. equiv. of $Al^{3+}$ at pH 8.
Figure 3B:
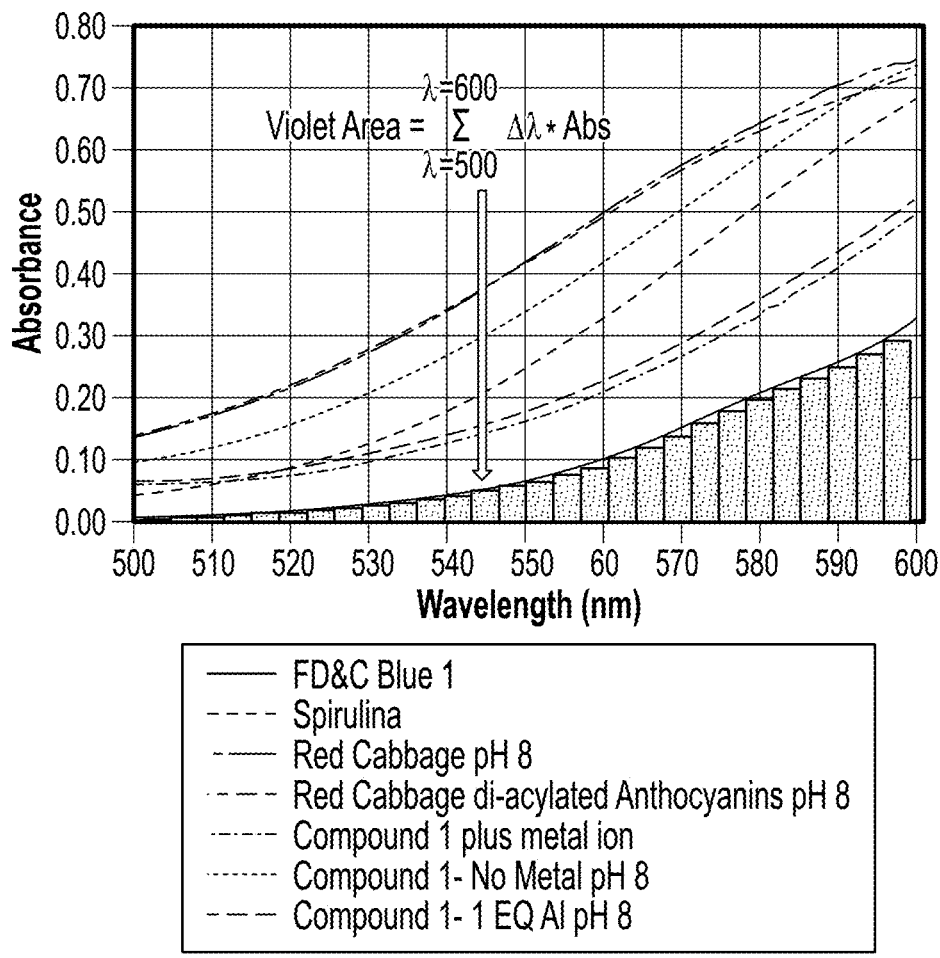
FIG. 3B provides an enlargement of FIG. 3A showing the 500-600 nm region and a graphical representation of the calculation of the area (absorbance units) under the FD&C Blue No. 1 curve which gives a value of the violet color contribution.
Figure 3C:
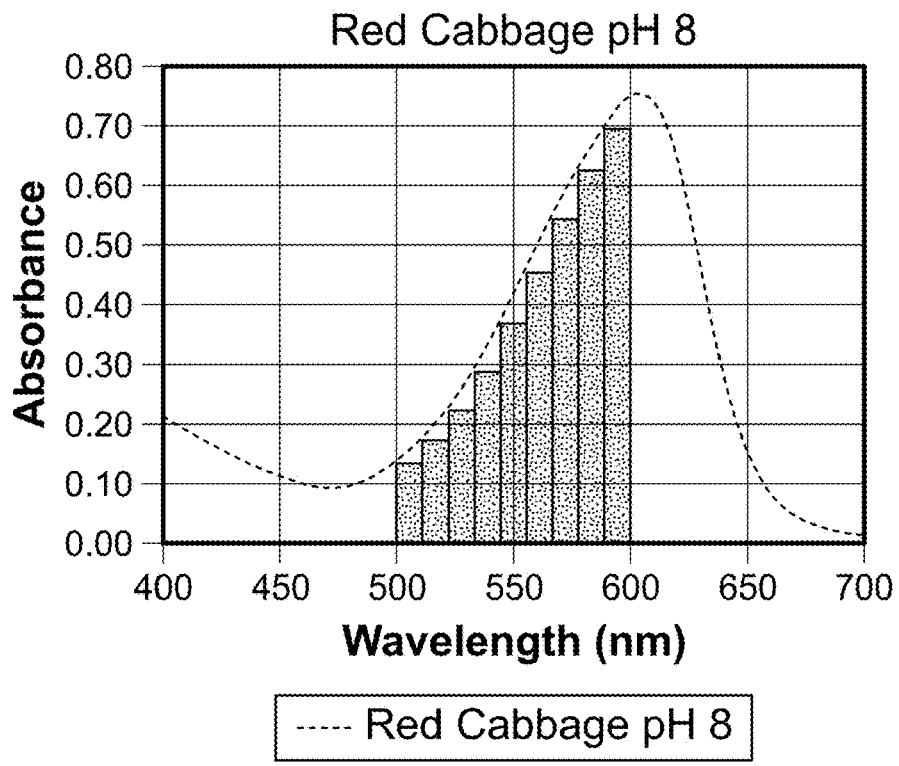
FIG. 3C provides a graphical representation of the calculation of the area from 500-600 nm for the spectral curve for FD&C Blue No. 1.
Figure 3D:
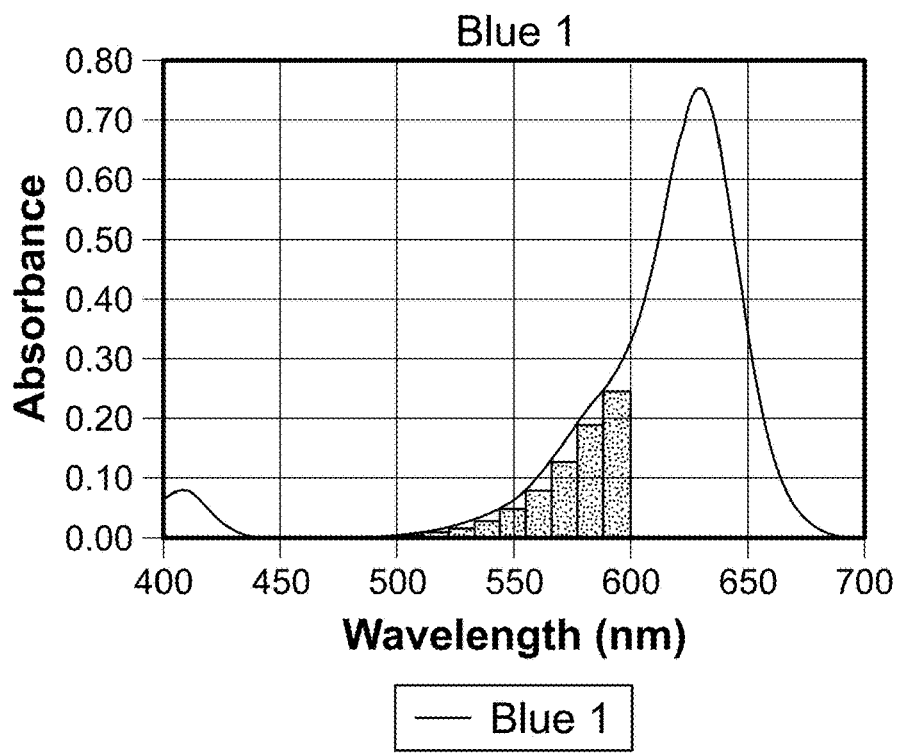
FIG. 3D provides a graphical representation of the calculation of the area from 500-600 nm for the spectral curve for red cabbage extract.
Figure 3E:
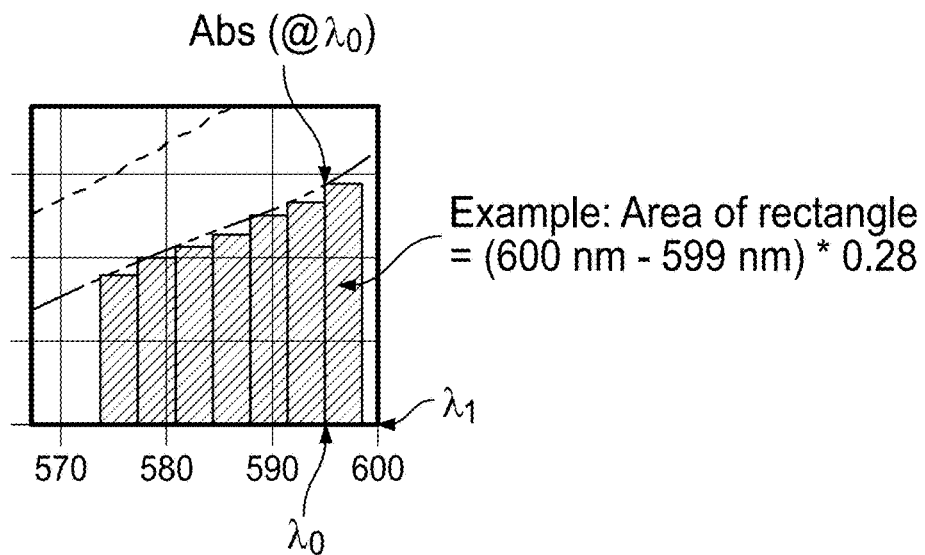
FIG. 3E provides an example of an area under the rectangle.

FIGS. 3C and 3D show the violet contributions determined from the area under the visible absorption curve at 500-600 nm for red cabbage at pH 8 and FD&C Blue No. 1, respectively. A violet contribution was observed in all of the blue colorants, however, it was the smallest in FD&C Blue No. 1, having a value of 10.7. The next smallest violet contribution was for Compound I plus 1.0 mol. equiv. $Al^{3+}$ at pH 7, having a value of 20.5, followed by Compound I with 1.0 mol. equiv. $Al^{3+}$ at pH 8, having a value of 22.2. It is notable that the red cabbage diacylated fraction has a violet contribution value of 43.0, whereas Compound I plus metal ion at pH 7 has a violet value of 20.5, which is less than half of the violet contribution value of the red cabbage diacylated fraction.

The violet contribution was also determined in sugar syrup using 0.5 mm cuvettes and sugar solution. Compound I at pH 7 without metal ion had a violet contribution value of 37.8; Compound I at pH 7 with 1 mol. equiv. $Al^{3+}$ had a violet contribution value of 23.8; *Spirulina* had a violet contribution of 27.4, and FD&C Blue No. 1 had a violet contribution of 8.5.

Example 3: Comparison of Colorimetric Data

The present Example provides a comparison of the colorimetric data obtained for red cabbage, red cabbage diacylated fraction, Compound I plus 1.0 mol. equiv. $Al^{3+}$ at pH 7, Compound I with no metal, Compound I with 1.0 mol.

equiv. Al³⁺ at pH 8, FD&C Blue No. 1, and *Spirulina* Blue. Red Cabbage, red cabbage diacylated anthocyanin fraction, and Compound I with no metal were measured at pH 8. *Spirulina* Blue and FD&C Blue No. 1 were measured at pH 7. Compound I with 1.0 mol. equiv. Al³⁺ was measured at both pH 7 and 8.

Figure 5C:
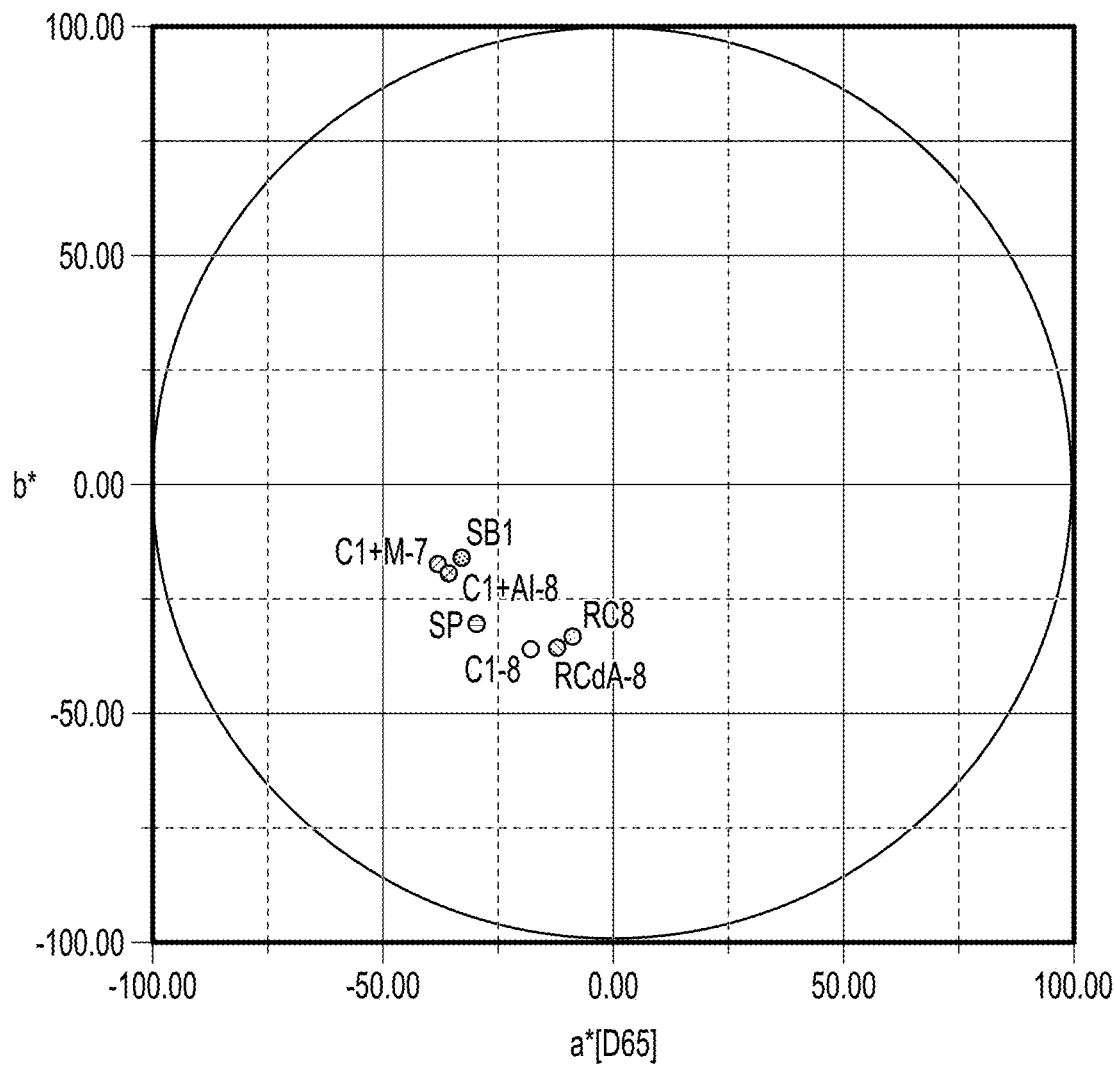
FIG. 5C shows a two-dimensional representation of the color space for the solutions and materials of FIGS. 5A and 5B, wherein the representation shows a cross sectional slice of the three-dimensional L*a*b* color space with a constant L* value of 50. Spectral curves have been normalized for comparison of L*a*b* values.

Colorimetric data including values for L*a*b* are summarized in FIG. 5A. FIG. 5B provides a summary of the ΔE values between FD&C Blue No. 1 solution and *Spirulina* Blue, Compound I with no metal, Compound I with 1.0 mol. equiv. Al³⁺ pH 7, and Compound I with 1.0 mol. equiv. Al³⁺ pH 8 solutions.

As evident in FIGS. 5A and 5B, the colorimetric data for Compound I plus 1.0 mol. equiv. Al³⁺ at pH 8 showed values of L* at 82, a* at −31, and b* at −18, with a ΔE value of only 9.18 when compared to the solution of FD&C Blue No. 1. For Compound I plus metal ion at pH 7, the colorimetric data values were L* at 83, a* at −32 and b* at −16, and the ΔE compared to the solution of FD&C Blue No. 1 was only 8.27.

These results are very surprising and are significantly closer (i.e., have lower ΔE values) compared to FD&C Blue No. 1 than any non-artificial colorant providing blue color.

Example 4: Hue Angles of Blue Colorants

The present Example provides a comparison of hue angle measurements for a number of blue colorant solutions at different pHs. Red cabbage extract, red cabbage diacylated anthocyanin fraction, and Compound I plus 1.0 mol. equiv. Al³⁺ were all measured at pH 7 and pH 8. *Spirulina* Blue and FD&C Blue No. 1 solutions were measured at pH 7, while Compound I with no metal and Compound I with 1.0 mol. equiv. Al³⁺ were measured at pH 8.

Figures 7A, 7B:
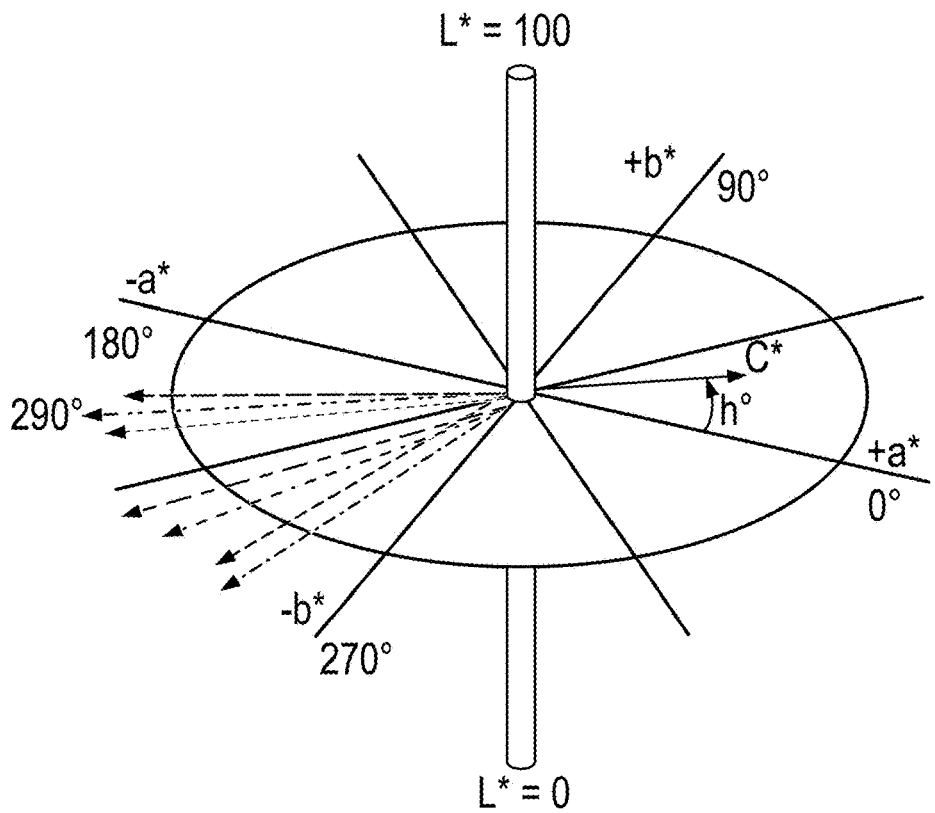
FIG. 7A depicts the hue angles for red cabbage, red cabbage (RC) diacylated fraction, Spirulina Blue, Compound I with 1.0 mol. equiv. of $Al^{3+}$ at pH 7, Compound I without metal ion at pH 8, Compound I plus less than 1.0 mol. equiv. of $Al^{3+}$ at pH 8, and FD&C Blue No. 1 solution. Spectral curves have been normalized for comparison of LC*h° values.
FIG. 7B provides the numerical hue angles for the solutions listed in FIG. 7A across pH values of 7 and 8.

As shown in FIGS. 7A and 7B, the FD&C Blue No. 1 solution had a hue angle of 209°. Compound I plus metal ion at pH 7 had a hue angle of 207°, while Compound I with 1.0 mol. equiv. Al³⁺ at pH 8 had a hue angle of 211°. The hue angles of both Compound I solutions were very close to the hue angle of FD&C Blue No. 1, and much closer to FD&C Blue No. 1 than the *Spirulina* Blue solution, which had a hue angle of 227°.

Example 5: Anthocyanin Application in Hard Panning

A sugar coating syrup is prepared from sucrose and de-ionized water to create a saturated sugar syrup. Next, Compound I is added to the sugar syrup along with 1.0 mol. equiv. of food grade aluminum chloride such that the concentration of Compound I in the syrup is 0.09% w/w. The whole coloring material is the sugar syrup with the Compound I and metal ion colorant. The pH is checked again and adjusted back to pH 7.0 with food grade acid or alkali. Next, 10-15 kg of chocolate centers covered with a base confectionery coating having a generally white appearance are placed into a pan and the pan is rotated. About 80 g of the blue colored coating syrup is added to the tumbling centers in the pan and allowed to distribute over the centers. Then a blower is used to direct ambient air into the coating pan while it rotates to dry and crystallize the sugar syrup.

This rotation and drying process is repeated as a series of equal applications. After the last application of syrup, a final coating of an edible carnauba wax can be applied to give the product a shiny appearance. The finished product has a cyan blue color with an L*a*b* measurements close to that of candy produced with artificial FD&C Blue No. 1.

Example 6: Colorimetric Data for Blue Colorants in Sugar Syrup

Figure 15A:
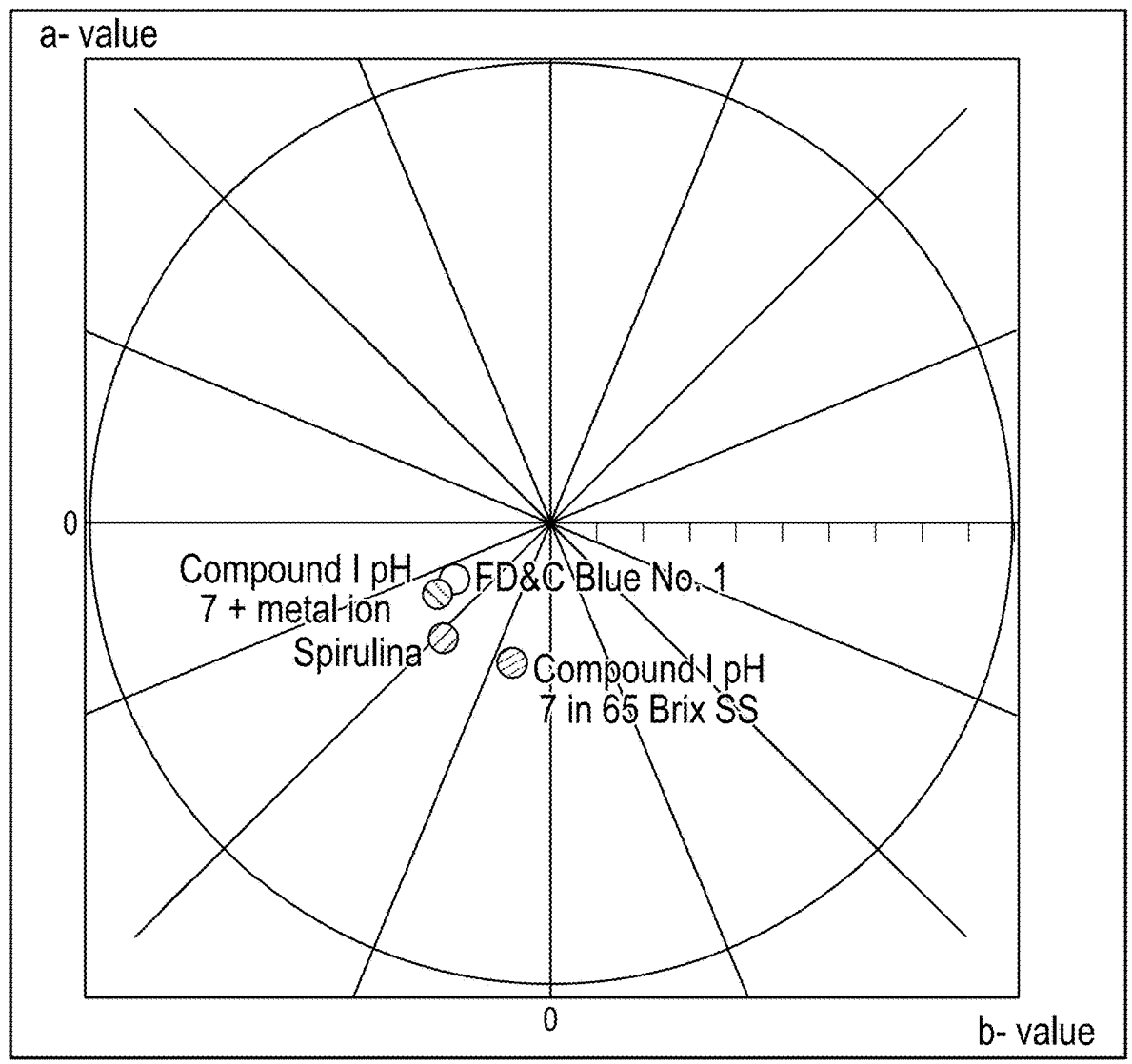
FIG. 15A shows L*a*b* values for FD&C Blue No. 1, Spirulina Blue, Compound I at pH 7, and Compound I at pH 7 with metal ion in sugar syrup.

Similarly to Example 3, the colorimetric data was determined for FD&C Blue No. 1, *Spirulina* Blue, Compound I at pH 7 in sugar syrup, and Compound I at pH 7 with metal ion in sugar syrup. CIELAB color space L*a*b* and CIELCH color space L*C*h° values are provided below in Table 4 and shown in FIG. 15A.

TABLE 4

|  | L* | a* | b* | C* | h |
|---|---|---|---|---|---|
| FD&C Blue 1 | 92.62 | −22.27 | −10.22 | 24.50 | 204.65 |
| Spirulina | 84.24 | −25.16 | −23.22 | 34.24 | 222.70 |
| Compound I pH 7 | 75.21 | −10.07 | −28.59 | 30.31 | 250.60 |
| Compound I pH 7 with metal | 83.54 | −25.67 | −14.68 | 29.57 | 209.76 |

Figure 15B:
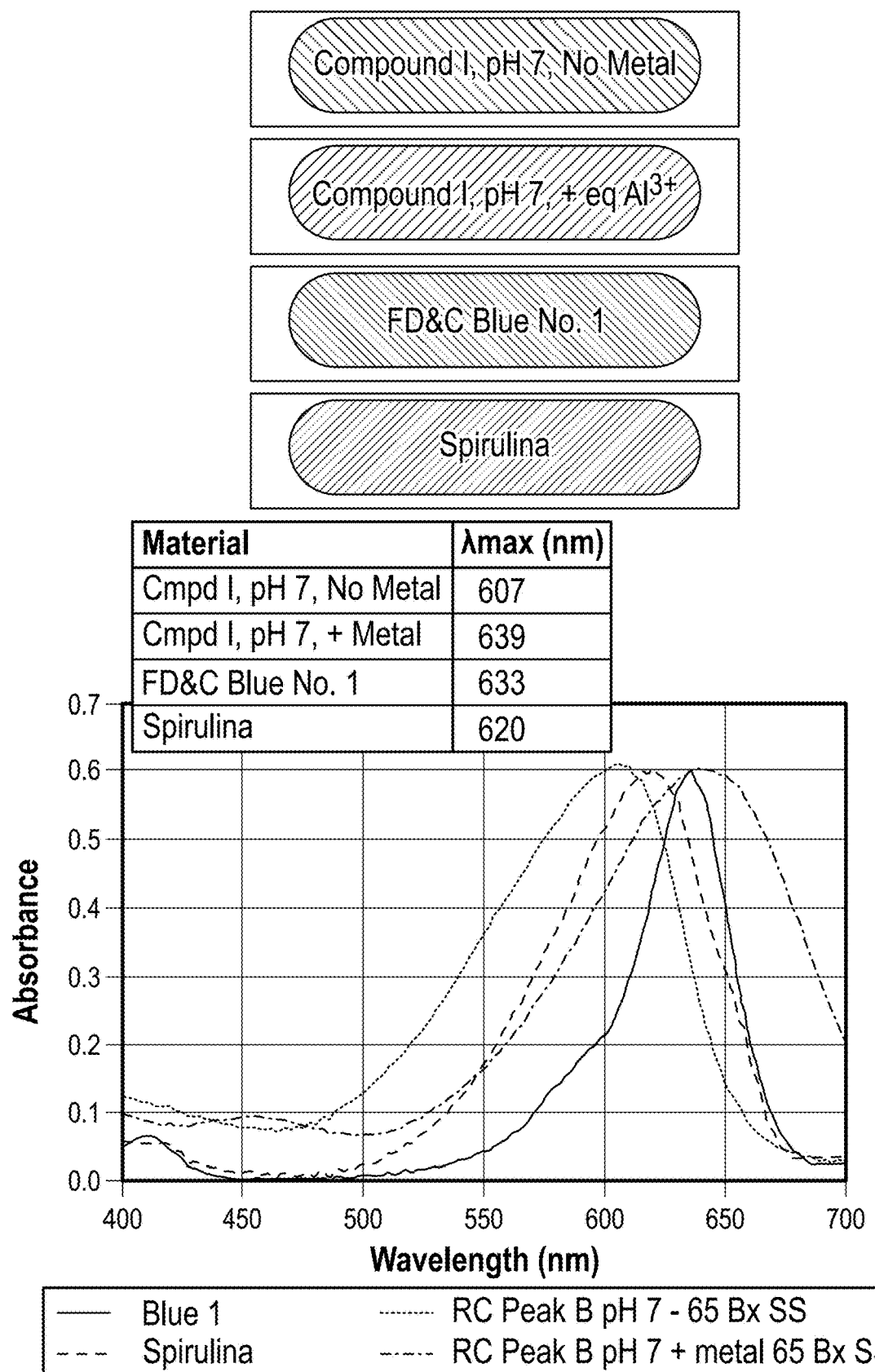
FIG. 15B shows lambda max values for FD&C Blue No. 1, Spirulina Blue, Compound I at pH 7, and Compound I with 1.0 mol. equiv. of $Al^{3+}$ at pH 7 in sugar syrup.

Additionally, lambda max data was also determined for FD&C Blue No. 1, *Spirulina* Blue, Compound I at pH 7, and Compound I at pH 7 with metal ion. The lambda max data is provided in FIG. 15B.

Example 7: Colorimetric Data for Blue and Green Panned Candies

The blue colorants were used to make blue and green candies. The candies did not include a TiO₂ undercoat to ensure that the measurements taken were consistent across the different candies. All candies included a calcium carbonate (CaCO₃) undercoat with the exception of the green *spirulina*+turmeric candy, which includes rice starch.

Figure 16A:
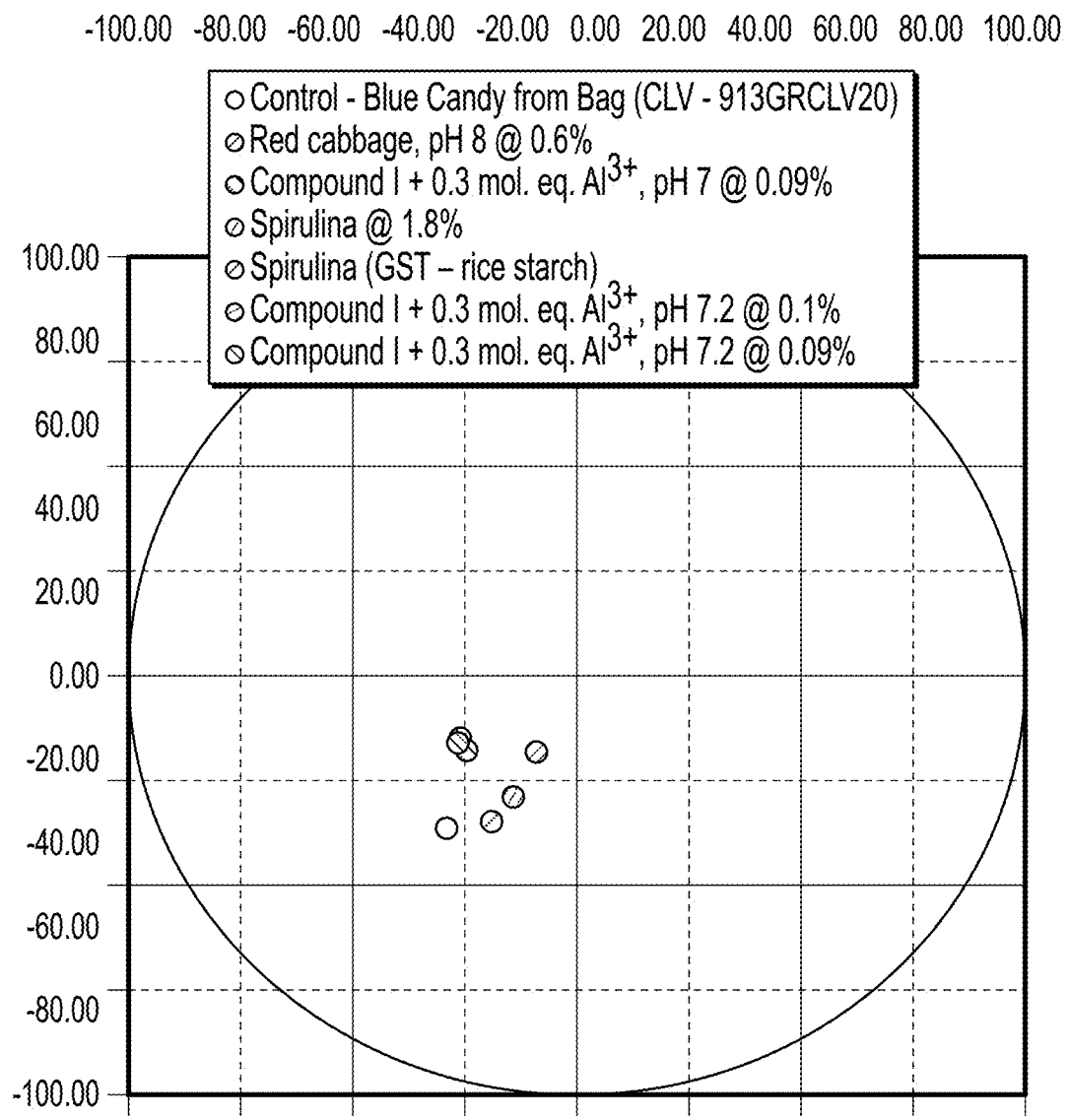
FIG. 16A shows colorimetric data for blue panned candies using as blue colorants Spirulina, Compound I with 0.3 mol. equiv. $Al^{3+}$ at pH 7.2, and Compound I with 0.3 mol. equiv. $Al^{3+}$ at pH 7.
Figure 16A:
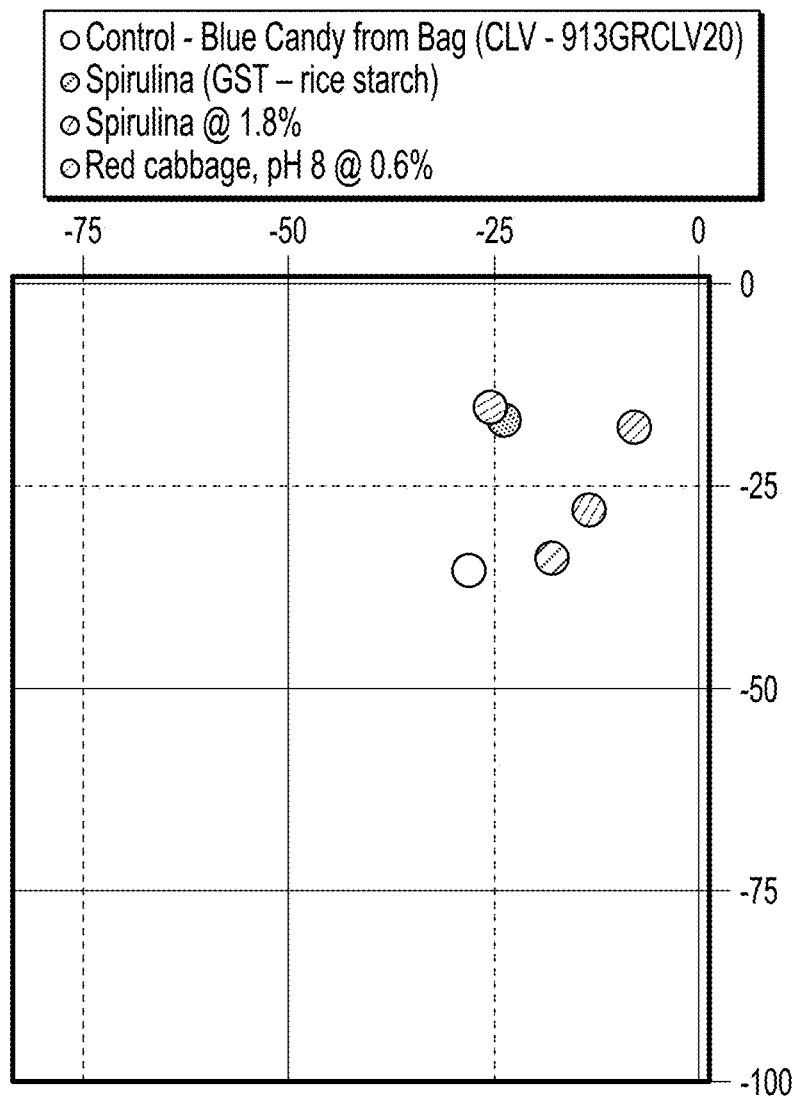
Figure 16B:
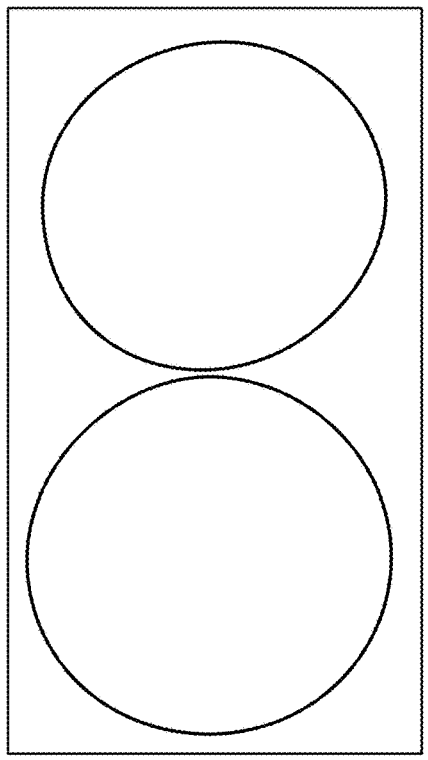
FIG. 16B shows images of blue candies made with blue colorant from red cabbage, spirulina, FD&C Blue No. 1, and Compound I+0.3 mol. equiv. of $Al^{3+}$ at pH 7.
Figure 16B:
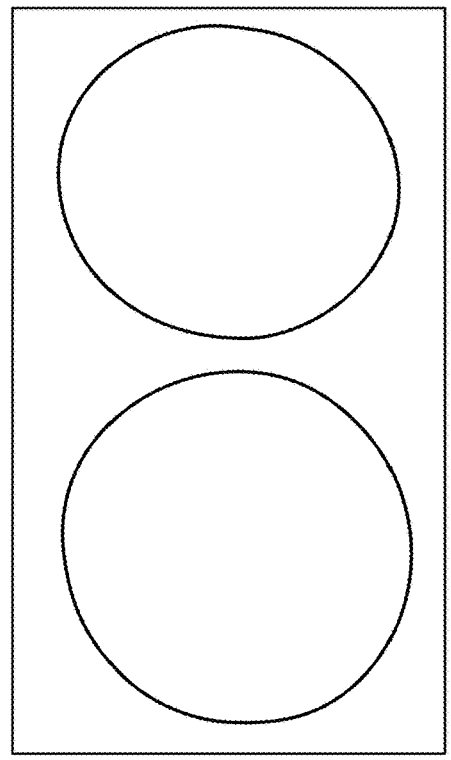
Figure 16B:
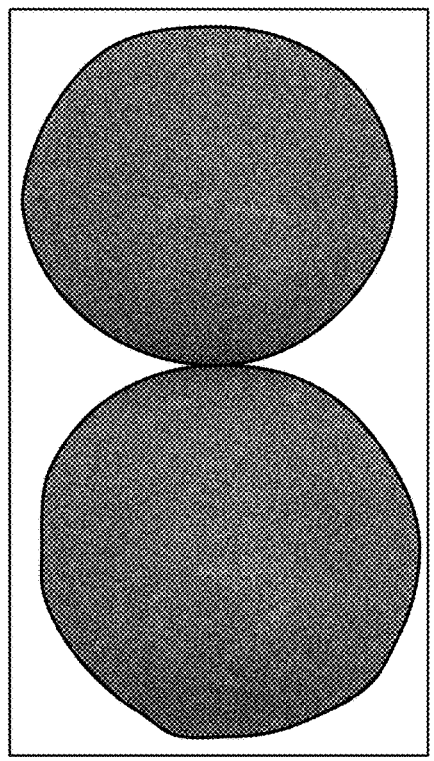
Figure 16B:
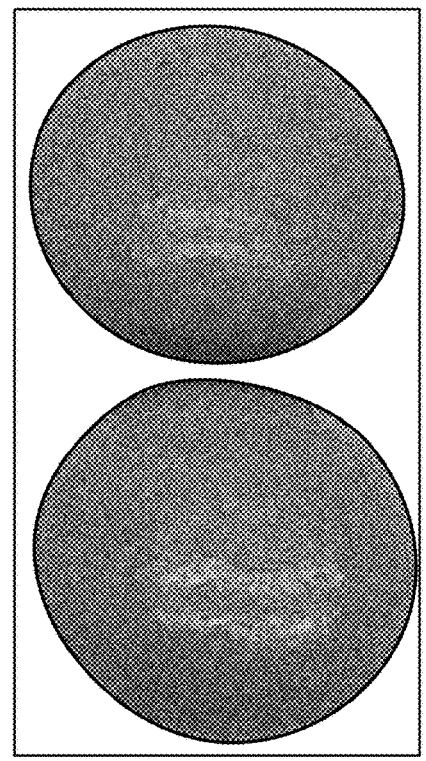
Figure 16C:
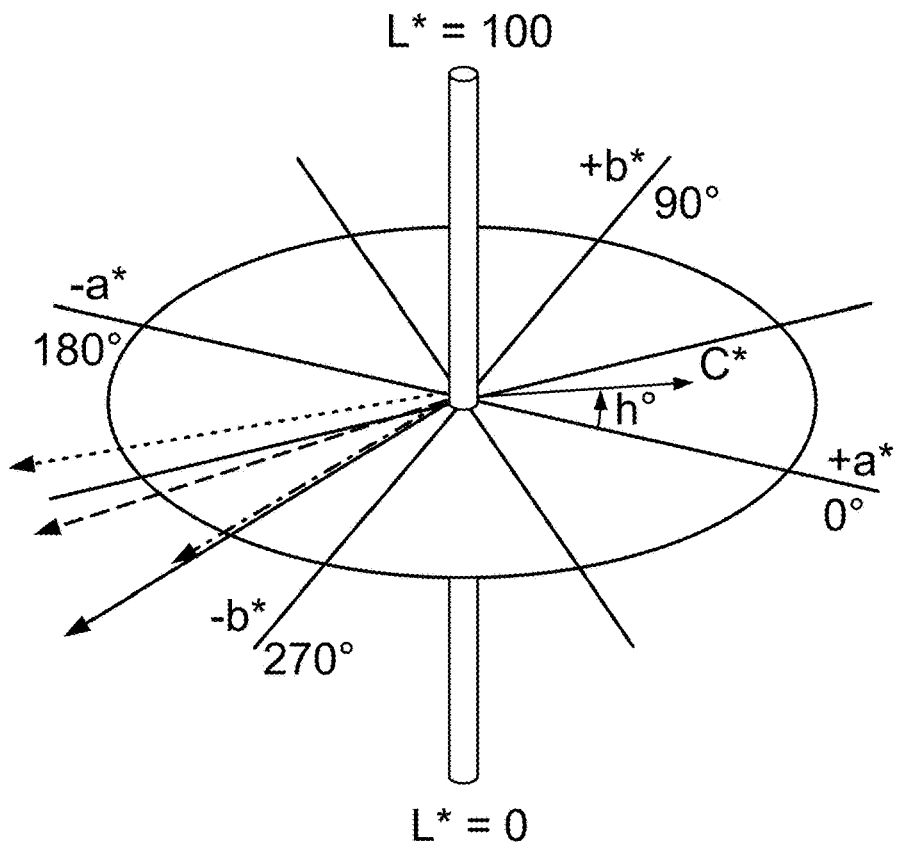
FIG. 16C shows the hue angles for red cabbage, spirulina, FD&C Blue No. 1, and Compound I+0.3 mol. equiv. of $Al^{3+}$ at pH 7.

The colorimetric data for the blue panned candies is provided below in Table 5, as well as in FIG. 16A. Images of the candies made with blue colorant from red cabbage, *spirulina*, FD&C Blue No. 1, and Compound I+0.3 mol. equiv. of Al³⁺ at pH 7 are shown in FIG. 16B. FIG. 16C shows the hue angles for the blue colorants.

TABLE 5

|  | L* | b* | c* | C | h | ΔE (compared to control) |
|---|---|---|---|---|---|---|
| Control-Blue Candy from Bag | 46.76 | −29.30 | −36.35 | 46.69 | 231.13 | — |
| Compound I with Al³⁺, pH 7.2 at 0.1% | 54.69 | −26.95 | −16.78 | 31.75 | 211.90 | 21.25 |
| Compound I with 0.3 mol. equiv. Al³⁺, pH 7 at 0.09% | 47.55 | −24.79 | −17.69 | 30.45 | 215.51 | 19.21 |

TABLE 5-continued

| | L* | b* | c* | C | h | ΔE (compared to control) |
|---|---|---|---|---|---|---|
| Spirulina Blue at 1.8% | 59.74 | −14.58 | −28.80 | 32.28 | 243.15 | 21.03 |
| Red cabbage, pH 8 at 0.06% | 40.09 | −9.12 | −18.47 | 20.60 | 243.72 | 27.77 |

Figure 17A:
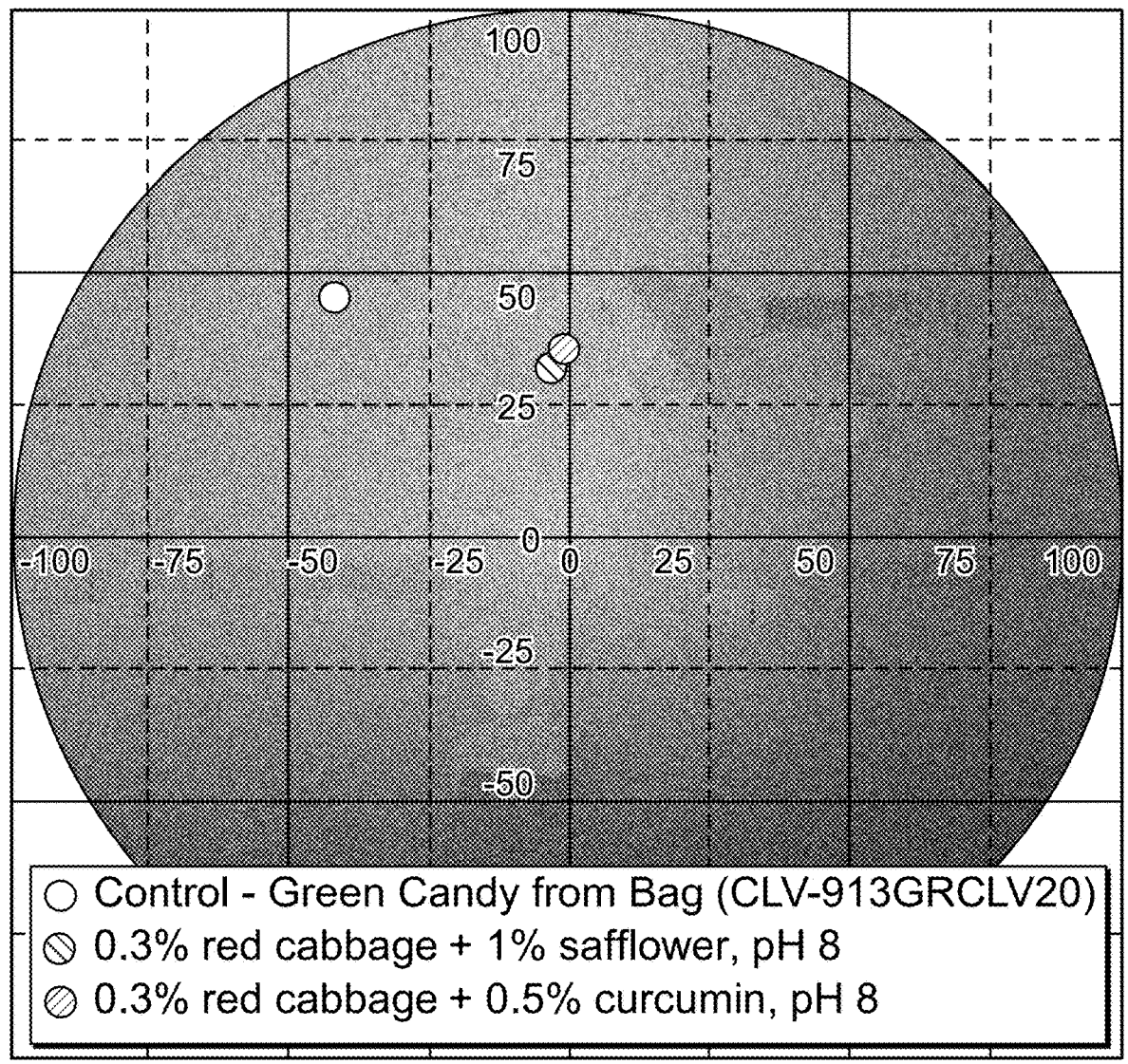
FIG. 17A shows colorimetric data for green panned candies using as green colorants red cabbage+safflower and red cabbage+curcumin.
Figure 17B:
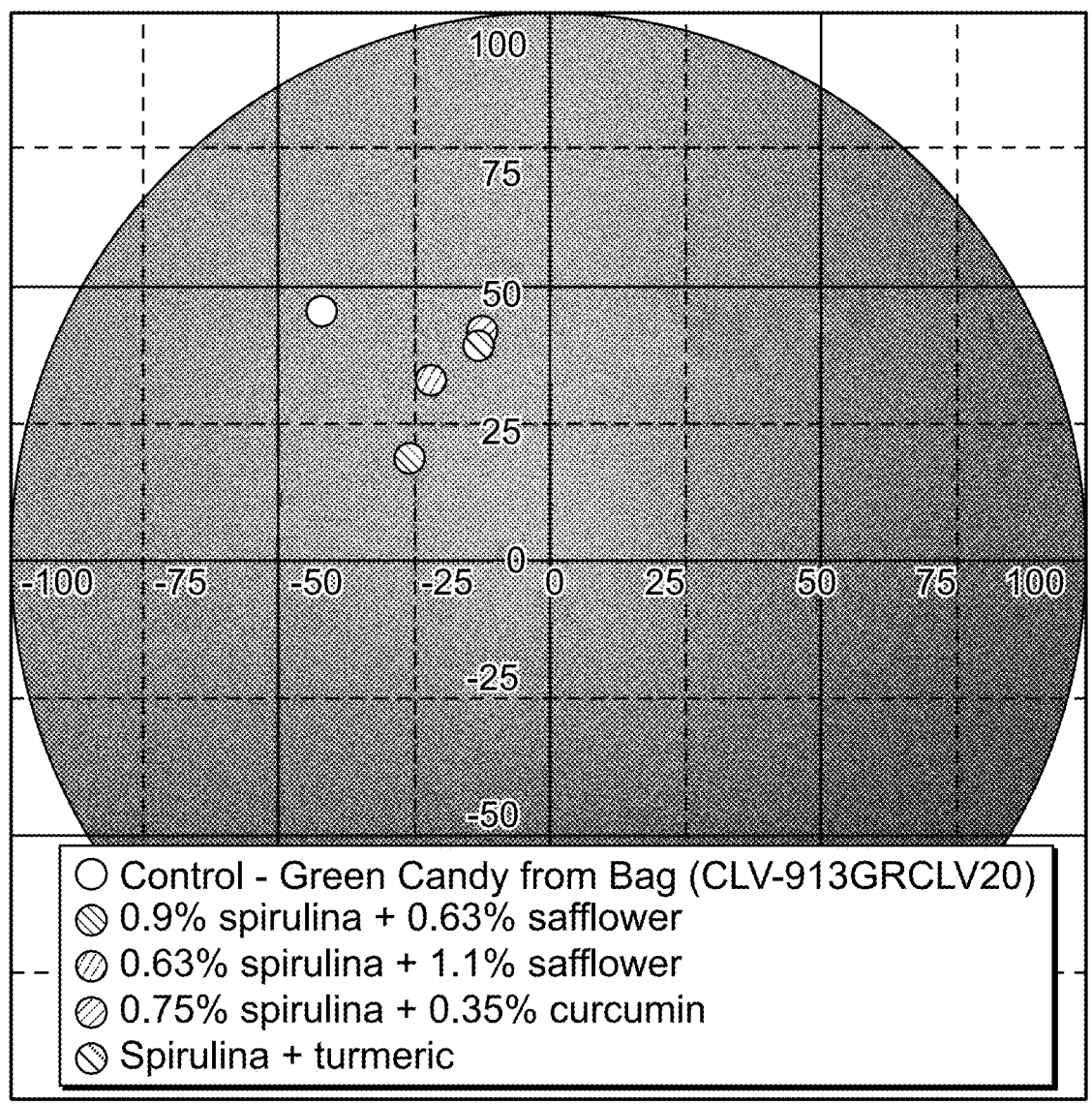
FIG. 17B shows colorimetric data for green panned candies using as green colorants spirulina+safflower, spirulina+curcumin, and spirulina+turmeric.
Figure 17C:
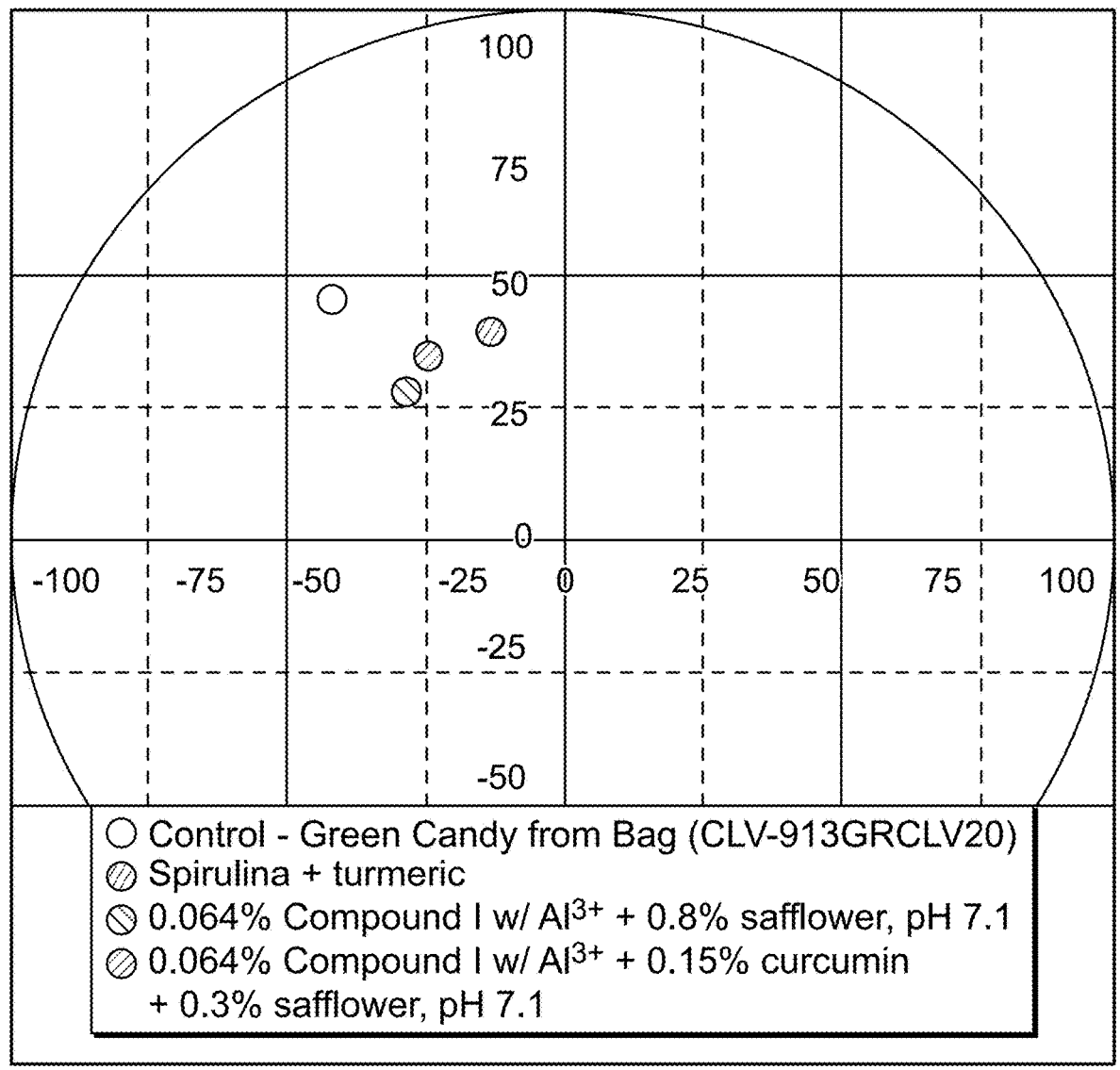
FIG. 17C shows colorimetric data for green panned candies using as green colorants spirulina+turmeric, Compound I with $Al^{3+}$ safflower, and Compound I with $Al^{3+}$ curcumin +safflower.
Figure 17D:
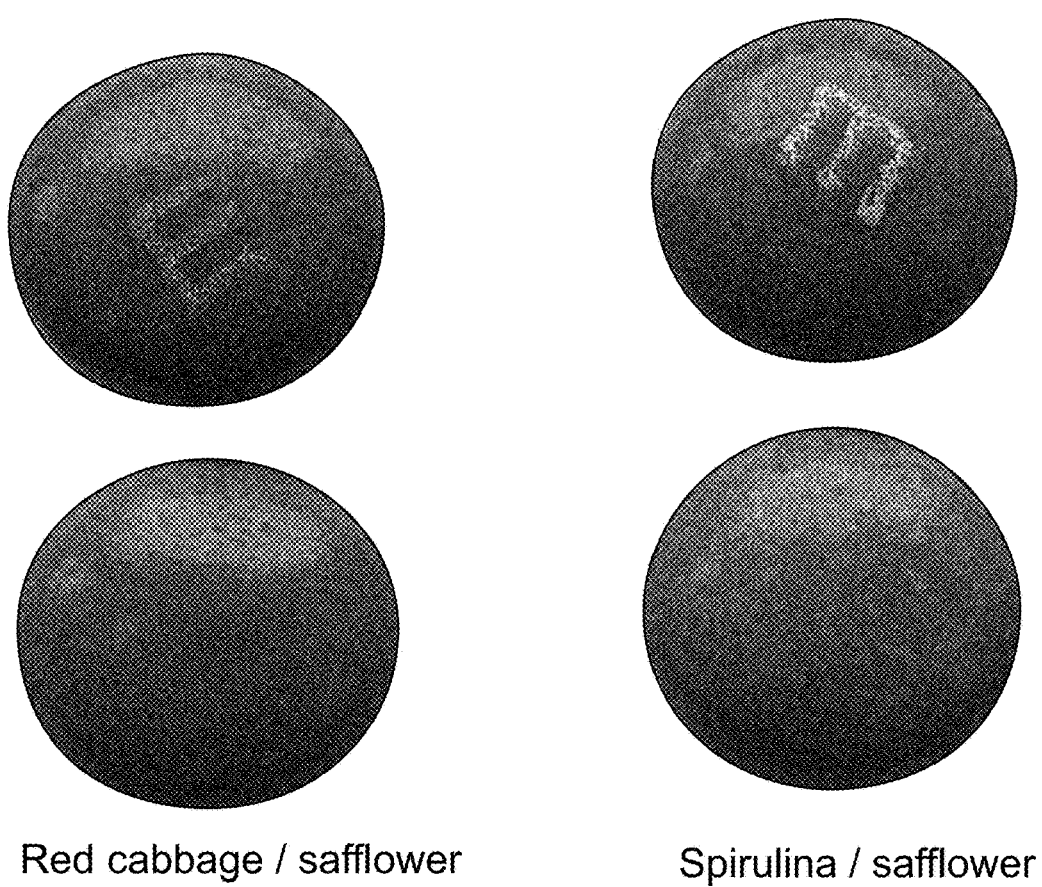
FIG. 17D shows images of green candies made with green colorant from red cabbage+safflower, spirulina+safflower, and Compound I metal complex+safflower.
Figure 17D:
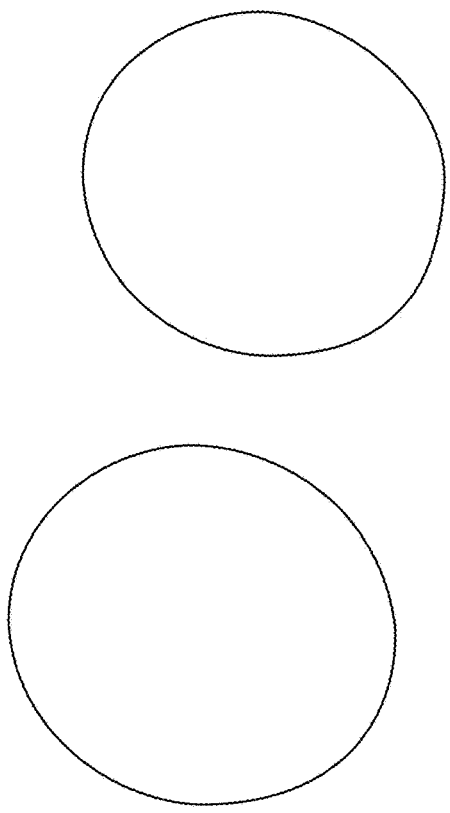
Figure 17E:
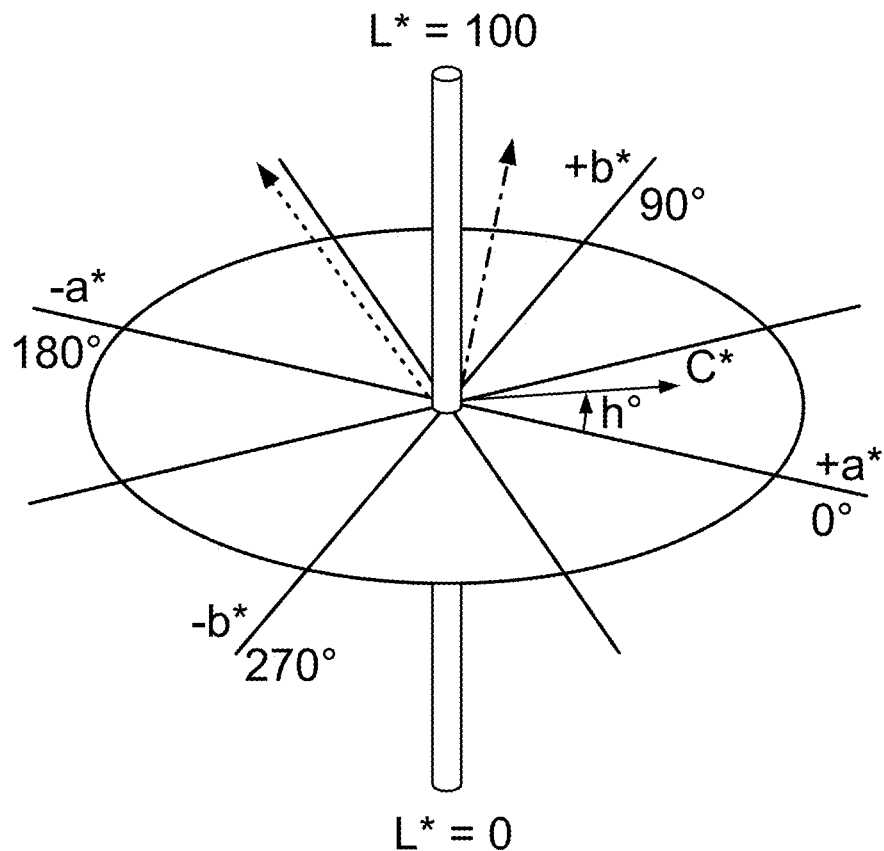
FIG. 17E shows the hue angles for control green candy, turmeric+spirulina (CH 1345), and Compound I with $Al^{3+}$ safflower.
Figure 17F:
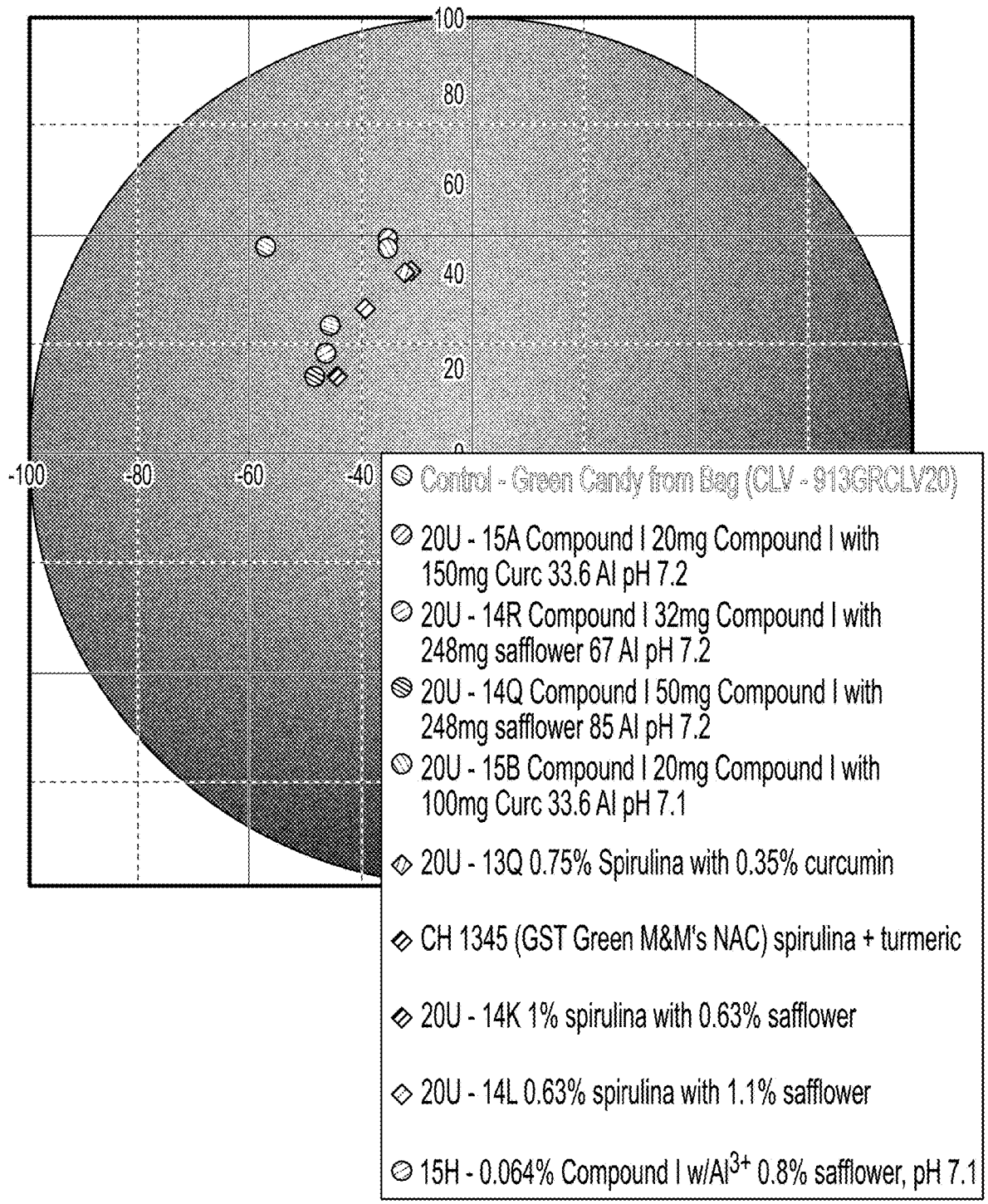
FIG. 17F shows colorimetric data for green panned candies using as green colorants Compound I with $Al^{3+}$ curcumin, Compound I with $Al^{3+}$ safflower, spirulina+curcumin, spirulina+turmeric, and spirulina+safflower.

The colorimetric data for the green panned candies is provided below in Table 6, as well as in FIGS. 17A-17C. Images of the candies made with green colorant from red cabbage+safflower, *spirulina*+safflower, and Compound I metal complex+safflower are shown in FIG. 17D. FIG. 17E shows the hue angles for the green colorants. Provided in FIG. 17F is a comparison of the colorimetric data for all of the green colorants tested in this example.

TABLE 6

| | L* | b* | c* | C | h | ΔE (compared to control) |
|---|---|---|---|---|---|---|
| Control-Green Candy from Bag | 57.27 | −46.84 | 47.15 | 66.47 | 134.81 | — |
| Red cabbage | | | | | | |
| 0.3% red cabbage + 1% safflower, pH 8 | 47.98 | −4.35 | 32.72 | 33.00 | 97.57 | 45.82 |
| 0.3% red cabbage + 0.5% curcumin, pH 8 | 44.36 | −1.86 | 36.74 | 36.79 | 92.89 | 47.94 |
| Spirulina | | | | | | |
| Spirulina + turmeric (best commercially available) | 55.35 | −15.23 | 40.88 | 43.63 | 110.43 | 32.28 |
| 0.9% spirulina + 0.63% safflower | 60.37 | −29.61 | 19.34 | 35.36 | 146.85 | 32.86 |
| 0.63% spirulina + 1.1% safflower | 65.69 | −24.35 | 32.77 | 40.82 | 126.61 | 27.99 |
| 0.75% spirulina + 0.35% curcumin | 61.03 | −13.72 | 41.31 | 43.53 | 108.37 | 33.84 |
| Compound I | | | | | | |
| 0.064% Compound I with $Al^{3+}$ + 0.15% curcumin + 0.3% safflower, pH 7.1 | 51.08 | −27.51 | 35.90 | 45.23 | 127.46 | 23.21 |
| 0.064% Compound I with $Al^{3+}$ + 0.8% safflower, pH 7.1 | 54.19 | −32.14 | 28.80 | 43.15 | 138.14 | 23.71 |

Although the ΔE values for the Compound I blue colorants compared to *Spirulina* Blue were not very different from each other, the hue angles were. The difference in the hue angle was advantageous for making the green candies, as the hue angle for green candies should be around 135°. As evident above, the ΔE values compared to control blue and control green colorants were greater for the colorants formed from red cabbage compared to the ΔE values for Compound I.

Example 8: Stability of Colorants

Figure 18A:
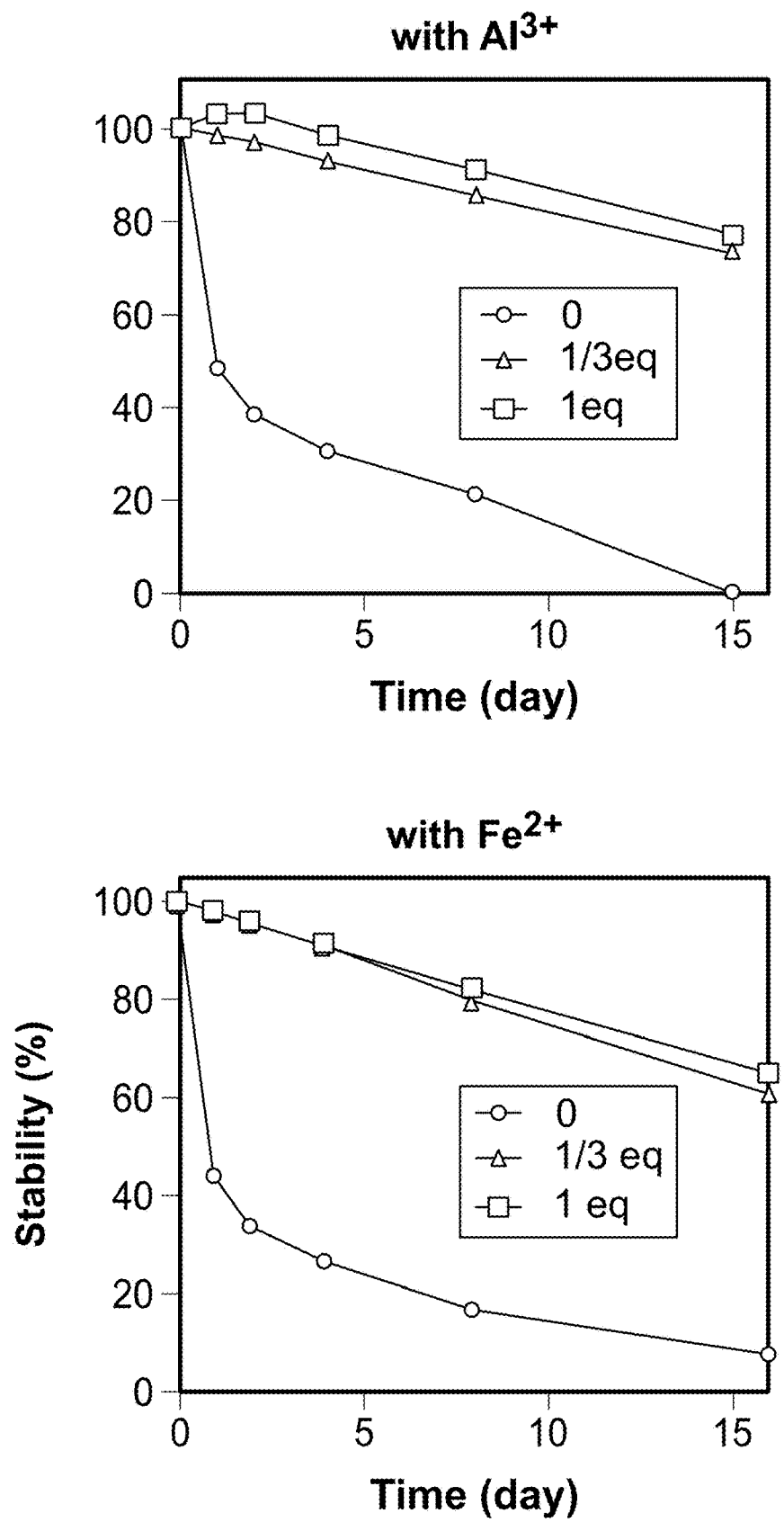
FIG. 18A shows the stability over time of Compound I with $Al^{3+}$ (left) and $Fe^{2+}$ (right) at 1 mol. equiv. and ⅓ equiv.
Figure 18B:
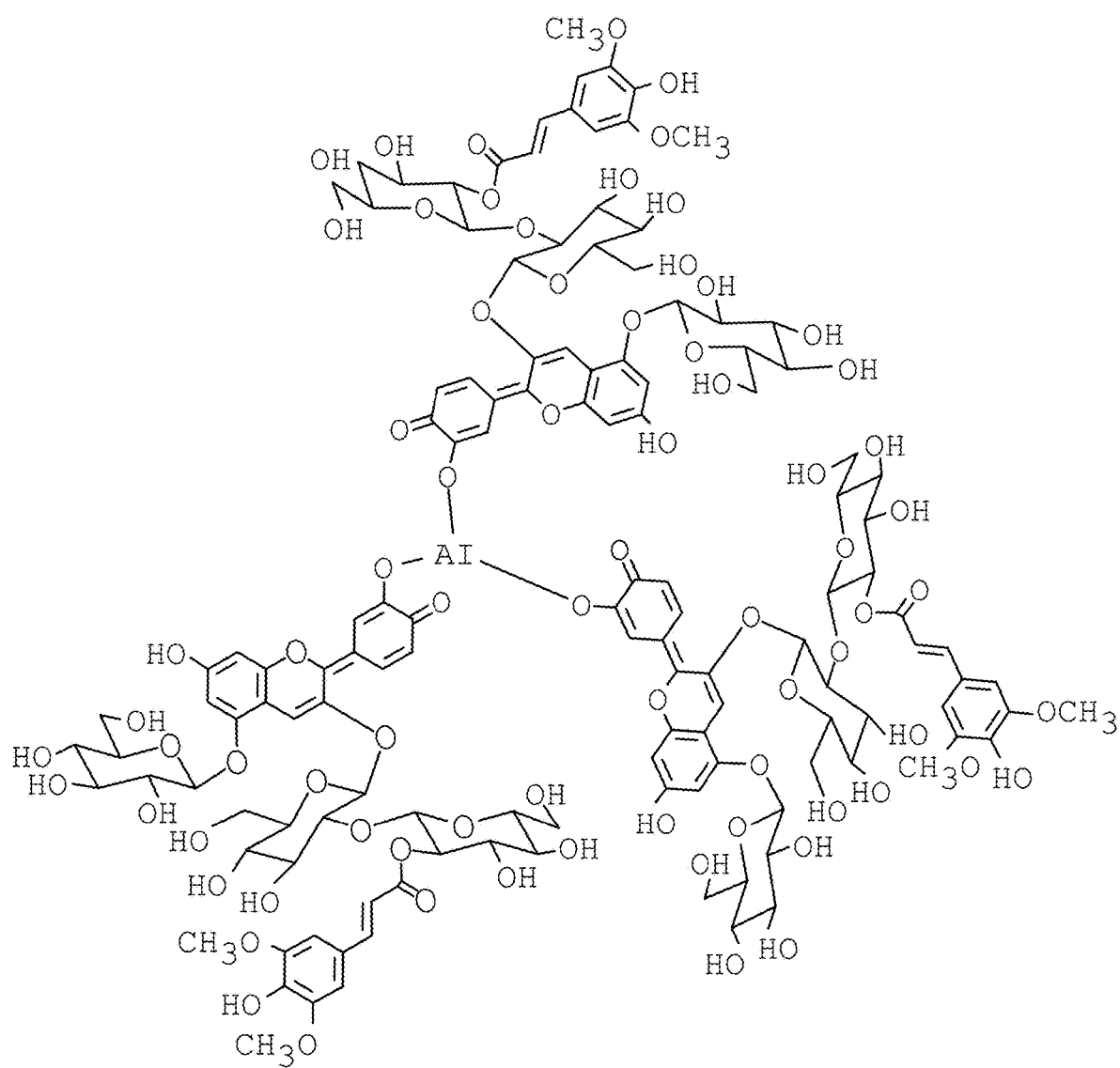
FIG. 18B shows the proposed structure of Compound I complex with $Al^{3+}$.
Figure 19A:
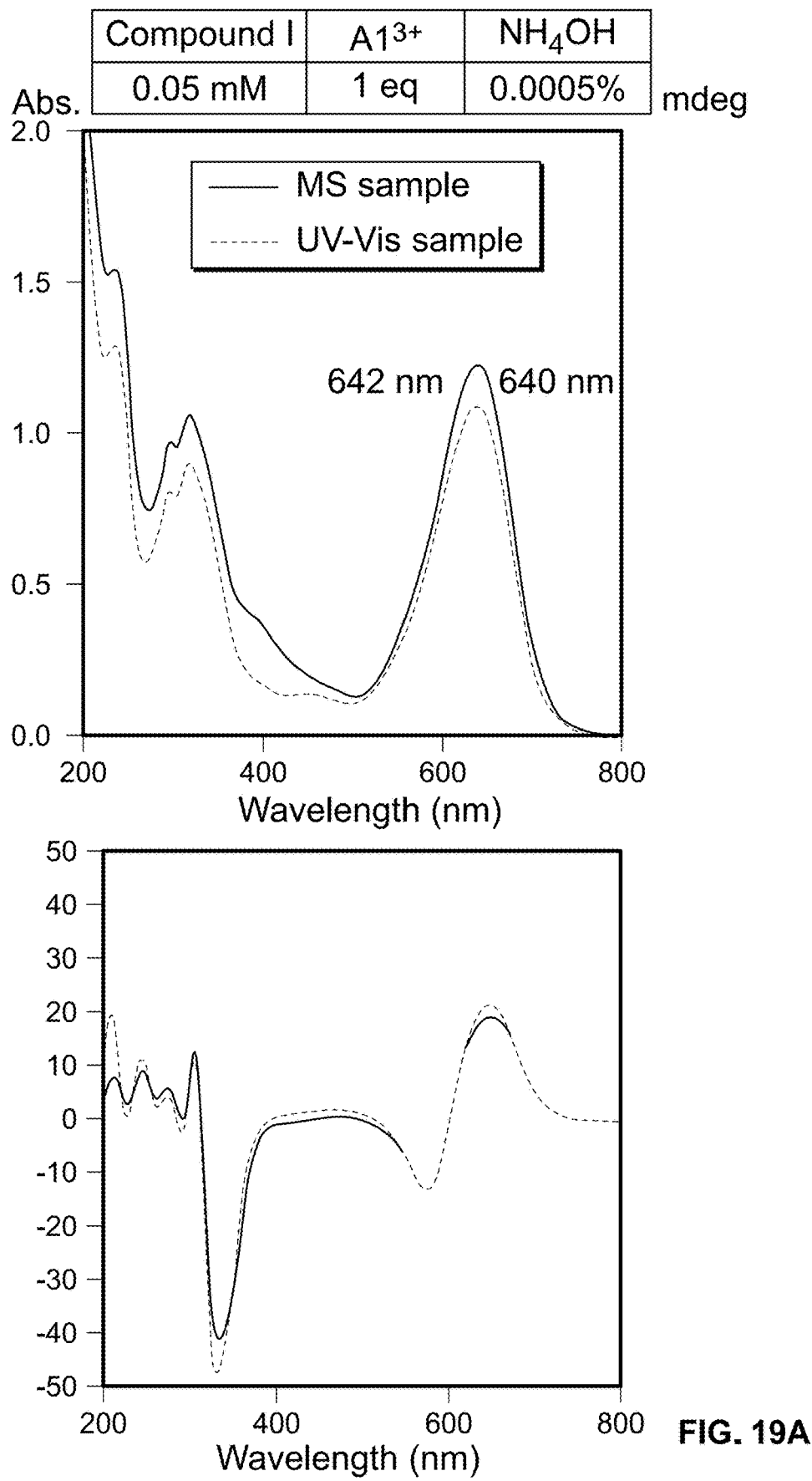
FIG. 19A shows UV-Vis spectra for the UV-Vis and liquid chromatography-mass spectrometry (LC-MS) samples.
Figure 19B:
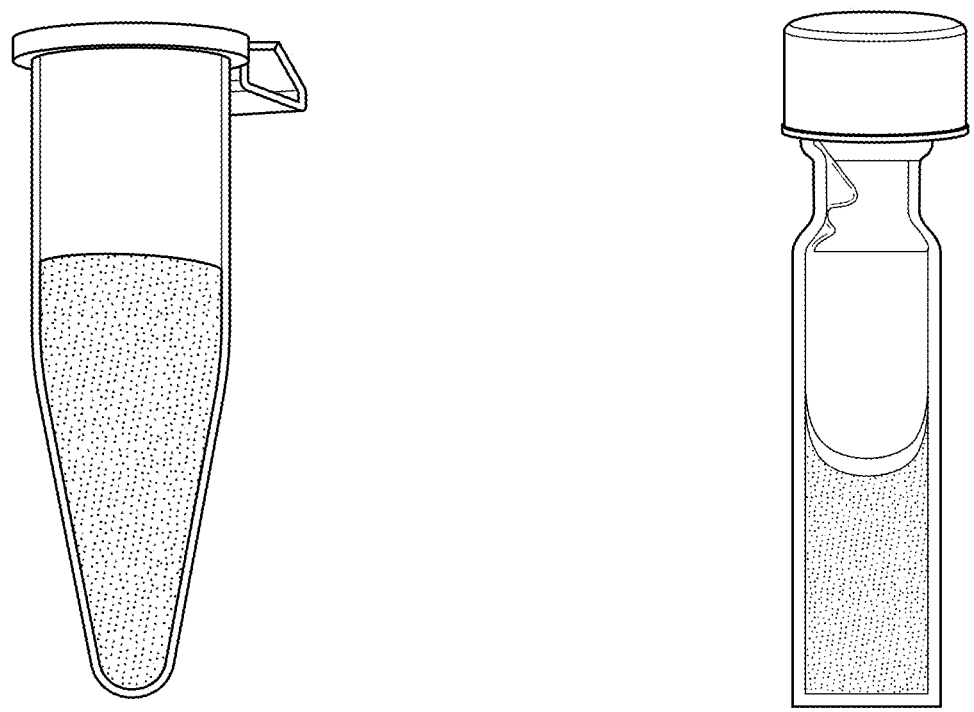
FIG. 19B shows a comparison between the solution used for UV-Vis and the solution used for LC-MS.

The stability of Compound I with $Al^{3+}$ or $Fe^{2+}$ metal ions at 1 mol. equiv. or ⅓ mol. equiv. in aqueous buffer at pH 7.0 was determined. A dilute solution (0.05 mM) of Compound I was made using ⅓ or 1.0 mol. equiv. of metal ion. The solution was generated as described in the Examples above. The lambda max (absorbance UV vis maximum wavelength) (y axis) is plotted over time (x axis), as shown in FIG. 18A. It is demonstrated that Compound I with metal has improved stability compared to Compound I with no metal. The improved stability was observed with both $Al^{3+}$ and $Fe^{2+}$ ions. It is proposed that Compound I forms the metal complex of FIG. 18B (shown as aluminum metal complex). It was confirmed that the UV vis solution and sample generated for LC-MS were the same as demonstrated in FIGS. 19A and 19B.

Example 9: Sugar Syrup Solutions of Compound I and Compound II

Figure 20A:
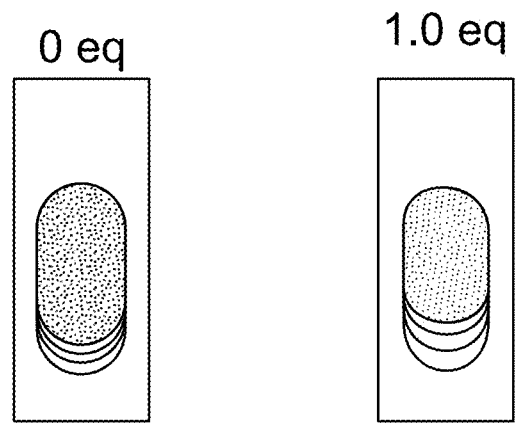
FIG. 20A shows the color comparison between Compound I in Brix 50 sugar syrup at pH 7.0 with and without 1.0 mol. equiv. of $Al^{3+}$.
Figure 20B:
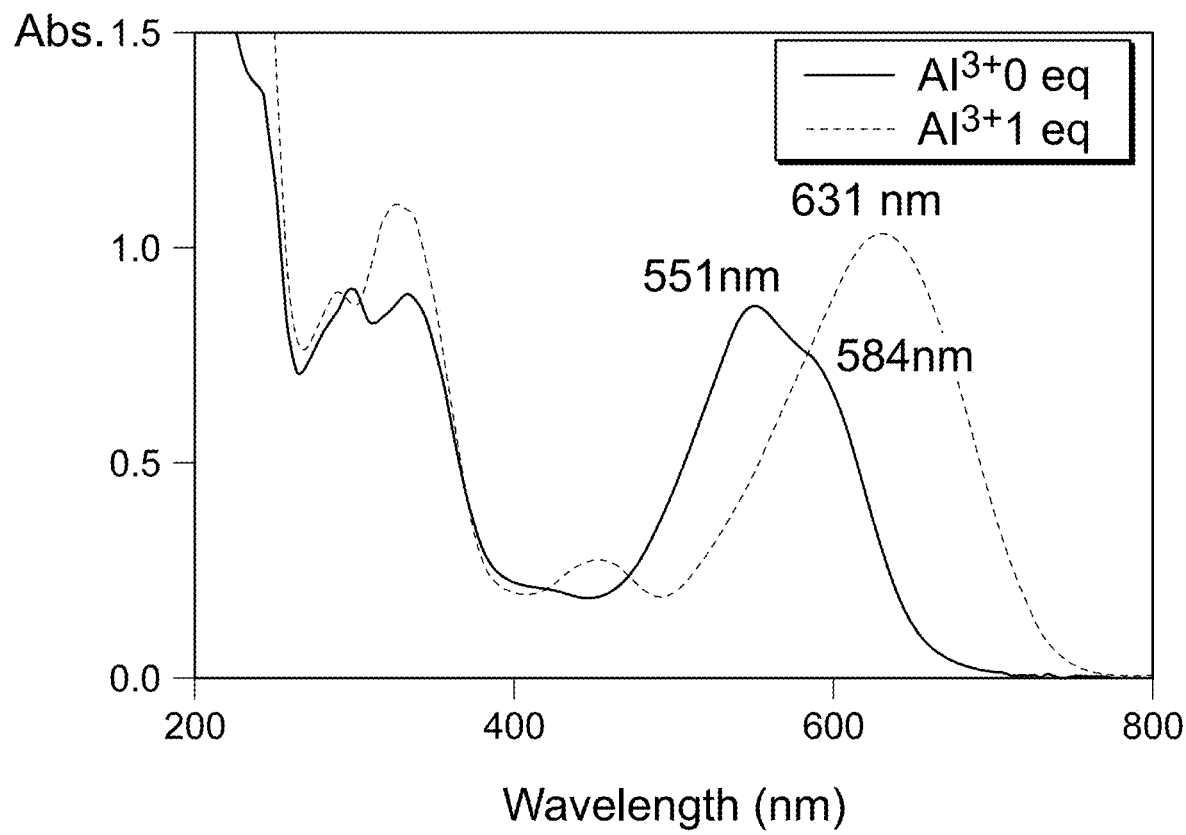
FIG. 20B shows the UV-Vis spectra taken for Compound I in Brix 50 sugar syrup at pH 7.0 with and without 1.0 mol. equiv. of $Al^{3+}$.
Figure 20C:
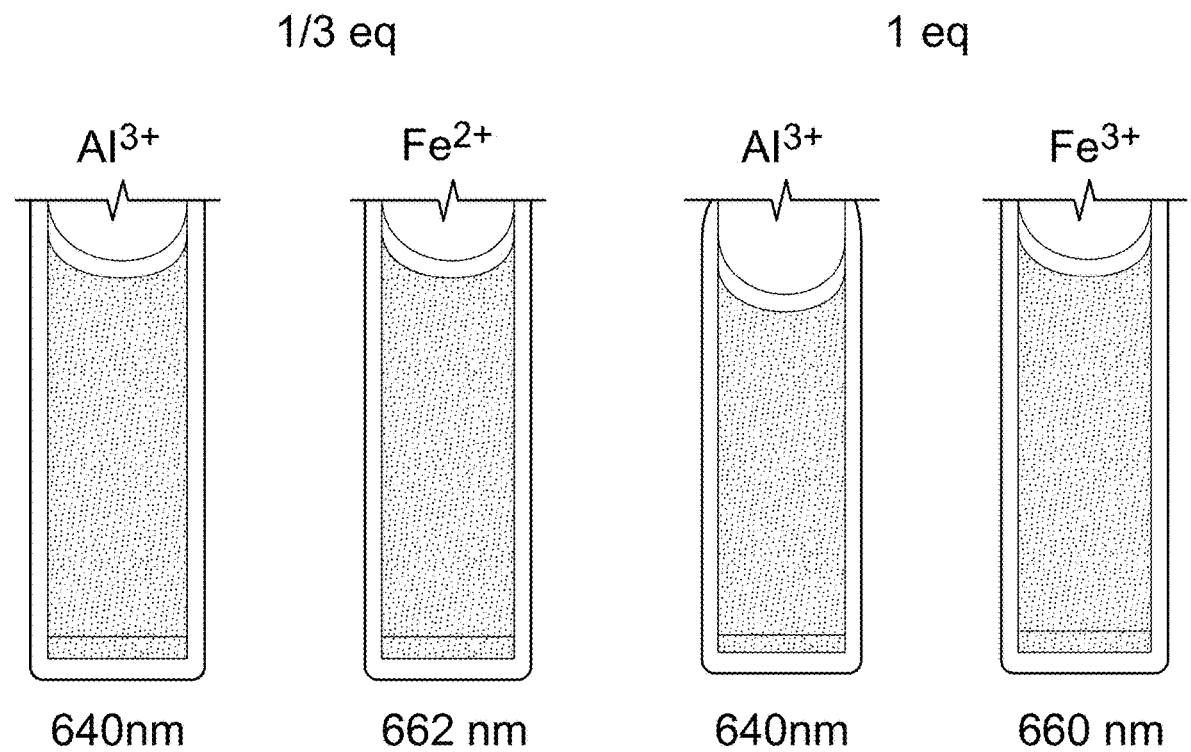
FIG. 20C provides a comparison of Compound I with $Al^{3+}$ or $Fe^{2+}$ metal ion at ⅓ mol. equiv. or 1 mol. equiv. in 20 mM phosphate buffer at pH 7.0.

The colors of Compound I in Brix 50 sugar syrup solution at pH 7.0 with or without 1.0 mol. equiv. of $Al^{3+}$ were compared as shown in FIGS. 20A and 20B. In FIG. 20A, it is apparent that the solution without $Al^{3+}$ has a more violet color, compared to the blue color of the solution with 1.0 mol. equiv. of $Al^{3+}$. The UV-Vis spectra taken for both solutions is shown in FIG. 20B. In FIG. 20C, the colors of Compound I in 20 mM phosphate buffer at pH 7.0 with $Al^{3+}$ or $Fe^{2+}$ metal ions are compared. Data were taken for Compound I with ⅓ mol. equiv. or 1 mol. equiv. with each metal ion, and the lambda max values are provided. The concentration of the solution was 0.05 mM, and the pathlength of the cuvette was 10 mm.

Figure 21:
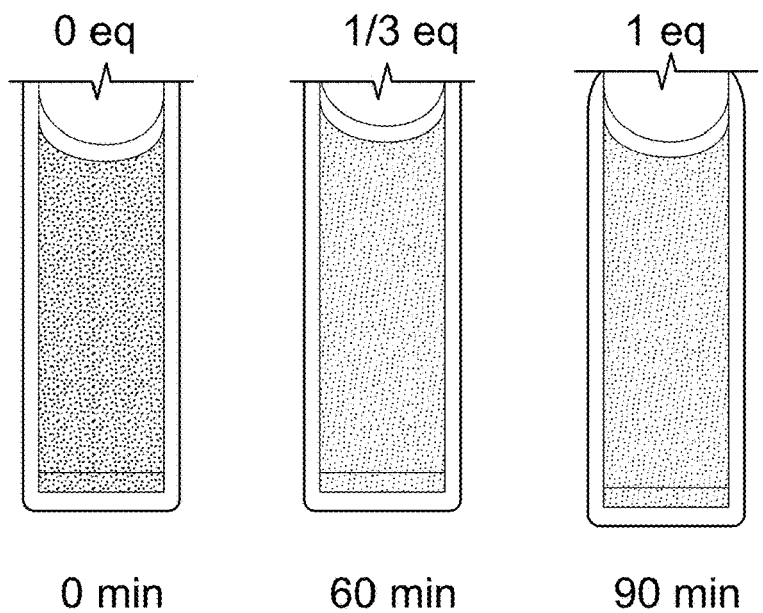
FIG. 21 provides a comparison of the solutions of Compound I with Compound II with 0, ⅓, 1 mol. equiv. of $Al^{3+}$.
Figure 21:
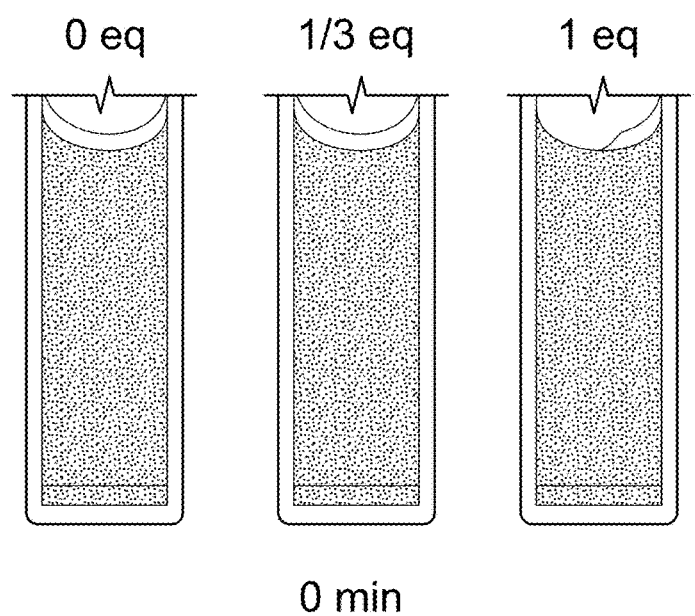

The colors of Compound I and Compound II with 0, ⅓, and 1 mol. equiv. of $Al^3$ in solution were also compared. Images of the solutions of the two compounds are provided in FIG. 21.

Example 10: Colorants for Blue Frozen Desserts

Figure 22:
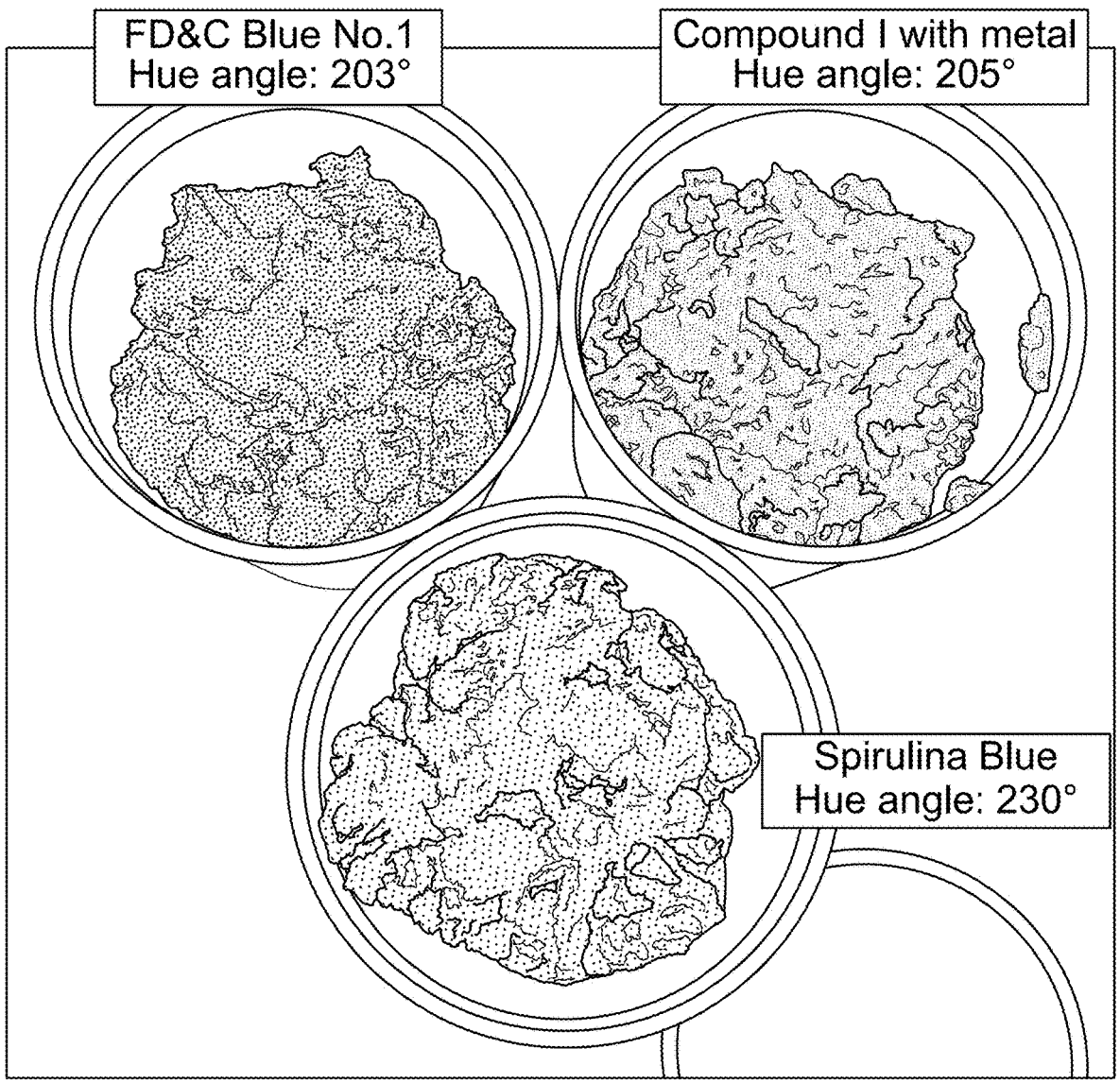
FIG. 22 shows a comparison of the hue angles of frozen ice cream desserts colored with FD&C Blue No. 1, Compound I with metal ion, and spirulina.

Frozen ice cream desserts were colored using FD&C Blue No. 1, Compound I with metal ion, and *spirulina* blue. Images of the colored ice cream are shown in FIG. 22. The hue angle of the ice cream colored with FD&C Blue No. 1 was determined to be 203°. The hue angle of the ice cream colored with Compound I with metal ion was determined to be 205°. The hue angle of the ice cream colored with *spirulina* was determined to be 230°.

Although the presently disclosed subject matter and its advantages have been described in detail, it should be understood that various changes, substitutions and alterations can be made herein without departing from the spirit and scope of the invention as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding aspects described herein may be utilized according to the presently disclosed subject matter. Accordingly, the appended claims are intended to include within their scope such processes, machines, manufacture, compositions of matter, means, methods or steps.

Patents, patent applications publications product descriptions, and protocols are cited throughout, the disclosures of which are incorporated herein by reference in their entireties for all purposes.

What is claimed is:

1. An aluminum complex comprising an aluminum ion and Compound I, wherein Compound I is:

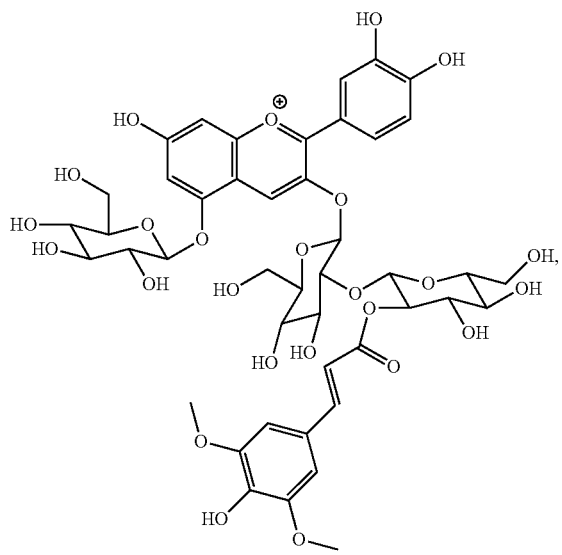 [SMILES: COc1cc(/C=C/C(=O)OC2C(OC3C(Oc4cc5c(OC6OC(CO)C(O)C(O)C6O)cc(O)cc5[o+]c4-c4ccc(O)c(O)c4)OC(CO)C(O)C3O)OC(CO)C(O)C2O)cc(OC)c1O]

and wherein the molar ratio of the aluminum ion to Compound I is about 1 to 3, and wherein the aluminum complex is

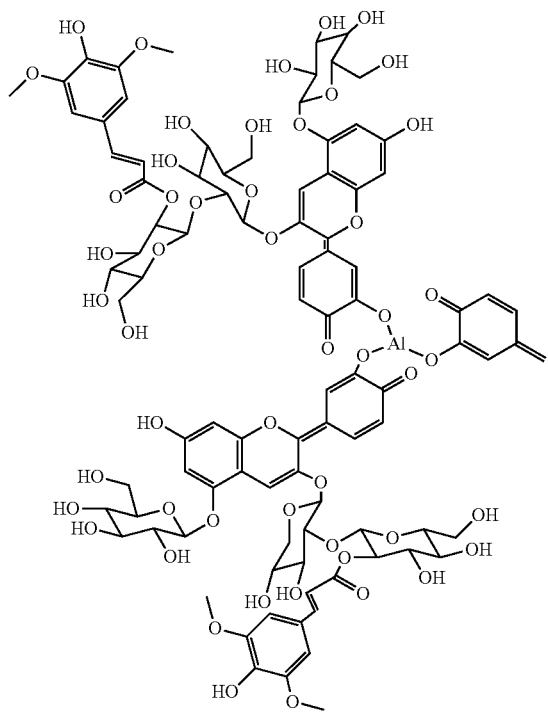

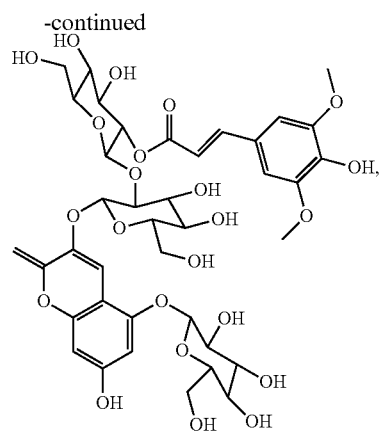

or a salt or solvate thereof.

2. The aluminum complex of claim 1, wherein the aluminum complex is a water solvate.

3. An edible colorant composition comprising the aluminum complex of claim 1 dissolved in a solution.

4. The edible colorant composition of claim 3, wherein the solution aluminum complex is dissolved within a sugar syrup.

5. The edible colorant composition of claim 3, wherein the edible colorant composition is blue.

6. The edible colorant composition of claim 3, wherein the edible colorant composition is green.

7. The edible colorant composition of claim 6, wherein the edible colorant composition further comprises a non-artificial yellow colorant selected from the group consisting of safflower, turmeric, beta carotene, Lutein, Curcumin and *Gardenia* yellow.

8. The edible colorant composition of claim 6, wherein the edible colorant composition further comprises a non-artificial yellow colorant selected from the group consisting of safflower, turmeric, beta carotene, and *Gardenia* yellow.

9. The edible colorant composition of claim 6, wherein the edible colorant composition further comprises an artificial yellow colorant selected from Yellow No. 5.

10. The edible colorant composition of claim 3, wherein the edible colorant composition comprises from about 0.5% to about 30% (weight/weight (w/w)) of Compound I.

11. An edible product comprising the edible colorant composition of claim 3 and a food product.

12. The edible product of claim 11, wherein the edible product is a confectionery product.

13. The edible product of claim 12, wherein the edible colorant composition is present in a coating applied to a surface of the confectionery product.

14. The edible product of claim 12, wherein the confectionery product is a confectionery center with a soft-panned or hard-panned sugar-based coating.

15. The edible product of claim 12, wherein the confectionery product is a confectionery center with a soft-panned or hard-panned polyol coating.

16. The edible product of claim 12, wherein the confectionery product is a chocolate confection.

17. The edible product of claim 12, where the edible product comprises from about 0.0001 to about 10% (w/w) of Compound I.

18. The edible product of claim 12, where the edible product comprises from about 0.0005 to about 1% (w/w) of Compound I.

* * * * *